United States Patent
Fujii et al.

(10) Patent No.: US 6,636,720 B2
(45) Date of Patent: Oct. 21, 2003

(54) IMAGE FORMING APPARATUS, CONTROL METHOD THEREOF, IMAGE FORMING METHOD, AND STORAGE MEDIUM

(75) Inventors: Takayuki Fujii, Tokyo (JP); Shinichi Nakamura, Kanagawa-ken (JP); Naoyuki Ohki, Tokyo (JP); Mitsuo Nimura, Chiba-ken (JP); Norifumi Miyake, Chiba-ken (JP); Kiyoshi Okamoto, Ibaraki-ken (JP); Tsuyoshi Moriyama, Ibaraki-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/256,194

(22) Filed: Sep. 27, 2002

(65) Prior Publication Data

US 2003/0035669 A1 Feb. 20, 2003

Related U.S. Application Data

(62) Division of application No. 09/772,990, filed on Jan. 31, 2001.

(30) Foreign Application Priority Data

Feb. 2, 2000 (JP) .......................................... 2000-025270

(51) Int. Cl.[7] .............................................. G03G 15/00
(52) U.S. Cl. .............................. 399/382; 399/17; 399/82
(58) Field of Search ............................... 399/382, 1, 17, 399/81, 82, 361, 363, 405, 407; 358/448, 462

(56) References Cited

U.S. PATENT DOCUMENTS

| | | | |
|---|---|---|---|
| 5,390,016 A | 2/1995 | Hoshi et al. | 399/371 |
| 5,640,231 A | 6/1997 | Mitsui et al. | 399/335 |
| 5,828,932 A | 10/1998 | Ohata et al. | 399/209 |
| 5,842,079 A | 11/1998 | Miyamoto et al. | 399/33 |
| 5,982,503 A | 11/1999 | Miyamoto et al. | 358/400 |
| 6,131,898 A | 10/2000 | Hiroi et al. | 271/10.03 |
| 6,243,541 B1 | 6/2001 | Shimizu | 399/17 |
| 6,263,173 B1 | 7/2001 | Nakamura et al. | 399/82 |
| 6,311,029 B1 * | 10/2001 | Sumio et al. | 399/82 |
| 6,442,368 B1 * | 8/2002 | Ohtsuka et al. | 399/382 |

FOREIGN PATENT DOCUMENTS

JP 2000-125143 4/2000

* cited by examiner

Primary Examiner—Sophia S. Chen
(74) Attorney, Agent, or Firm—Fitzpatrick, Cella, Harper & Scinto

(57) ABSTRACT

It is intended to obtain outputs of insert sheets suitable for an inserter without delay. Thus, it is controlled to sort sheets on which pages of an image, being the print object in a mode to output the sheets to be set to an inserter provided in another apparatus having such the inserter, of first type in a series of images having plural pages were formed respectively, on the basis of information based on the inserter provided in the another apparatus.

21 Claims, 39 Drawing Sheets

FIG. 1

S MODE

F MODE

F MODE

ORIGINALS

RECORDING SHEETS ON WHICH IMAGES WERE FORMED

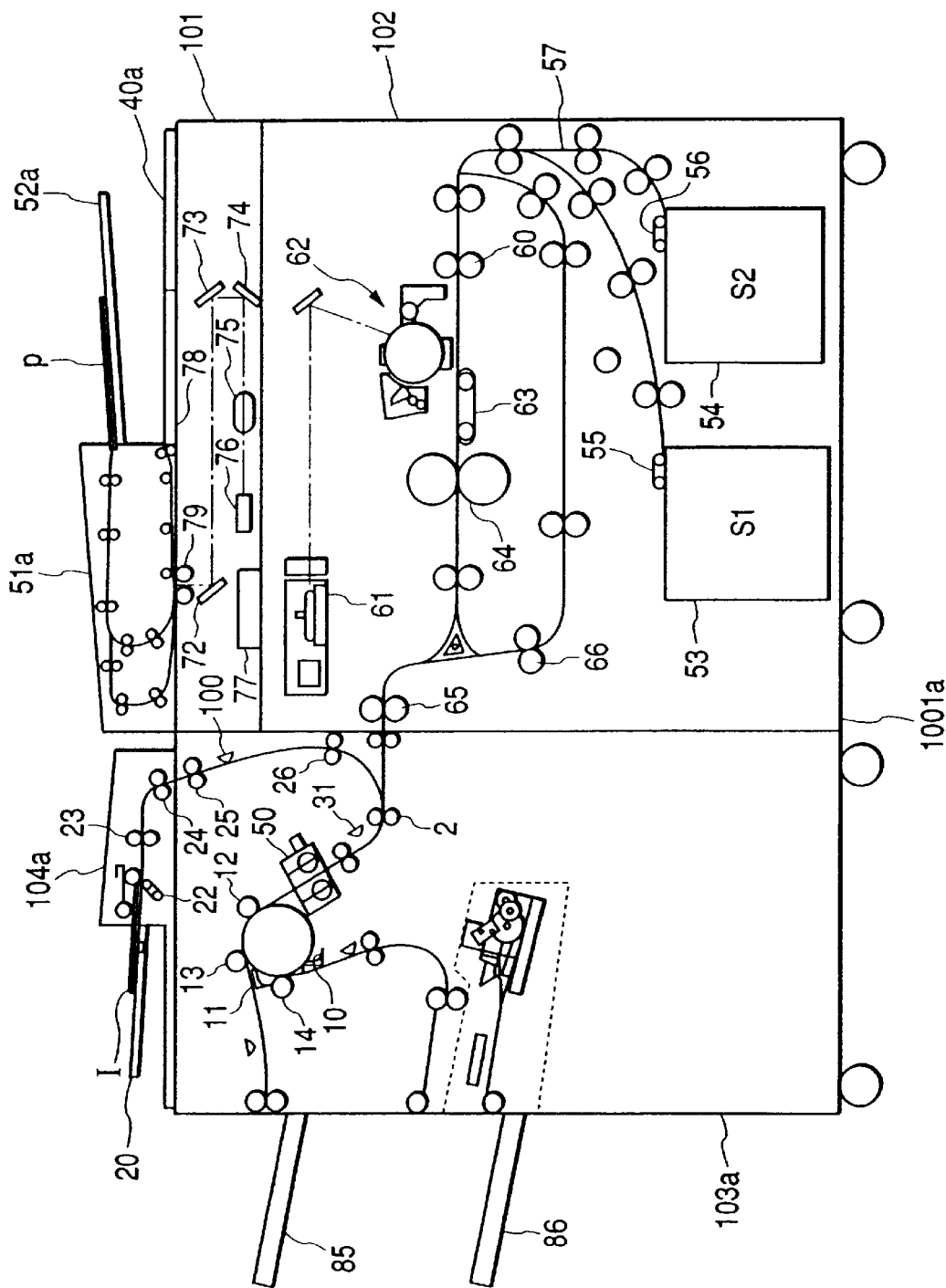

IMAGE FORMING APPARATUS, CONTROL METHOD THEREOF, IMAGE FORMING METHOD, AND STORAGE MEDIUM

This is a divisional application of U.S. patent application No. Ser. 09/772,990, filed Jan. 31, 2001, allowed Aug. 1, 2002.

BACKGROUND OF THE INVENTION

1. Field of the Invention

The present invention relates to an image forming apparatus which outputs an insert sheet to be set to an inserter, the control method thereof, an image forming method which outputs an insert sheet to be set to the inserter, and a storage medium which stores a program to execute the image forming method.

2. Related Background Art

Recently, an image forming apparatus which comprises an inserter is being proposed. The inserter is the device on which a cover, an insert sheet, a sheet on which a color image was formed, or the like is set as the insert sheet and which inserts the set insert sheet between arbitrary successive sheets discharged from the image forming apparatus. By such a process of the inserter, a sheaf of sheets in which the insert sheet has been inserted between the arbitrary successive sheets can be obtained.

However, in a case where an original having an image corresponding to the insert sheet is selected from plural originals and the image of the selected original is formed on the insert sheet by the image forming apparatus, the working to select the original of the corresponding image from the plural originals is first necessary. Further, the working to permute the selected original to come to be in the order of setting it to the inserter is necessary, or the working to permute the insert sheet discharged from the image forming apparatus is necessary. As a result, it takes time very much for obtaining the output form of the insert sheet suitable for the inserter.

SUMMARY OF THE INVENTION

An object of the present invention is to provide an image forming apparatus which solved the abovementioned conventional problem, the control method thereof, an image forming method which solved such the problem, and a storage medium which stores a program to execute the image forming method.

Another object of the present invention is to provide an image forming apparatus which can obtain an output of an insert sheet suitable for an inserter without a time, the control method thereof, an image forming method which can obtain an output of an insert sheet suitable for the inserter without a time, and a storage medium which stores a program to execute the image forming method.

Other objects and features of the present invention will become apparent from the following detailed description and the attached drawings.

BRIEF DESCRIPTION OF THE DRAWINGS

FIG. 1 is a block diagram showing the entire structure of an image forming apparatus according to one embodiment of the present invention;

FIGS. 38A, 38B and 38C are diagrams for explaining a series of working steps, including user's intervention working, to obtain output of a sheaf of originals in which color and B/W (black-and-white) originals are mixed, the working steps including a step to output a sheet as an insert sheet in the insert output mode and an insert process using the sheet output as the insert sheet.

DETAILED DESCRIPTION OF THE PREFERRED EMBODIMENTS

Hereinafter, the embodiments of the present invention will be explained with reference to the attached drawings.

First Embodiment

Figure 1:
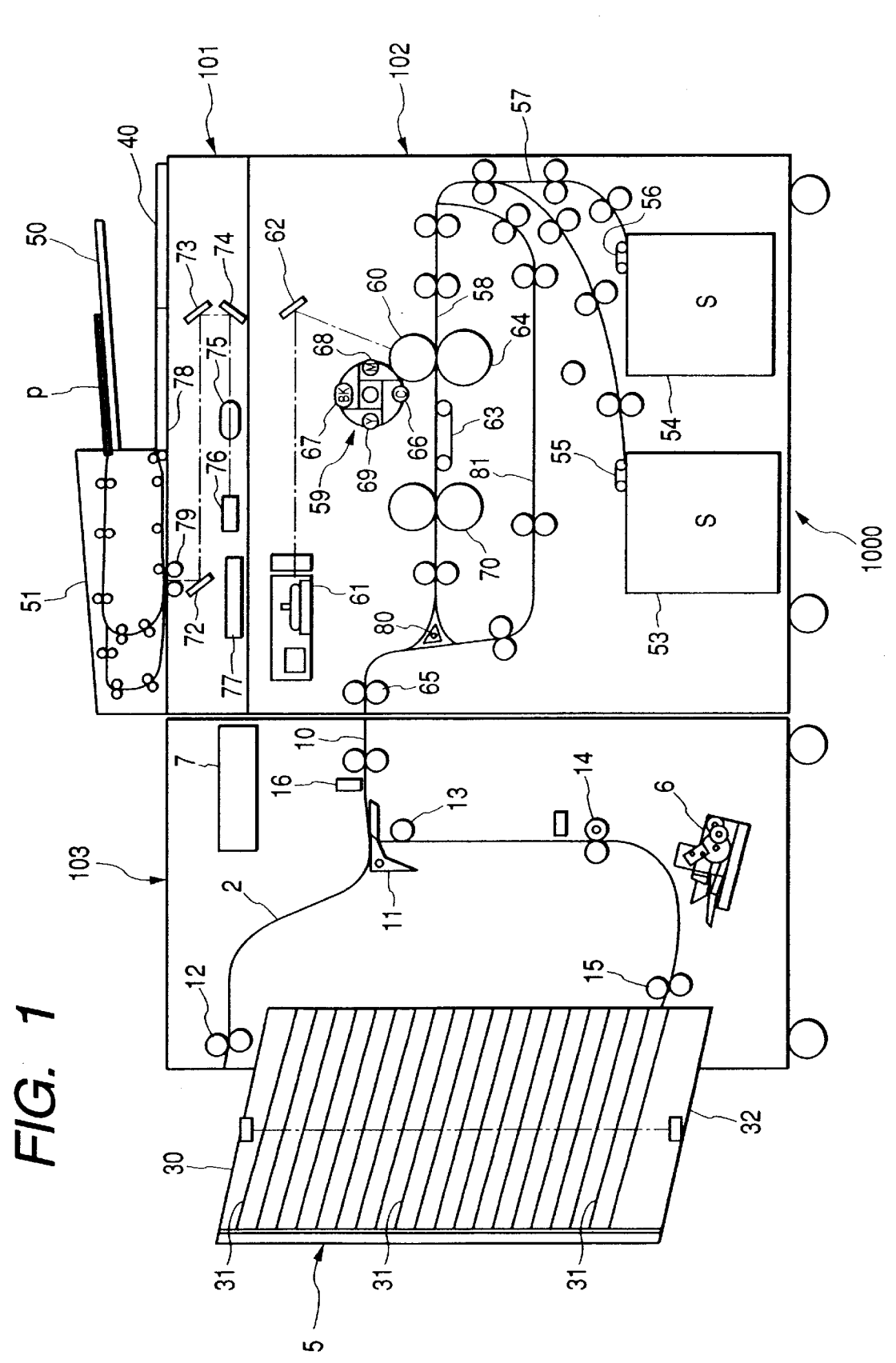
Figure 2:
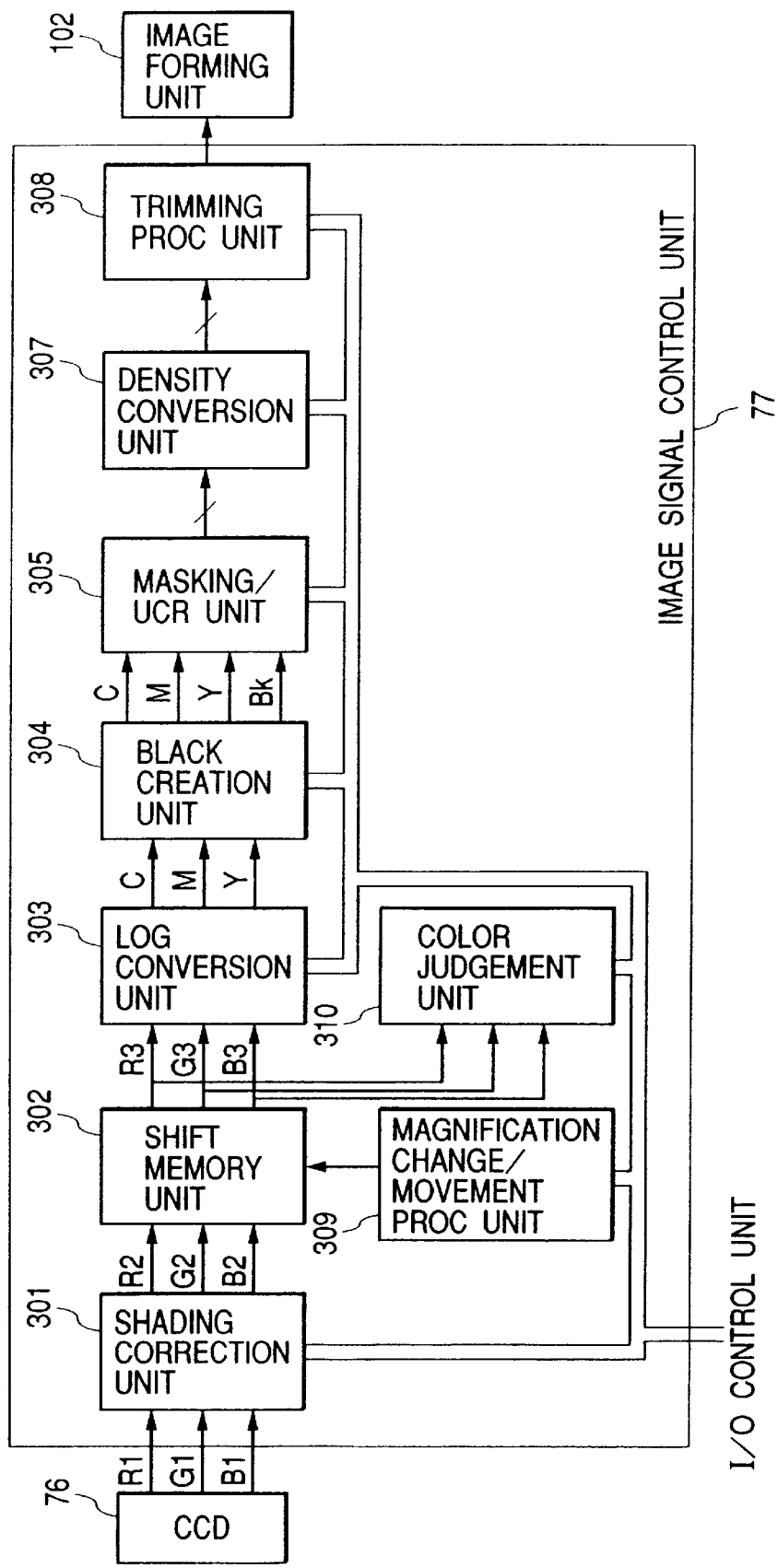
FIG. 2 is a block diagram showing the structure of the image signal control unit provided in the reading unit of the image forming apparatus shown in FIG. 1.

FIG. 1 is a block diagram showing the entire structure of an image forming apparatus according to one embodiment of the present invention, and FIG. 2 is a block diagram showing the structure of the image signal control unit provided in the reading unit of the image forming apparatus shown in FIG. 1. In the present embodiment, a copying machine acting as the image forming apparatus will be explained by way of example.

As shown in FIG. 1, a copying machine (or an image forming apparatus) 1000 is composed of a reading unit 101 on which an automatic document feeder (ADF) 51 is installed, an image forming unit 102, and a sheet processing unit 103.

The ADF 51 feeds and carries an original p put on an original stacking tray 50 to the reading position on a original mounting board glass 78, and then carries the original p to the sheet discharge position. In this ADF 51, an original discrimination sensor (not shown) for discriminating whether the original p is a color original or a B/W (black-and-white) original is disposed. The original discrimination sensor which is arranged on the way of the carrying path extending from the original stacking tray 50 to the reading position on the original mounting board glass 78 discriminates the original p when it passes the reading position. Further, the reading unit 101 is composed of a lamp 79 which irradiates the original p carried up to the reading position, and reflection mirrors 72, 73 and 74 which guide reflection light from the original p to a lens 75. The lens 75 images the reflection light on a CCD line sensor (simply called a CCD hereinafter) 76. The CCD 76 which is the color sensor capable of independently obtaining each of R (red), G (green) and B (blue) analog color signals converts the obtained light image into each analog color signal. This analog signal is converted into an eight-bit digital signal by an A/D converter (not shown), and this digital signal is input to an image signal control unit 77.

As shown in FIG. 2, the image signal control unit 77 contains a shading correction unit 301 to which digital color signals R1, G1 and B1 are input from the CCD 76. The shading correction unit 301 performs shading correction for each color. Color signals R2, G2 and B2 subjected to the shading correction are input to a shift memory unit 302, and the shift memory unit 302 corrects color and pixel misregistering of each input color signal. Also, the shift memory unit 302 can perform a magnification change and movement process to each input color signal by performing thinning, interpolation and movement, on the basis of a control signal from a magnification change and movement process unit 309. Color signals R3, G3 and B3 subjected to the correction in the shift memory unit 302 are input to a color judgement unit 310 and a LOG (logarithmic) conversion unit 303. In the LOG conversion unit 303, logarithmic correction for light/density conversion is performed, whereby the input color signals R3, G3 and B3 are converted into density signals Y (representing yellow density), M (representing magenta density) and C (representing cyan density), respectively.

The density signals Y, M and C are input to a black creation unit 304, and the black creation unit 304 generates a density signal Bk (representing black density) based on the density signals Y, M and C. For example, the density signal Bk is generated by an expression Min(Y, M, C). Then, the density signals Y, M, C and Bk are input to a masking/UCR (under color removal) unit 305. The masking/UCR unit 305 corrects the filter characteristic and the toner density characteristic of the CCD 76 with respect to each of the input density signals Y, M, C and Bk, and eliminates unnecessary components. Then, one color signal to be developed is selected from among the four color signals.

The selected color signal is input to a density conversion unit 307, and the density conversion unit 307 performs density conversion according to the development characteristic of the image forming unit 102 and operator's liking. The color signal subjected to the density conversion is then input to a trimming processing unit 308, the trimming processing unit 308 performs an editing process of a predetermined interval for the input signal, and the signal subjected to the editing process is then transferred to the image forming unit 102.

The color judgement unit 310 detects a chromatic color greater than a certain level on the basis of each color signal input from the shift memory unit 302. Here, when the signal ratio of each of the color signals R, G and B is equal to others, an achromatic color is detected. Thus, when the differences among the color signals R, G and B are small, the objective color is judged to an achromatic color, whereby it is possible to judge whether or not an original includes a chromatic color or an achromatic color.

As shown in FIG. 1, the image forming unit 102 contains plural recording sheet storage units 53 and 54 on which different-sized recording sheets S are stacked, and the recording sheets S are fed by recording sheet feed units 55 and 56 respectively. The fed recording sheet S is carried to a sheet carrying path 58 through a sheet carrying path 57.

Further, the image forming unit 102 contains a laser scanner 61 which performs scanning by a laser beam through a reflection mirror 62 and thus forms an electrostatic latent image on a photosensitive body (or drum) 60, on the basis of the digital signal output from the image signal control unit 77. The electrostatic latent image formed on the photosensitive body 60 is developed by corresponding-colored toner and visualized as a toner image, and the obtained toner image is transferred to the sheet S carried to the sheet carrying path 58 by a transfer drum 64. Here, a rotation development unit 59 is used to develop the electrostatic latent image on the photosensitive body 60. The rotation development unit 59 is composed of an M (magenta) development unit 68, a C (cyan) development unit 66, a Y (yellow) development unit 69 and a Bk (black) development unit 67, and these color development units alternately supply to the photosensitive drum 60 respective toners used to develop the electrostatic latent image on the photosensitive drum 60. The sheet S is wound around the transfer drum 64, and the developed image on the photosensitive drum 60 is transferred to the wound sheet S. Thus, M, C, Y and Bk development agents are sequentially transferred to the sheet S, the sheet S on which the images of respective colors were transferred is carried to a fixing unit 70 by a carrying belt 63, and the transferred image is fixed to the sheet S by the fixing unit 70.

The sheet S on which the image was fixed is carried to the sheet processing unit 103 through a sheet discharge flapper 80 and a sheet discharge roller 65 or to a two-faced copying path 81 through the flapper 80. The two-faced copying path 81 is the path which is used to reverse the sheet S one face of which has the formed image and again carry the reversed sheet S to the photosensitive drum 60. By guiding the sheet S to the two-faced copying path 81, an image can be formed on one face of the sheet S the other face thereof has the formed image, whereby a two-faced copying mode can be realized.

The sheet processing unit 103 contains an inlet carrying path 10 which is used to take in the sheet S discharged from the image forming unit 102 and a carrying path 2 which is used to discharge the took-in sheet S to a stacking tray 30 of a bin unit 5 through a flapper 11 and a sheet discharge roller 12. A sensor 16 which detects the sheet S is provided on the inlet carrying path 10. The sheets S on the carrying path 10 can be discharged to predetermined stacking bins 31 through the flapper 11 and carrying rollers 13, 14 and 15. A stapling unit 6 is disposed between the carrying path 14 and the carrying roller 15 to staple a sheaf of the sheets stacked on the stacking bin 31. As described above, the bin unit 5 contains the stacking tray 30 and the plural stacking bins 31. Each bin 31 is moved up and down, whereby the discharged sheets S are stacked on the corresponding stacking bin 31. Further, a sensor 32 is provided to be able to detect presence/absence of the sheet S on each stacking bin 31.

An operation unit 40 is provided on the reading unit 101 to perform and confirm the operation setting of the reading unit 101, the image forming unit 102 and the sheet processing unit 103. The operation unit 40 includes a display section for confirming the setting contents, a touch panel key overlapped and displayed on the display section for performing detailed setting of an image forming operation, operating setting for the sheet processing unit and the like, a ten-key section for setting numerals such as the number of image forming copies and the like, a stop key for stopping the image forming operation, a reset key for initializing the current setting, a start key for starting the image forming operation, and the like. The detailed structure of the operation unit 40 will be described later.

Figure 3:
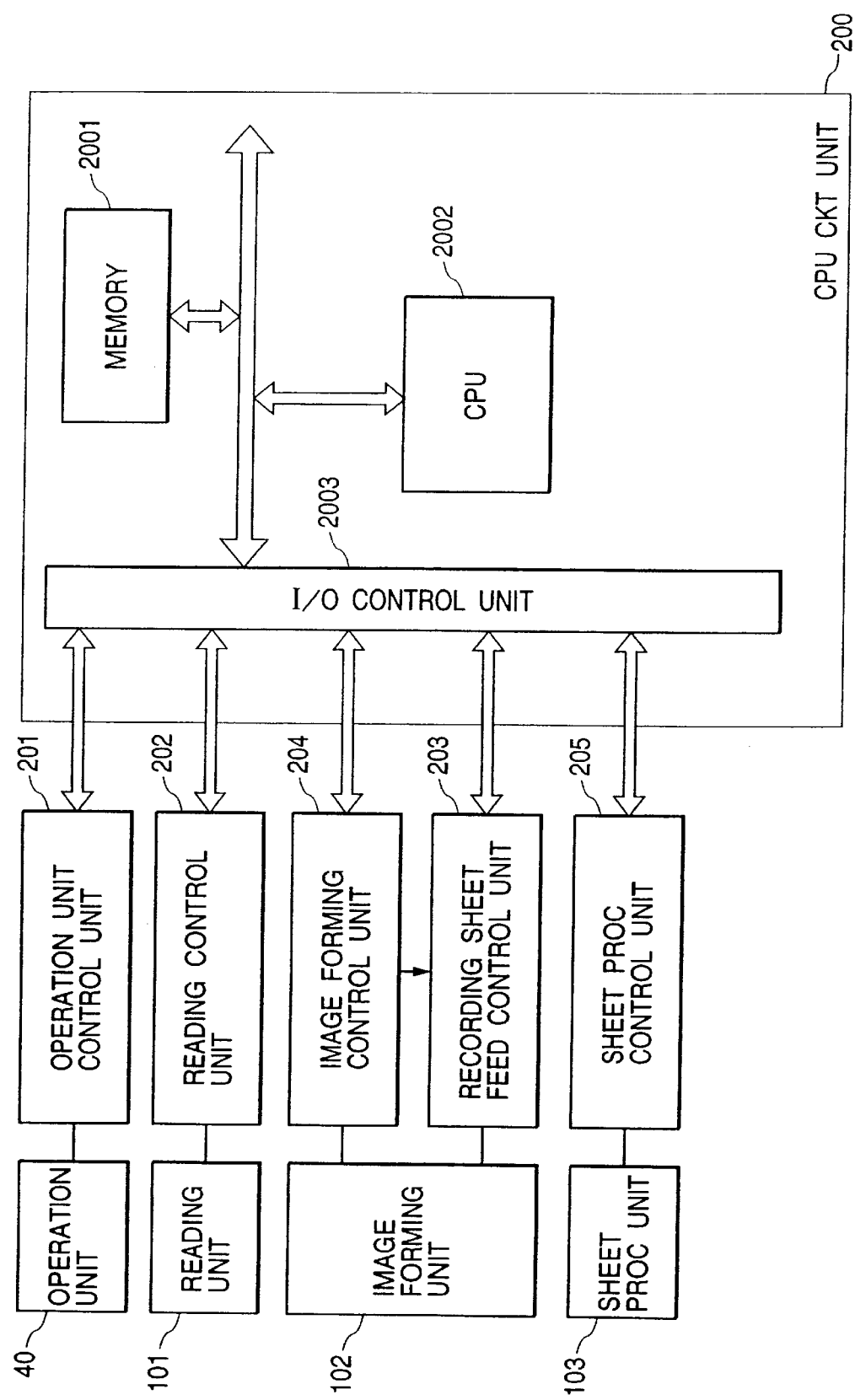
FIG. 3 is a block diagram showing the control structure of the image forming apparatus shown in FIG. 1.

Next, the control structure of the image forming system according to the present embodiment will be explained with reference to FIG. 3. FIG. 3 is a block diagram showing the control structure of the image forming apparatus of FIG. 1.

In the copying machine 1000, a CPU (central processing unit) circuit unit 200 is provided. The CPU circuit unit 200 which contains a CPU 2002, a memory 2001, an I/O (input/output) control unit 2003 and the like performs operation and entire control according to a predetermined program. The memory 2001, which includes a RAM, a ROM, an IC card, a floppy disk and the like for storing programs and predetermined data, reads and writes the program and the data. The I/O control unit 2003 transmits and controls various input and output signals.

An operation unit control unit 201, a reading control unit 202, a recording sheet feed control unit 203, an image forming control unit 204 and a sheet processing control unit 205 are connected to the I/O control unit 2003. The memory 2001 and the I/O control unit 2003 are controlled in response to a control signal transferred from the CPU 2002. Further, the operation unit control unit 201, the reading control unit 202, the recording sheet feed control unit 203, the image forming control unit 204 and the sheet processing control unit 205 are operated by the CPU circuit unit 200 through the I/O control unit 2003. Thus, the operation unit control unit 201 displays various information on the operation unit 40 and accepts various input operations on the operation unit 40. The reading control unit 202 drives and controls the reading unit 101. The recording sheet feed control unit 203 controls the feed operations of the sheets S from each of the recording sheet storage units 53 and 54 in the image forming unit 102. The image forming control unit 204 controls the laser beam scanning, the driving of the photosensitive drum 60 and its peripheral units, the driving of the carrying rollers, and the like. The sheet processing control unit 205 controls the driving of the sheet processing unit 103.

In the copying machine 1000 having the above structure, when a user sets the original on the ADF 51 of the reading unit 101, sets an operation mode, and instructs to start copying, the set original is fed one by one to the reading position on the original mounting board glass 78 by the ADF 51, and the fed original is then read by the reading unit 101.

In the CCD 76, the read original image is photoelectrically converted into the analog color signals, and each analog color signal is further analog-to-digital converted into the digital image signal to be output. After various image processes are performed to the read image signal in accordance with user setting from the operation unit 40, the processed image signal is converted into the laser signal to exposure the photosensitive drum 60, and then the image is formed on the sheet S through ordinary electrophotographic processes, i.e., charging, exposure, latent image forming, development, transfer, separation and fixing processes. The sheet S on which the image was formed is carried to the inlet carrying path 10 of the sheet processing unit 103. The sheet processing unit 103 is controlled by the sheet processing control unit 205 on the basis of the instruction from the CPU circuit unit 200, in accordance with the setting from the operation unit 40.

Figure 4:
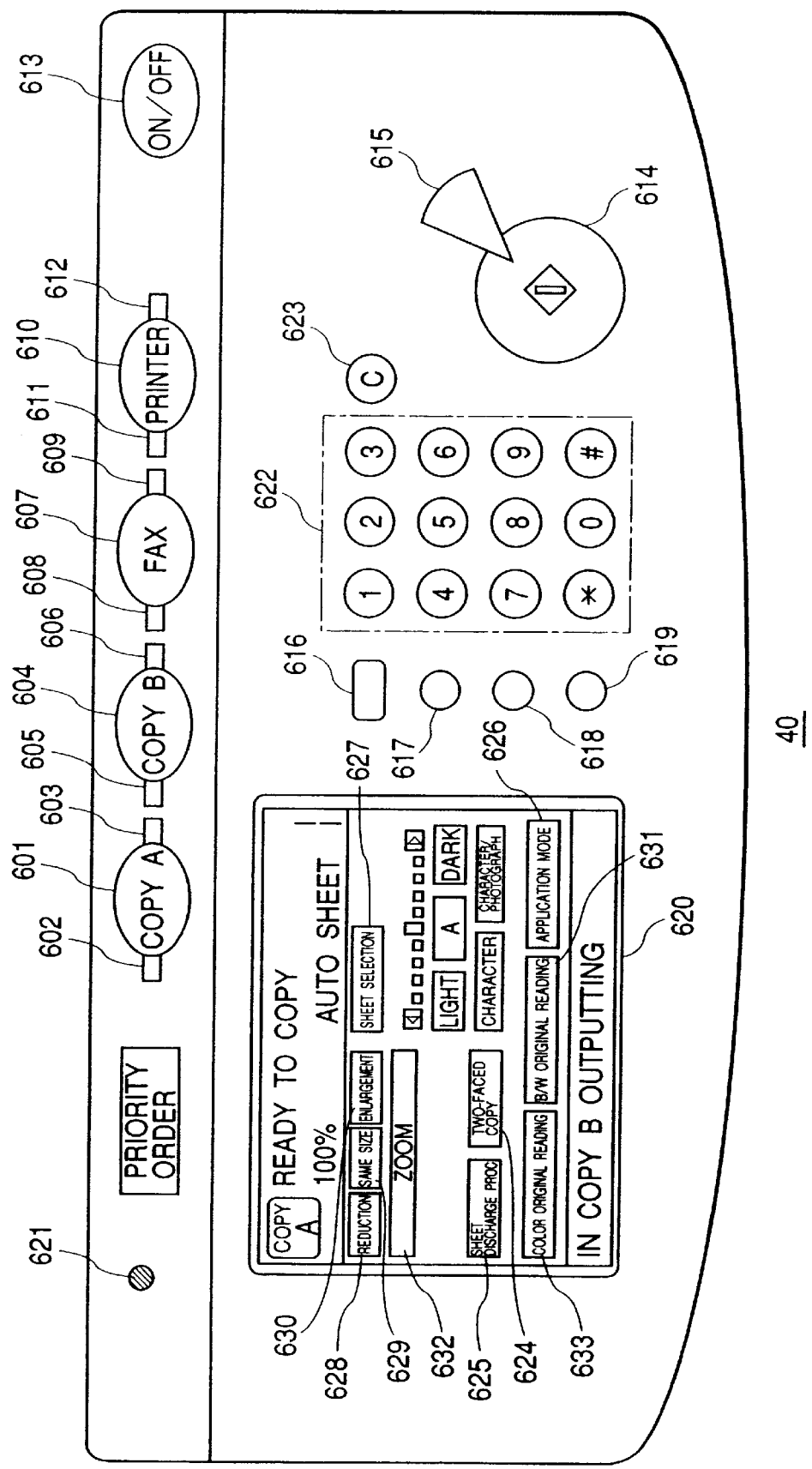
FIG. 4 is a diagram showing the outer structure of the operation unit shown in FIG. 1.
Figure 5:
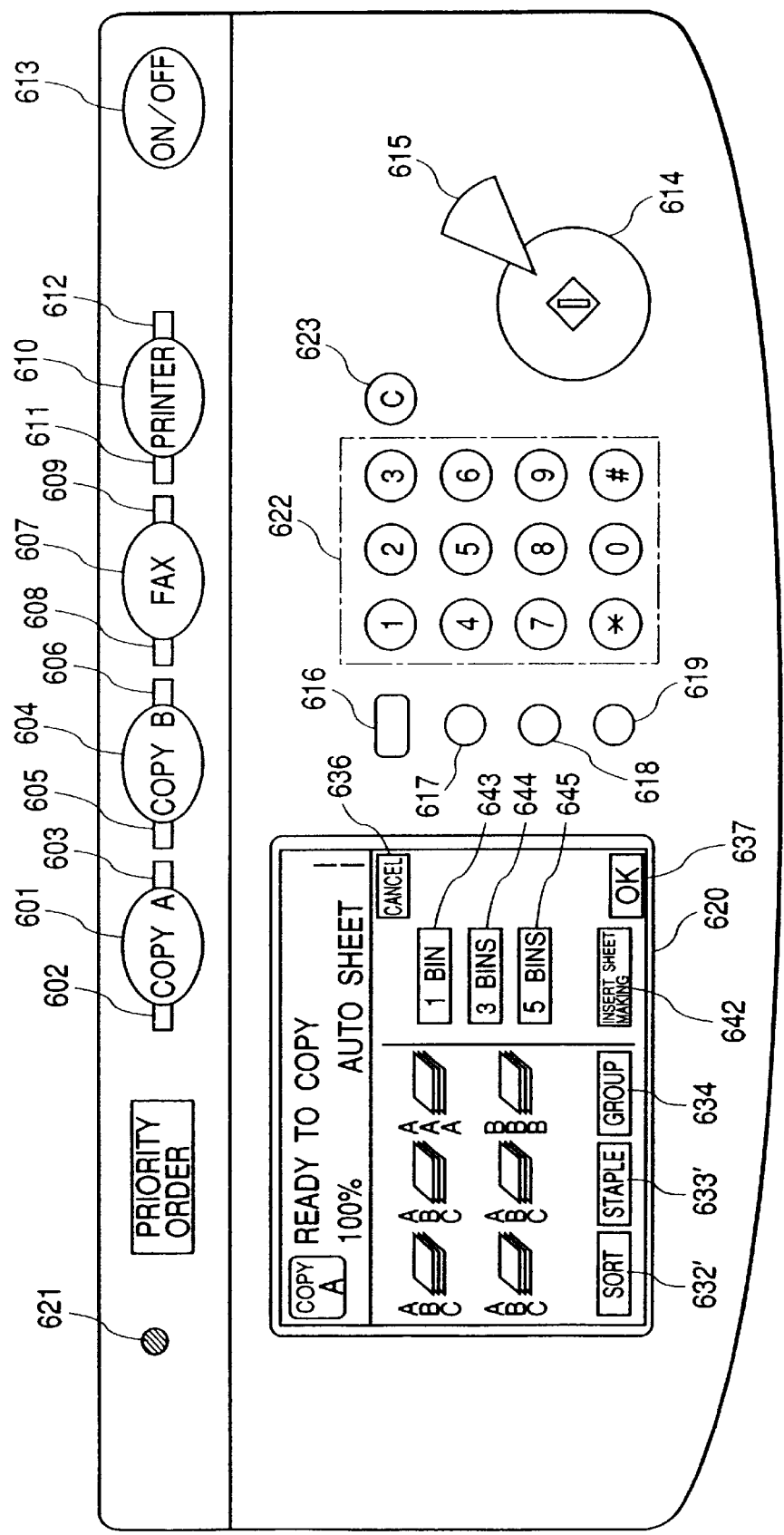
FIG. 5 is a diagram showing an example of an operation screen displayed on the LCD (liquid crystal display) of the operation unit shown in FIG. 4.

Next, the structure of the operation unit 40 will be explained with reference to FIGS. 4 and 5. FIG. 4 is a diagram showing the outer structure of the operation unit 40, and FIG. 5 is a diagram showing an example of the operation screen displayed on the LCD (liquid crystal display) of the operation unit 40.

As shown in FIG. 4, the operation unit 40 is composed of an LCD 620 and plural hardware keys. The LCD 620 on which a touch panel sheet has been adhered displays a system operation screen and various software keys. When the displayed software key is depressed, its positional information is output to the CPU 2002 of the CPU circuit unit 200 through the operation unit control unit 201. Further, the LCD 620 captures and displays the information transferred from the CPU 2002.

The operation screen of the LCD 620 shown in FIG. 4 is the operation screen which corresponds to a copy A function and on which various software keys are displayed. The user can perform mode setting in the copy A function by depressing these software keys. A key 627 is used to select the sheet, and keys 628, 629, 630 and 632 are used to set a magnification in a copying operation. An application mode key 626 is used to set various application function modes such as a multicopying mode, a reduction layout mode, a cover/insert sheet mode and the like. When the application mode key 626 is depressed, the setting screen for the application function mode is displayed. A key 624 is used to set a two-faced copying operation. By depressing the key 624, "one-faced original to two-faced copy mode" that one two-faced copy is produced from two one-faced originals, "two-faced original to two-faced copy mode" that one two-faced copy is produced from one two-faced original, and "two-faced original to one-faced copy mode" that two one-faced copies are produced from one two-faced original can be set. A key 625 is used to set the operation mode of the sheet processing unit 103, an output sheet sort mode using a memory, and the like.

A key 633 is used to set a color original reading mode that only color originals are read and output from the plural originals p stacked on the original stacking tray 50. A key 631 is used to set a mode that only B/W originals are read and output from the plural originals p stacked on the original stacking tray 50. When either one of the keys 633 and 631 is depressed, the key corresponding to the selected mode is B/W-reversely displayed, whereby the user can know the selected reading mode. Further, when the B/W-reversely displayed key is depressed, the set mode is released, and the corresponding key is normally displayed (i.e., in a nonreverse display state). When both the keys 633 and 631 are in the nonreverse display state, the reading unit 101 is in the initial state. Thus, an ordinary reading mode that all the originals stacked on the original stacking tray 50 are read irrespective of the color original and the B/W original is set.

The shading is added to the key which is displayed within the LCD 620 and can not be used, i.e., this key is screened, whereby the key operation corresponding to this key is not accepted. The display area which shows the operation state of other function mode is arranged at the lower part of the LCD 620. In the present embodiment, this area shows that the output operation to the image forming unit 102 is being performed in a copy B function.

As the hardware keys, a power switch 613, a start key 614, a stop key 615, a reset key 616, a guide key 617, a user setting key 618, an interruption key 619, a ten-key group 622 and a clear key 623 are provided. The power switch 613 is used to turn on and off the power supply. When the power supply is turned on by depressing the power switch 613, a power lamp 621 indicating the power-on state is lit. The start key 614 is used to instruct the start of the reading operation of the original image, and a two-color (red and green) LED (not shown) is arranged in the center part of this key. The red lighting of the start key 614 indicates that the depression of the start key 614 is not accepted, while the green lighting of this key indicates that the depression of this key is accepted. The stop key 615 is used to stop the operation, the reset key 616 is used to initialize the setting issued from the operation unit 40, and the guide key 617 is used to display the explanation of the function capable of being set by each key on the LCD 620. The user setting key 618 is used when the setting of the copying machine 1000 is changed by the user. For example, it is possible by depressing this key to change a time while the setting is automatically cleared, a default value of the mode when the reset key 616 is depressed, and the like. The interruption key 619 is used to make another job interrupt on the way of one job, and the clear key 623 is used to clear the setting input by the ten-key group 622.

Further, as the hardware keys, a copy A function key 601, a copy B function key 604, a fax function key 607 and a printer function key 610 are provided. These function keys are used when the displayed content of the LCD 620 of the operation unit 40 is changed to perform the setting of each function in the copying operation and the system operation. Each of these function keys is the semitransparent key and incorporates a display lamp (not shown) such as an LED or the like, and lighting of the display lamp is controlled according to the selected operation screen. Green LED's 603, 606, 609 and 612 are arranged at the right of the function keys 601, 604, 607 and 610 respectively, and lighting of each LED is controlled to indicate the operation state. For example, when the copy B function key 604 is depressed, the operation screen corresponding to the copy B function is displayed on the LCD 620. When the copy B function is on standby, the LED 606 corresponding to the copy B function key 604 is controlled to be turned off. While the output operation is being performed in the copy B function, the LED 606 corresponding to the copy B function key 604 is controlled to be blinked. When the image of the copy B function was stored in the memory 2001 and the printing operation of the copy B function is not performed, the LED 606 is controlled to be lit.

Red LED's 602, 605, 608 and 611 are arranged at the left of the function keys 601, 604, 607 and 610 respectively, and each LED is controlled to be lit when abnormality occurs in each function. For example, when abnormality such as sheet lack interruption, a jam or the like occurs in the copy B function, the LED 605 corresponding to the copy B function key 604 is controlled to be blinked. At this time, when the copy B function key 604 is depressed, the abnormality state in the copy B function is displayed, whereby the user can know the details of such the abnormality.

The function keys 601, 604, 607 and 610 can be depressed irrespective of an operating state. Thus, by changing the content displayed on the LCD 620, the operation screen can be changed. The stop key 615, the start key 614, the reset 616 or the like can be set as the keys used to perform the operation corresponding to the function selected by each function key. For example, while the operation screen of the copy A function is being displayed on the LCD 620, if it is intended to stop the copying operation of the copy B function, the operation screen is changed by depressing the copy B function key 604, and then the stop key 615 is depressed. Thus, the copying operation of the copy B function can be stopped. Further, since the content changed by the user setting key 618 is reflected in the function selected when the content is changed, such the content can be independently set to each function.

The copying machine 1000 in the present embodiment outputs the sheet to be set to the inserter, in order to reduce as much as possible the user's working necessary to set the insert sheet to the inserter. For example, the copying machine 1000 can be efficient especially in such a system as shown in FIG. 38A.

Figure 38A:
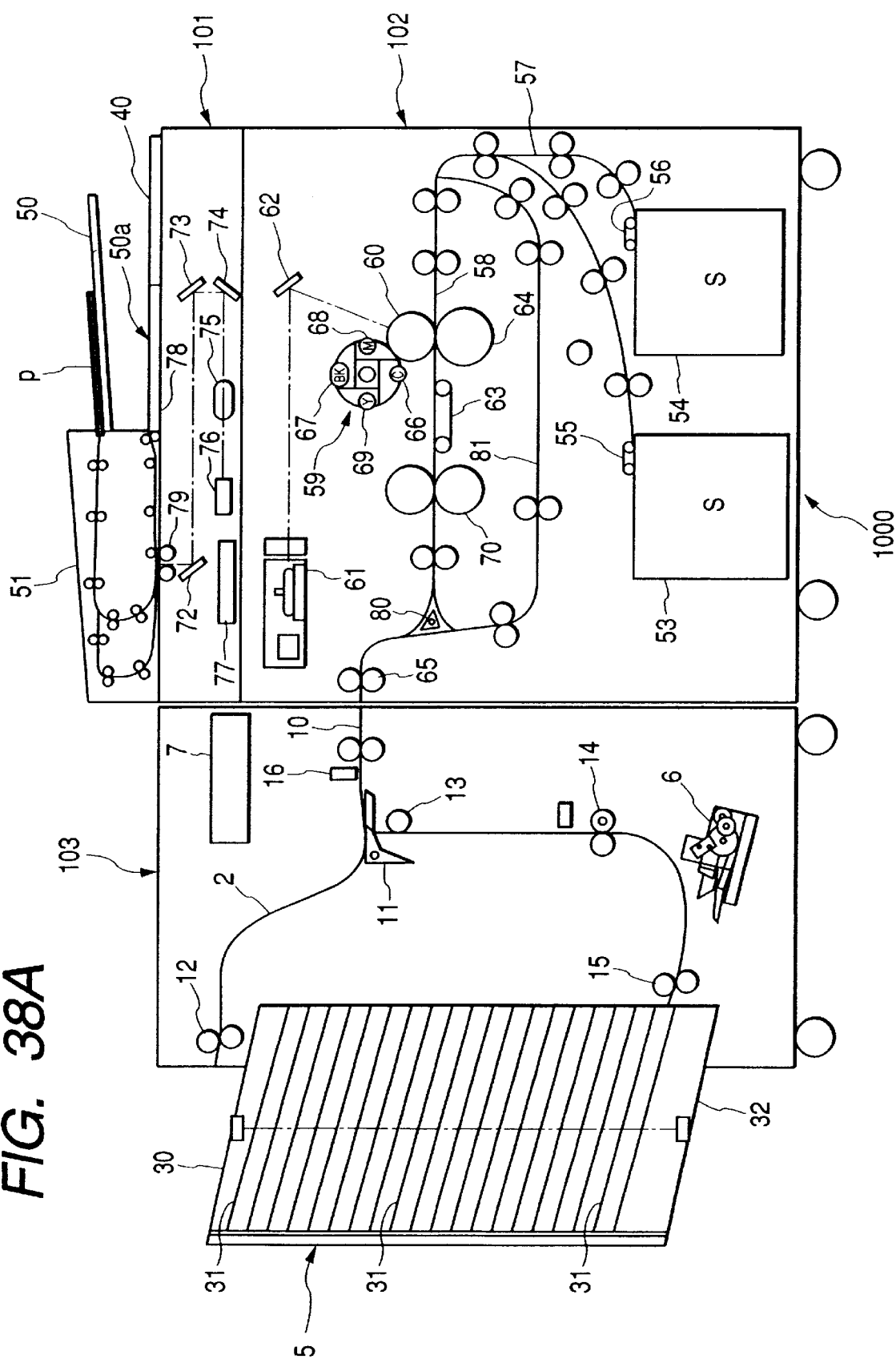

In FIG. 38A, the copying machine 1000 in the present embodiment outputs the sheets in the form suitable for a used inserter, e.g., an inserter 104a of an image forming apparatus (or a copying machine) 1001a, an inserter 104b of an image forming apparatus (or a copying machine) 1001b, or the like.

The inserter inserts a specific sheet such as a cover, an insert sheet, a color sheet, a sheet on which a color image has been formed, or the like into the sheets subjected to the image forming by the image forming unit. The sheet fed from the inserter is guided inside the finisher without the image forming unit, and discharged to the sheet discharge unit of the finisher.

It is assumed that the copying machine (or called the image forming apparatus) 1000 of the present embodiment is image forming apparatus having the image forming unit capable of forming a color image on a sheet, and the image forming apparatuses 1001a and 1001b are the image forming apparatuses respectively forming B/W images on sheets. A finisher 103a including the inserter 104a having one inserter bin is connected to the image forming apparatus 1001a, and a finisher 103b including the inserter 104b having three inserter bins is connected to the image forming apparatus 1001b. Other basic structures are common in these image forming apparatuses, and the explanation thereof will be omitted.

Next, a series of processes including the operations of the apparatuses and the user's working in a case where the image forming apparatus 1000 of the present embodiment and the image forming apparatus 1001a cooperate to generate the copy of the sheaf of the originals p mixedly including color and B/W originals will be briefly explained.

First, the user sets on the original stacking tray 50 of the apparatus 1000 the sheaf of the originals p mixedly including the color and B/W originals in the state that the first page of this sheaf is uppermost and faceup. Then, the user selects and sets an insert output mode (described later) on the operation unit 40, and depresses the copy start key.

Then, the image forming apparatus 1000 sequentially feeds the originals p while maintaining the page order, and discriminates whether the original of each page is the color original on which the color image was formed or the B/W original on which the B/W image was formed. The page of the color original in the sheaf of the originals is subjected to the color image forming by the color image forming unit of the apparatus 1000, while the page of the B/W original is not subjected to the image forming.

Thus, the copies of only the color pages in the sheaf of the originals p are output in the sequential page order on the sheet discharge tray 30 of the finisher 103 of the image forming apparatus 1000. The ADF 51 performs a color and B/W discrimination process to all the pages while maintaining the page order, and discharges the original to an original discharge unit 50a, whereby it is possible to end the above process while maintaining the page order like the time when the original was set to the original stacking tray 50.

Then, the user takes the output of only the color pages from the sheet discharge unit 30, and sets as insert sheet the output to an inserter bin 20 of the inserter 104a on the finisher 103a of the image forming apparatus 1001a having the B/W image forming unit in the state that the first page of the output is uppermost and faceup. On the other hand, the user takes from the original discharge unit 50a the sheaf of the originals p mixedly including the color and B/W originals and subjected to the color and B/W discrimination process in the state that the page order is maintained as it is, and then sets the sheaf to an original tray 52a of the image forming apparatus 1001a in the state that the first page of the sheaf is uppermost and faceup. After the insert sheet and the sheaf of the original were set, the user selects and sets the insert output mode for causing the image forming apparatus 1001a to perform the process using the inserter 104a such as a gathering process of the color output from the inserter and the printing-processed sheet, and then depresses the copy start key.

Then, the image forming apparatus 1001a sequentially feeds the sheaf of the originals from the tray 52a while maintaining the page order, and discriminates whether the original of each page is the color original on which the color image was formed or the B/W original on which the B/W image was formed. When the discriminated page is the B/W page, this page is subjected to the image forming by the B/W image forming unit of the apparatus 1001a, and the image-formed sheet is then guided inside the finisher 103a and discharged to the sheet discharge unit such as a sheet discharge bin 85 or 86. On the other hand, when the discriminated page is the color page, any image forming is not performed. Instead, the color output being the insert sheet is fed from the inserter bin of the inserter 104a, and carried to the sheet discharge unit same as that to which the sheet subjected to the image forming of the B/W page is carried, through the carrying paths in the finisher.

Namely, in the image forming apparatus 1001a, only the B/W pages in the sheaf of the originals set on the tray 52a are subjected to the image forming, while the color pages are is not subjected to the image forming, and instead the color output being the insert sheet and subjected to the color image forming is fed from the inserter. Thus, in the sheet discharge unit of the image forming apparatus 1001a, the output sheaf in which the color output and the B/W output are gathered in the page order same as that of the sheaf of the originals can be generated as one group.

The above is the basic flow of the series of processes including the operations of the apparatuses and the user's working in the case where the two image forming apparatuses including the image forming apparatuses 1000 and 1001a cooperate to generate the copy of the sheaf of the originals mixedly including the color and B/W originals. Here, the processes include the sheet output process of the image forming apparatus 1000 setting the sheet on the inserter, and the insert process of the image forming apparatus 1001a using the inserter.

In the present embodiment, the sheet output process of the image forming apparatus 1000 for setting the sheet on the inserter will be emphatically explained later.

In consideration of the basic flow of the series of processes, for example, a case where one sheaf of five originals that the first, third and fifth pages are the color originals and the second and fourth pages are the B/W originals is subjected to the image forming to generate three copies will be explained. For example, in the case where the image forming apparatus 1001*a* is used as the apparatus actually performing the insert process in addition to the image forming apparatus 1000 of the present embodiment, when the setting of the insert output mode is performed on the operation unit 40 of the image forming apparatus 1000 of the present embodiment, the user performs the setting on the side of the image forming apparatus 1000 in consideration of the processes later performed on the side of the image forming apparatus 1001*a*. For example, since the inserter 104*a* of the image forming apparatus 1001*a* is the type having one inserter bin, the information concerning such a fact is input from the operation unit 40 in the setting of the insert output mode. At this time, the user also sets the number of output copies, and depresses the copy start key. Thus, the image forming apparatus 1000 generates the three sheaves of the sheets each composed of the sheet on which the color image of the first page was formed, the sheet on which the color image of the third page was formed, and the sheet on which the color image of the fifth page was formed, and stores them in the same tray of the sheet discharge bin 30. Namely, the nine sheets (p1, p3, p5, p1, p3, p5, p1, p3, p5) are stored in one sheet discharge bin.

Then, the user takes the nine sheets from the one sheet discharge bin and sets them as the insert sheets in the inserter bin 20 of the image forming apparatus 1001*a* in the state that the first page thereof is uppermost and faceup. At that time, the user also sets the sheaf of the originals on the original stacking tray 50 of the image forming apparatus 1000 to the original tray 52*a* of the image forming apparatus 1001*a*. Then, the user performs, on the operation unit 40*a* of the image forming apparatus 1001*a*, the setting for causing the image forming apparatus 1001*a* to perform the process using the inserter 104*a*, and then depresses the copy start key.

Thus, the image forming apparatus 1001*a* performs the color and B/W discrimination process for the sheaf of the originals from the first page in due order. When the discrimination is performed for the first, third and fifth pages of the sheaf, since the discriminated results indicate the color originals, the image forming is not performed, and thus the sheet is fed from the inserter bin 20. When the discrimination is performed for the second and fourth pages of the sheaf, since the discriminated results indicate the B/W originals, the image forming is performed. Thus, the sheaf of one set of the sheets consisting of p1 (color), p2 (B/W), p3 (color), p4 (B/W) and p5 (color) is discharged to the sheet discharge unit. By repeating such the series of processes three times, the sheaves of three sets of the sheets are discharged.

In the above, one example that the image forming apparatus 1000 of the present embodiment and the image forming apparatus 1001*a* cooperate to generate the copy of the sheaf of the originals mixedly including the color and B/W originals was explained. Next, an example that the image forming apparatus 1000 of the present embodiment and the image forming apparatus 1001*b* cooperate to generate the copy of the sheaf of the originals mixedly including the color and B/W originals will be explained.

First, when the setting of the insert output mode is performed on the operation unit 40 of the image forming apparatus 1000 of the present embodiment, the user performs the setting on the side of the image forming apparatus 1000 in consideration of the processes later performed on the side of the image forming apparatus 1001*b*. For example, since the inserter 104*b* of the image forming apparatus 1001*b* is the type having three inserter bins, the information concerning such a fact is input from the operation unit 40 in the setting of the insert output mode. At this time, the user also sets the number of output copies, and depresses the copy start key. Thus, for example, the image forming apparatus 1000 discharges the three sheets on which the color image of the first page of the sheaf of the originals was formed to the first bin of the sheet discharge unit 30, discharges the three sheets on which the color image of the third page of the sheaf was formed to the second bin of the sheet discharge unit 30, and discharges the three sheets on which the color image of the fifth page of the sheaf was formed to the third bin of the sheet discharge unit 30. Namely, the sheets p1, p1 and p1 are discharged to the first bin, the sheets p3, p3 and p3 are discharged to the second bin, and the sheets p5, p5 and p5 are discharged to the third bin.

Then, the operation on the side of the image forming apparatus 1001*b* is performed. First, the user sets the sheaf of the three sheets being the color copies of the originals p1, p1 and p1 in the first bin of the sheet discharge unit 30 of the image forming apparatus 1000 to the first inserter bin 20 of the image forming apparatus 1001*b* as the insert sheets in the state that the first page thereof is uppermost and faceup. The user sets the sheaf of the three sheets being the color copies of the originals p3, p3 and p3 in the second bin of the sheet discharge unit 30 of the image forming apparatus 1000 to the second inserter bin 20 of the image forming apparatus 1001*b* in the similar state. The user sets the sheaf of the three sheets being the color copies of the originals p5, p5 and p5 in the third bin of the sheet discharge unit 30 of the image forming apparatus 1000 to the third inserter bin 20 of the image forming apparatus 1001*b* in the similar state.

At that time, the user also sets the sheaf of the originals on the original stacking tray 50 of the image forming apparatus 1000 to an original tray 52*b* of the image forming apparatus 1001*b*. Then, the user performs, on an operation unit 40*b* of the image forming apparatus 1001*b*, the setting for causing the image forming apparatus 1001*b* to perform the process using the inserter 104*b*, and then depresses the copy start key.

Thus, the image forming apparatus 1001*b* performs the color and B/W discrimination process for the sheaf of the originals from the first page in due order. When the discrimination is performed for the first page of the sheaf, since the discriminated result indicates the color original, the image forming is not performed, and thus the sheet is fed by one from the first inserter bin 20. When the discrimination is performed for the second page of the sheaf, since the discriminated result indicates the B/W original, the image forming of the original p2 is performed. When the discrimination is performed for the third page of the sheaf, since the discriminated result indicates the color original, the image forming is not performed, and thus the sheet is fed by one from the second inserter bin 20. When the discrimination is performed for the fourth page of the sheaf, since the discriminated result indicates the B/W original, the image forming of the original p4 is performed. When the discrimination is performed for the fifth page of the sheaf, since the discriminated result indicates the color original, the image forming is not performed, and thus the sheet is fed by one from the third inserter bin 20. Thus, the sheaf of one set of the sheets consisting of p1 (color), p2 (B/W), p3 (color), p4 (B/W) and p5 (color) is discharged to the sheet discharge unit. By repeating such the series of processes three times, the sheaves of three sets of the sheets are discharged.

As explained in the example of the cooperation of the image forming apparatus 1000 and the image forming apparatus 1001*a* having the one-bin inserter 104*a* and the example of the cooperation of the image forming apparatus 1000 and the image forming apparatus 1001*b* having the three-bin inserter 104*b*, according to the present embodiment, it is possible on the side of the image forming apparatus 1000 to perform the image forming and sorting processes suitable for the inserter actually used. Namely, the processes that the inserter of what function in what type is used in the following operation is considered can be performed on the side of the apparatus 1000. For example, the process of performing the image forming only to the color pages in the sheaf of the originals, the process of outputting the sheets in the order of p1, p3, p5, p1, p3, p5, p1, p3, p5 and discharging the continuous color pages to the same sheet discharge bin, the process of outputting the sheets in the order of p1, p1, p1, p3, p3, p3, p5, p5, p5 and discharging the same color pages to one bin, and the like can be performed. Thus, it is possible to increase operability when the user sets the insert sheet output from the side of the image forming apparatus 1000 to the inserters of the image forming apparatuses 1001*a* and 1001*b*, whereby erroneous setting of the insert sheet to the inserter, erroneous operations and the like can be prevented.

On the operation screen of FIG. 4 displayed on the display panel of the operation unit 40 disposed on the image forming apparatus 1000 of the present embodiment, when the software key (the sheet discharge processing key 625) is depressed by the user, the displayed content is changed to that on the operation screen of FIG. 5. The operation screen of FIG. 5 is the initial operation screen for setting the sheet discharge process. On this initial operation screen, a sort key 632' which is used to set a sort mode, a stapling sort key 633' which is used to set a mode for performing a stapling process to the sheaf of the sorted and output sheets, a group key 634 which is used to set a group mode for discharging the sheets copying-processed and output based on one original to one stacking bin 31, an insert sheet making mode key 642 for setting the insert output mode, and the like are displayed. When the insert sheet making mode key 642 is depressed, the insert output mode is selected, whereby a one-bin inserter key 643, a three-bin inserter key 644 and a five-bin inserter key 645 which are used to designate the kind of inserter can be selected exclusively. For example, in FIG. 38B, when the insert process using the inserter 104*a* of the image forming apparatus 1001*a* is performed later, the one bin inserter key 643 is selected. When the insert process using the inserter 104*b* of the image forming apparatus 1001*b* is performed, the three bin inserter key 644 is selected. It should be noted that these keys for setting the sheet discharge processing modes are selectable exclusively, and the sheet discharge processing mode is selectable in each mode. Further, a cancel key 636 and an OK key 637 are displayed. The cancel key 636 is used to cancel the setting of the sheet discharge processing mode, and the OK key 637 is used to establish the setting item selected on the operation screen.

In the present embodiment, it is possible to set the insert output mode that only the color originals are read from the sheaf of the originals, the read color image is formed on the sheet, and this sheet is output as the insert sheet to be set to the inserter. The insert output mode is selected by depressing the insert sheet making mode key 642. On the operation screen of FIG. 5, when any one of the one-bin inserter key 643, the three-bin inserter key 644 and the five-bin inserter key 645 is depressed, the kind of inserter is selected, whereby the number of the storable sheets or the numeral according to the selected kind of inserter is selected and set.

For example, in the case where one sheaf of the five originals that the first, third and fifth pages are the color originals and the second and fourth pages are the B/W originals is subjected to the image forming to generate three copies, when the image forming apparatus 1001*a* is used as the apparatus actually performing the insert process in addition to the image forming apparatus 1000 of the present embodiment, the insert sheet making mode key 642 is depressed by the user on the operation screen of FIG. 5, and the one-bin inserter key 643 is depressed. Thus, the image forming for the parts corresponding to the B/W pages in the sheaf of the originals is inhibited, while the image forming for only the originals p1, p3 and p5 corresponding to the color pages is performed, the sheets are output in the order of p1, p3, p5, p1, p3, p5, p1, p3, p5, and these sheets are all discharged to the first bin of the sheet discharge unit 30. As above, according as the one-bin inserter key 643 is selected, it is possible to execute the mode that the sheets are sorted such that the sheets of different (but successive) pages directed to a first-type image are selected from the series of originals having plural pages and sequentially stored in one stacking unit (this mode corresponding to an F mode described later).

Further, for example, when the image forming apparatus 1001*b* is used as the apparatus actually performing the insert process in addition to the image forming apparatus 1000 of the present embodiment, the insert sheet making mode key 642 is depressed by the user on the operation screen of FIG. 5, and the three-bin inserter key 644 is depressed. Thus, the image forming for the parts corresponding to the B/W pages in the sheaf of the originals is inhibited, while the image forming for only the originals p1, p3 and p5 corresponding to the color pages is performed, the sheets of p1, p1, p1 are discharged to the first bin of the sheet discharge unit, the sheets of p3, p3, p3 are discharged to the second bin of the sheet discharge unit, and the sheets of p5, p5, p5 are discharged to the third bin of the sheet discharge unit. Further, according to the user's setting, the number of originals or the like, the sheets are sorted such that the sheets p1, p3 and p5 are discharged to the first, second and third bins respectively. As above, according as the three-bin inserter key 644 is selected, it is possible to execute the mode that the sheets are sorted such that the sheets of the same page directed to the first-type image are selected in the series of originals having plural pages and sequentially stored in one stacking unit (this mode corresponding to an S mode described later).

Figure 6:
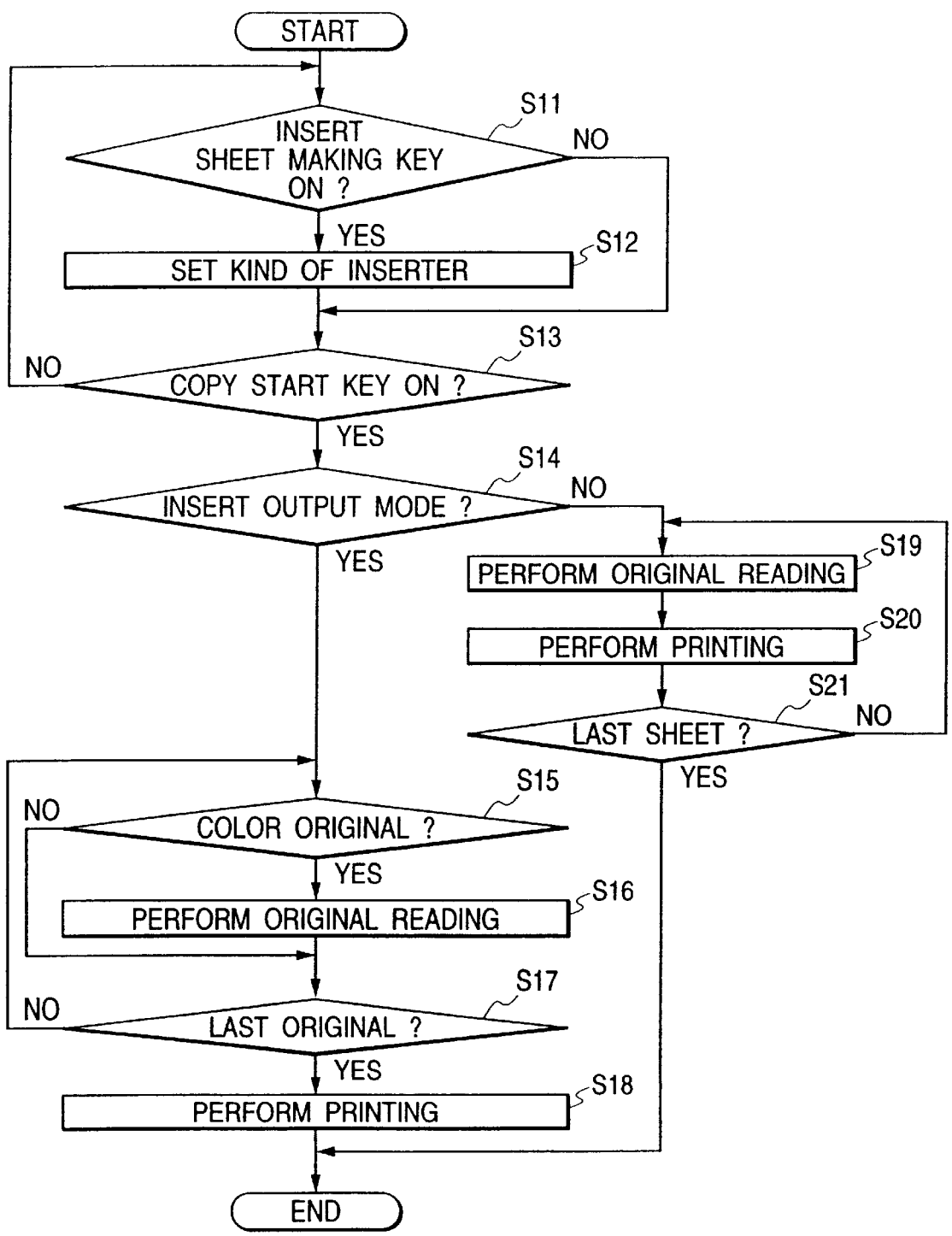
FIG. 6 is a flow chart showing a procedure of an insert output mode in the copying machine of FIG. 1.

Next, the insert output mode will be explained with reference to FIG. 6. FIG. 6 is a flow chart showing the procedure of the insert output mode in the copying machine of FIG. 1. This insert output mode is controlled by the CPU circuit unit 200.

First, it is judged in a step S11 whether or not the insert sheet making mode key 642 is depressed. If judged that the key 642 is depressed, the flow advances to a step S12 to select the kind of inserter according as any one of the one-bin inserter key 643, the three-bin inserter key 644 and the five-bin inserter key 645 is depressed, whereby the insert output mode is set. Then, the flow advances to a step S13 to wait for the depression of the start key 614. Conversely, if judged in the step S11 that the insert sheet making mode key 642 is not depressed, the flow skips over the step S12 and advances to the step S13 to wait for the depression of the start key 614.

If the start key 614 is depressed, the flow advances to a step S14 to judge whether or not the insert output mode is set. If judged that the insert output mode is not set, the copying machine is considered to perform an ordinary copying operation, and the flow advances to a step S19. In this step, the original p is carried one by one in due order from the original stacking tray 50 to the original mounting board glass 78, and the carried original is read. In a next step S20, the image forming of the read original is performed, and it is judged in a step S21 whether or not the image forming of the last original ends. If judged that the image forming of the last original does not end, the flow returns to the step S19 to read the next original. Conversely, if judged in the step S21 that the image forming of the last original ends, the process ends. When an image forming mode other than the insert output mode is selected, it is permitted to perform the image forming for all pages of the original set on the original stacking tray 50. Namely, it is permitted to print all the pages of the sheaf of the originals mixedly including the color and B/W originals. When the insert output mode is selected, it is inhibited to perform the image forming for all the pages, whereby the printing for only one of the two types of originals (i.e., the color original and the B/W original) is performed, but the printing for the other type of original is inhibited. In the present embodiment, only the color pages of the originals mixedly including the color and B/W originals are printed, but the B/W pages thereof are not printed.

On the other hand, if judged in the step S14 that the insert output mode is set, the flow advances to a step S15 to start feed of the original from the ADF 51 and judge in response to the output from the original discrimination sensor provided on the ADF 51 whether or not the fed original is a color original. If judged that the fed original is the color original, this original is considered to be read, and the flow advances to a step S16 to read the image of this original and store it in a memory. Then, the flow advances to a step S17 to judge whether or not the reading of the last original ends. If judged that the reading of the last original does not end, the flow returns to the step S15 to start feed of the next original and judge whether or not the fed original is a color original. Conversely, if judged that the reading of the last original ends, the flow advances to a step S18 to read the images from the memory in due order and form the read images on the respective sheets. In the insert output mode, only the pages corresponding to the color originals in the sheaf of the originals set on the original stacking tray 50 are subjected to the image forming, but the image forming for the pages corresponding to the B/W originals is inhibited. In this case, the image forming corresponding to the number of the storable sheets or the numeral according to the selected kind of inserter is performed. Then, the process ends.

In the insert output mode of the present embodiment, it is controlled to perform the image forming only to the color pages of the originals mixedly including the color and B/W originals but not to perform the image forming to the B/W pages. This is because the image forming apparatus 1000 of the present embodiment is the image forming apparatus which has the color image forming unit capable of forming a color image on a sheet. Therefore, in a case where the image forming apparatus which has the B/W image forming unit forming a B/W image on a sheet is applied as another form, it may be controlled in the step S15 of FIG. 6 that the flow advances to the step S17 if the original is judged to be the color original, while the flow advances to the step S16 if the original is judged to be the B/W original. Then, in the step S18, it may be controlled that the B/W image forming is performed for the originals corresponding to the B/W pages. Thus, the present invention is applicable to the B/W image forming apparatus. It should be noted that either one of these two types of originals can be subjected to the printing from the operation unit irrespective of the attribute of the image forming unit.

As described above, according to the present embodiment, it is possible to obtain the sheet output used as the insert sheet suitable for the inserter without delay.

In the present embodiment, the insert output mode to discriminate only the color originals from the originals mixedly including the color and B/W originals and read the discriminated color originals was explained. However, it is needless to say that an insert output mode to read only the B/W originals can be set, and each of these two types of insert output modes can be selected and set.

Second Embodiment

Figure 7:
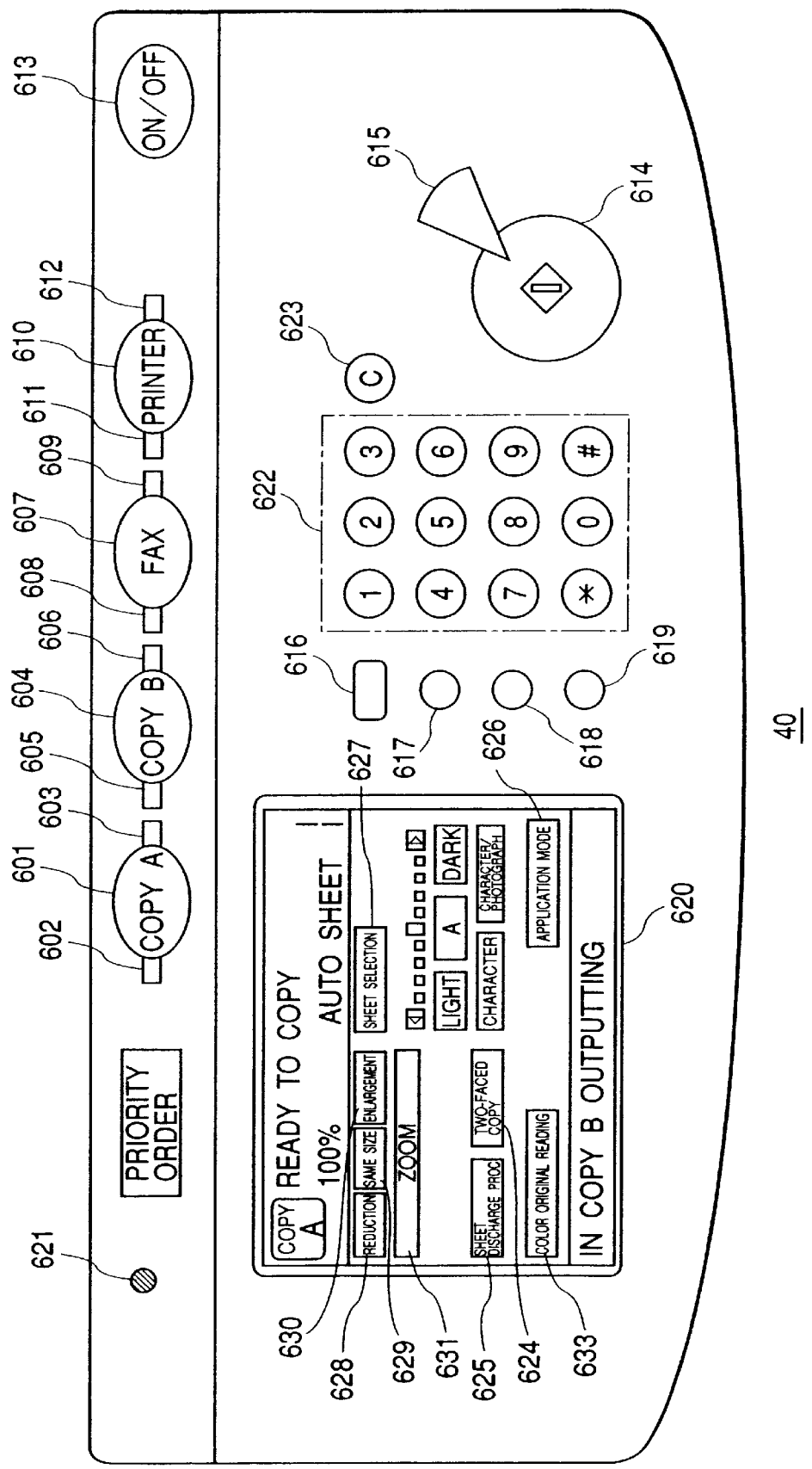
FIG. 7 is a diagram showing the outer structure of the operation unit in an image forming apparatus according to the second embodiment of the present invention.
Figure 8:
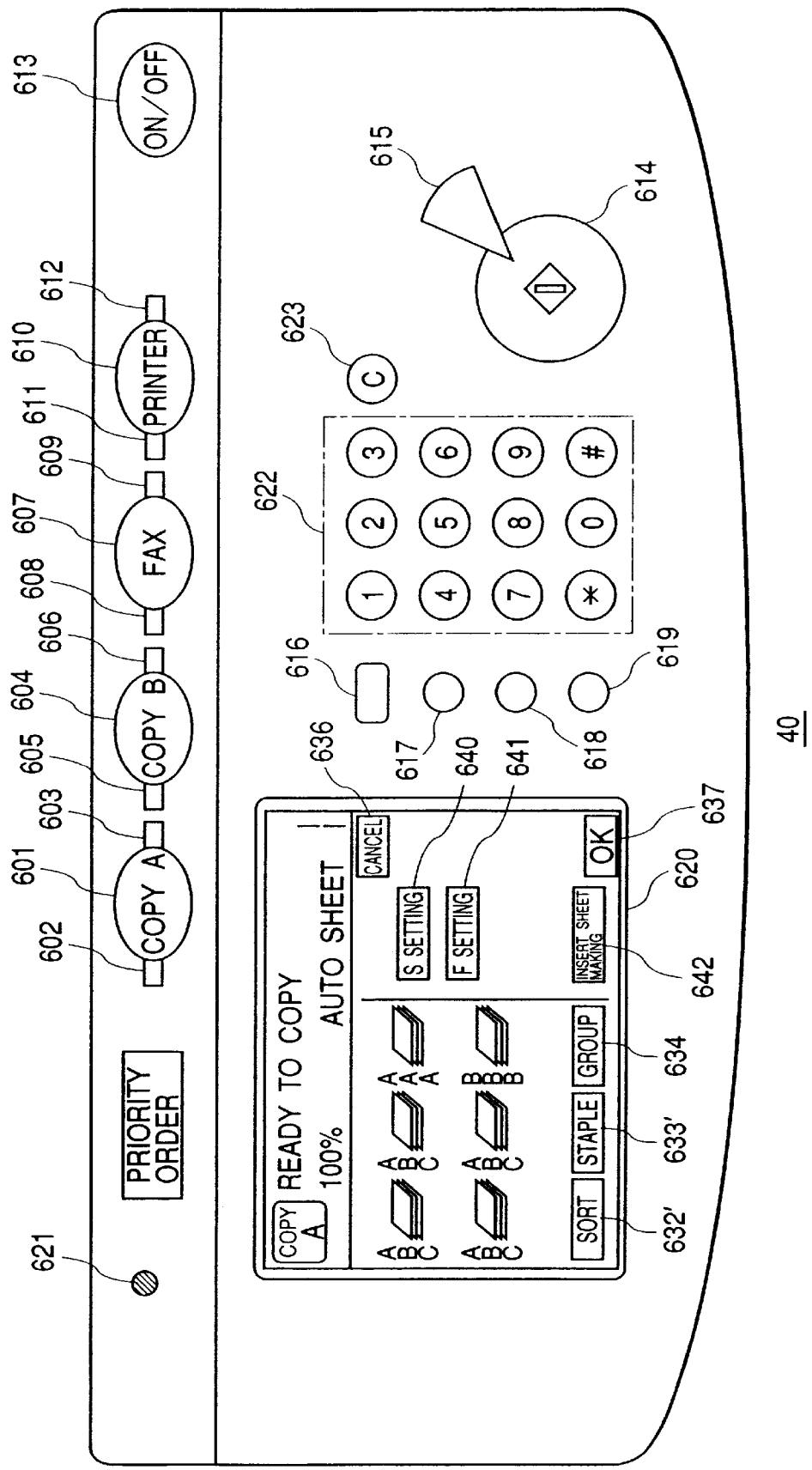
FIG. 8 is a diagram showing a sheet discharge mode selection screen in an insert output mode displayed on the operation unit shown in FIG. 7.

Next, the second embodiment of the present invention will be explained with reference to FIGS. 7, 8, 9, 10, 11, 12A, 12B and 12C. FIG. 7 is a diagram showing the outer structure of the operation unit in an image forming apparatus according to the second embodiment, FIG. 8 is a diagram showing a sheet discharge mode selection screen in the insert output mode displayed on the operation unit of FIG. 7, FIGS. 9 to 11 are flow charts showing a procedure of the insert output mode in the image forming apparatus according to the second embodiment, and FIGS. 12A, 12B and 12C are diagrams showing an example of sheet discharge based on the insert output mode in the image forming apparatus according to the second embodiment.

The second embodiment differs from the first embodiment in the point that either one of an S mode (a first sheet discharge mode) and an F mode (a second sheet discharge mode) can be selected and set. Here, in the S mode, a kind of inserter is first input, the number of copies of the sheets to be output in the insert output mode is set according to the input kind of inserter, and then the sheets S which correspond to the same page and the number of which corresponds to the set number of copies are sorted and output to one stacking bin 31 of the bin unit 5 in due order. Further, in the F mode, the sheets S of the set number of copies are sorted and output to each stacking bin 31 in the unit of the number of copies. It should be noted that, like the first embodiment, in the insert output mode of the present embodiment, only the color original is read, and the sheet on which the image of only the read color original was formed is output as the insert sheet.

Further, in the present embodiment, as shown in FIG. 7, an operation unit 40 which has substantially the same key arrangement as that of the operation unit of the first embodiment is provided, but any B/W original reading key is not provided as a software key in an LCD 620 of this operation unit 40. In any case, the present embodiment basically has the same structure as that of the first embodiment, whereby the explanation thereof will be omitted.

In the present embodiment, when a sheet discharge processing key (software key) 625 is depressed on the operation screen shown in FIG. 7, as described in the first embodiment, the initial operation screen of FIG. 5 for setting the sheet discharge process is displayed. On this initial operation screen, when the insert sheet making mode key 642 is depressed, the insert output mode is selected, whereby the one-bin inserter key 643, the three-bin inserter key 644 and the five-bin inserter key 645 which are used to designate the kind of inserter can be selected exclusively. When one of the one-bin inserter key 643, the three-bin inserter key 644 and the five-bin inserter key 645 is depressed, the kind of inserter is selected, whereby the number of output copies according to the selected kind of inserter (i.e., the number of the storable sheets in the F mode, and the numeral in the S mode) is selected and set. When the setting of the items is determined or established on this operation screen, this screen is changed to the operation screen shown in FIG. 8.

On the operation screen shown in FIG. 8, a software key 640 used to select the S mode and a software key 641 used to select the F mode are displayed. Thus, when either one of the keys 640 and 641 is selected, the corresponding mode is set.

Here, the S mode and the F mode will be explained in detail. In the S mode, the sheets S of the same page in the sheets of the number of copies set according to the kind of inserter are output to one stacking bin 31. For example, it is assumed that, in a sheaf of originals which mixedly include the originals on which color images were formed respectively and the originals on which B/W images were formed respectively, there are the five originals corresponding to color pages, and the set number of output copies is six. In this case, as shown in FIG. 12A, six sheets on which the color image corresponding to the first color original in the sheaf of the originals mixedly including the color and B/W originals was formed respectively are output to the bin #1, six sheets on which the color image corresponding to the second color original in the sheaf of the originals mixedly including the color and B/W originals was formed respectively are output to the bin #2, six sheets on which the color image corresponding to the third color original in the sheaf of the originals mixedly including the color and B/W originals was formed respectively are output to the bin #3, six sheets on which the color image corresponding to the fourth color original in the sheaf of the originals mixedly including the color and B/W originals was formed respectively are output to the bin #4, and six sheets on which the color image corresponding to the fifth color original in the sheaf of the originals mixedly including the color and B/W originals was formed respectively are output to the bin #5. Here, it is inhibited to perform the image forming for the pages corresponding to the B/W originals in the sheaf of the originals mixedly including the color and B/W originals, in the insert output mode.

In the F mode, the sheets S of the set number of copies are sorted and output to each stacking bin 31 in the unit of the number of copies. For example, it is assumed that, in a sheaf of originals which mixedly include the originals on which color images were formed respectively and the originals on which B/W images were formed respectively, there are the five originals corresponding to color pages, and the set number of output copies is five. In this case, as shown in FIG. 12B, a sheaf (of the first copy) of the five sheets on which the first to fifth color images in the sheaf of the originals mixedly including the color and B/W originals were formed respectively are output to the bin #1. Similarly, a sheaf (of the second copy) of the five sheets on which the first to fifth color images in the sheaf of the originals mixedly including the color and B/W originals were formed respectively are output to the bin #2, a sheaf (of the third copy) of the five sheets on which the first to fifth color images in the sheaf of the originals mixedly including the color and B/W originals were formed respectively are output to the bin #3, a sheaf (of the fourth copy) of the five sheets on which the first to fifth color images in the sheaf of the originals mixedly including the color and B/W originals were formed respectively are output to the bin #4, and a sheaf (of the fifth copy) of the five sheets on which the first to fifth color images in the sheaf of the originals mixedly including the color and B/W originals were formed respectively are output to the bin #5. In the F mode, the number of copies of the sheaf of the sheets for one bin can be changed according to the number of the stacking bins 31. For example, it is assumed that, in a sheaf of originals which mixedly include the originals on which color images were formed respectively and the originals on which B/W images were formed respectively, there are the five originals corresponding to color pages, the set number of output copies is four, and the number of usable bins is two. In this case, as shown in FIG. 12C, a sheaf (of the first copy) of the five sheets on which the first to fifth color images in the sheaf of the originals were formed respectively and a sheaf (of the second copy) of the five sheets on which the first to fifth color images in the sheaf of the originals were formed respectively are output to the bin #1. Similarly, a sheaf (of the third copy) of the five sheets on which the first to fifth color images in the sheaf of the originals were formed respectively and a sheaf (of the fourth copy) of the five sheets on which the first to fifth color images in the sheaf of the originals were formed respectively are output to the bin #2.

Figure 38C:
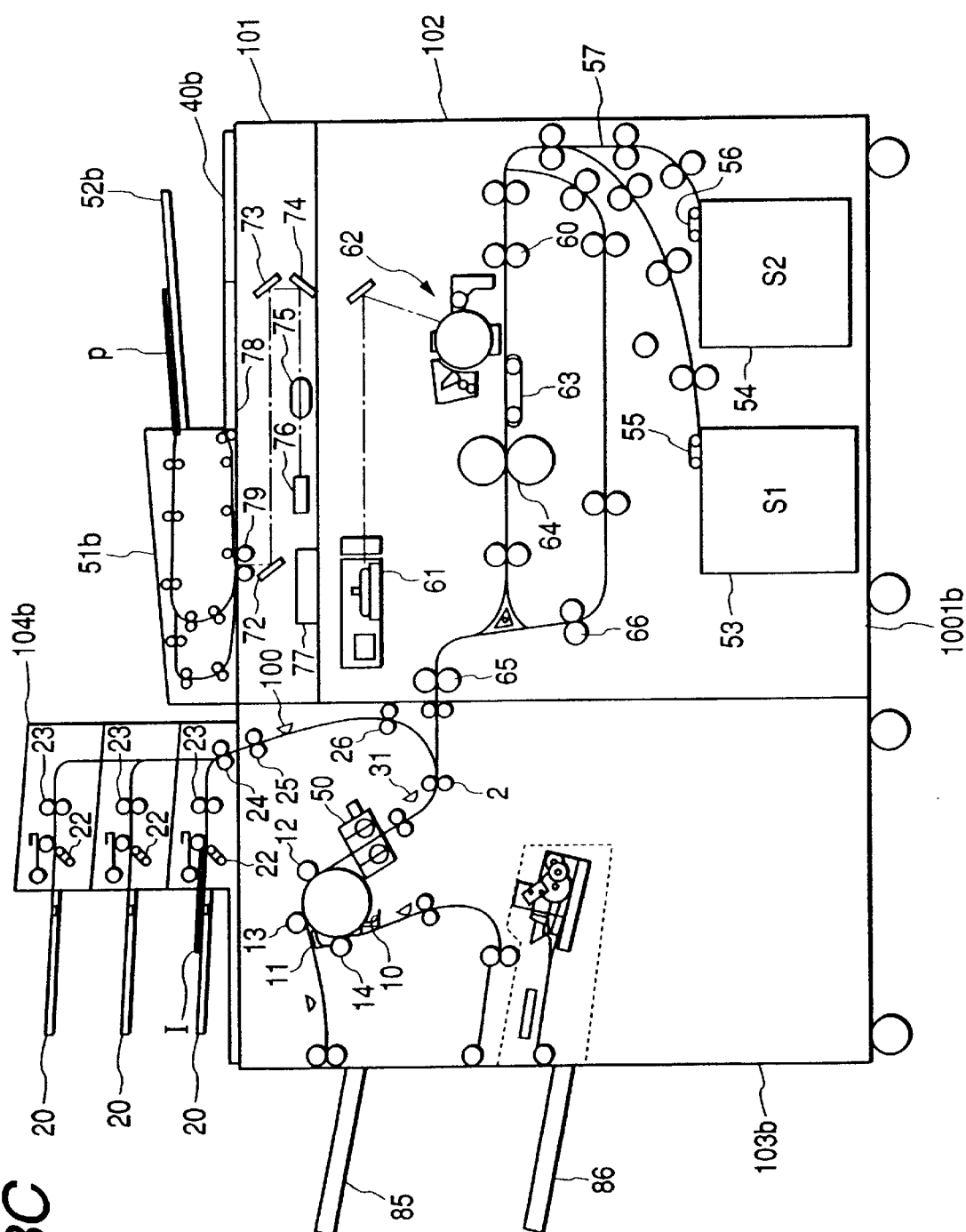

Next, it will be explained with reference to FIGS. 38A to 38C how the color outputs being the insert sheets output in the S mode are subjected to the insert process in the apparatus having the inserter.

For example, it is assumed that, in a sheaf of originals which mixedly include the originals on which color images were formed respectively and the originals on which B/W images were formed respectively, there are the three originals corresponding to color pages, and the set number of output copies is three. In this case, when the insert output process is performed in the S mode, three sheets on which the color image corresponding to the first color original in the sheaf of the originals mixedly including the color and B/W originals was formed respectively are discharged to the stacking bin #1 of the sheet discharge unit 30, three sheets on which the color image corresponding to the second color original in the sheaf of the originals mixedly including the color and B/W originals was formed respectively are discharged to the stacking bin #2 of the sheet discharge unit 30, and three sheets on which the color image corresponding to the third color original in the sheaf of the originals mixedly including the color and B/W originals was formed respectively are discharged to the stacking bin #3 of the sheet discharge unit 30.

Then, the sheaf of the three sheets on which the color images were formed stored in the stacking bin #1 of the sheet discharge unit 30 is set to the insert bin #1 of the inserter 104*b* of the image forming apparatus 1001*b*, the sheaf of the three sheets on which the color images were formed stored in the stacking bin #2 of the sheet discharge unit 30 is set to the insert bin #2 of the inserter 104*b* of the image forming apparatus 1001*b*, and the sheaf of the three sheets on which the color images were formed stored in the stacking bin #3 of the sheet discharge unit 30 is set to the insert bin #3 of the inserter 104*b* of the image forming apparatus 1001*b*. At this time, the originals p mixedly including the color and B/W originals on the original stacking tray 50 are set to the original tray 52*b* of the image forming apparatus 1001*b*. Then, when an insert processing mode is set on the operation unit 40*b*, the S mode is selected, and the copy start key is depressed. Thus, the image forming is performed to the pages corresponding to the B/W originals in the sheaf of the originals, but any image forming is not performed to the pages corresponding to the color originals. Instead, the color outputs are sequentially carried from the inserter 104*b*, and the color outputs and the B/W outputs are gathered. Incidentally, in the S mode, the sheets are fed from the inserter 104b in the following manner. Namely, after one sheet is fed from one insert bin, one sheet is fed from a next insert bin. In other words, the sheet feed origin is changed to the next insert bin every time one sheet is fed. When the sheet feed origin was changed to the last insert bin (at this time, feed of the first set of the insert sheets completely ends), the sheet feed origin is returned to the first insert bin to gather the second copy. The above operation is repeated certain times corresponding to the set number of copies. This is the sheet feed method from the inserter in the S mode to be performed on the side of the apparatus having the inserter.

Next, it will be explained with reference to FIGS. 38A to 38C how the color outputs being the insert sheets output in the F mode are subjected to the insert process in the apparatus having the inserter.

For example, it is assumed that, in a sheaf of originals which mixedly include the originals on which color images were formed respectively and the originals on which B/W images were formed respectively, there are the three originals corresponding to color pages, and the set number of output copies is three. In this case, when the insert output process is performed in the F mode, the sheaf (of the first copy) of three sheets being a series of insert sheets on which the color images corresponding to the first to third color originals in the sheaf of the originals mixedly including the color and B/W originals were formed respectively are discharged to the stacking bin #1 of the sheet discharge unit 30 of the image forming apparatus 1000. Similarly, the sheaf (of the second copy) of three sheets being a series of insert sheets on which the color images corresponding to the first to third color originals in the sheaf of the originals mixedly including the color and B/W originals were formed respectively are discharged to the stacking bin #2 of the sheet discharge unit 30, and the sheaf (of the third copy) of three sheets being a series of insert sheets on which the color images corresponding to the first to third color originals in the sheaf of the originals mixedly including the color and B/W originals were formed respectively are discharged to the stacking bin #3 of the sheet discharge unit 30.

Then, the sheaf of the three sheets on which the color images of the mutually different pages were respectively formed stored in the stacking bin #1 of the sheet discharge unit 30 is set by the user to the insert bin #1 of the inserter 104b of the image forming apparatus 1001b, the sheaf of the three sheets on which the color images of the mutually different pages were respectively formed stored in the stacking bin #2 of the sheet discharge unit 30 is set to the insert bin #2 of the inserter 104b of the image forming apparatus 1001b, and the sheaf of the three sheets on which the color images of the mutually different pages were respectively formed stored in the stacking bin #3 of the sheet discharge unit 30 is set to the insert bin #3 of the inserter 104b of the image forming apparatus 1001b. At this time, the originals p mixedly including the color and B/W originals on the original stacking tray 50 are set to the original tray 52b of the image forming apparatus 1001b. Then, when the insert processing mode is set on the operation unit 40b, the F mode is selected, and the copy start key is depressed. Thus, the image forming is performed to the pages corresponding to the B/W originals in the sheaf of the originals, but any image forming is not performed to the pages corresponding to the color originals. Instead, the color outputs are sequentially carried from the inserter 104b, and the color outputs and the B/W outputs are gathered. Incidentally, in the F mode, the sheets are fed from the inserter 104b in the following manner. Namely, after the three sheets are fed from one insert bin, the three sheets are fed from the next (second) insert bin, and then the three sheets are fed from the next (third) insert bin. In other words, until the series of insert sheets existing in one insert bin and to be gathered as one sheaf are entirely fed, it is controlled not to change the sheet feed origin to the next bin. Then, after the series of insert sheets were entirely fed, the sheet feed origin is changed to the next bin. However, in the F mode, as shown in FIG. 12C, when the plural serieses of insert sheets are stacked in one insert bin, it is controlled not to change the sheet feed origin to the next bin until all the sheets in the insert bin are fed. Then, after all the sheets in the insert bin were fed, the sheet feed origin is changed to the next insert bin. This is the sheet feed method from the inserter in the F mode to be performed on the side of the apparatus having the inserter.

Next, the insert output mode in the present embodiment will be explained with reference to FIGS. 9 to 11. It should be noted that the insert output mode is controlled by the CPU circuit unit 200.

Figure 9:
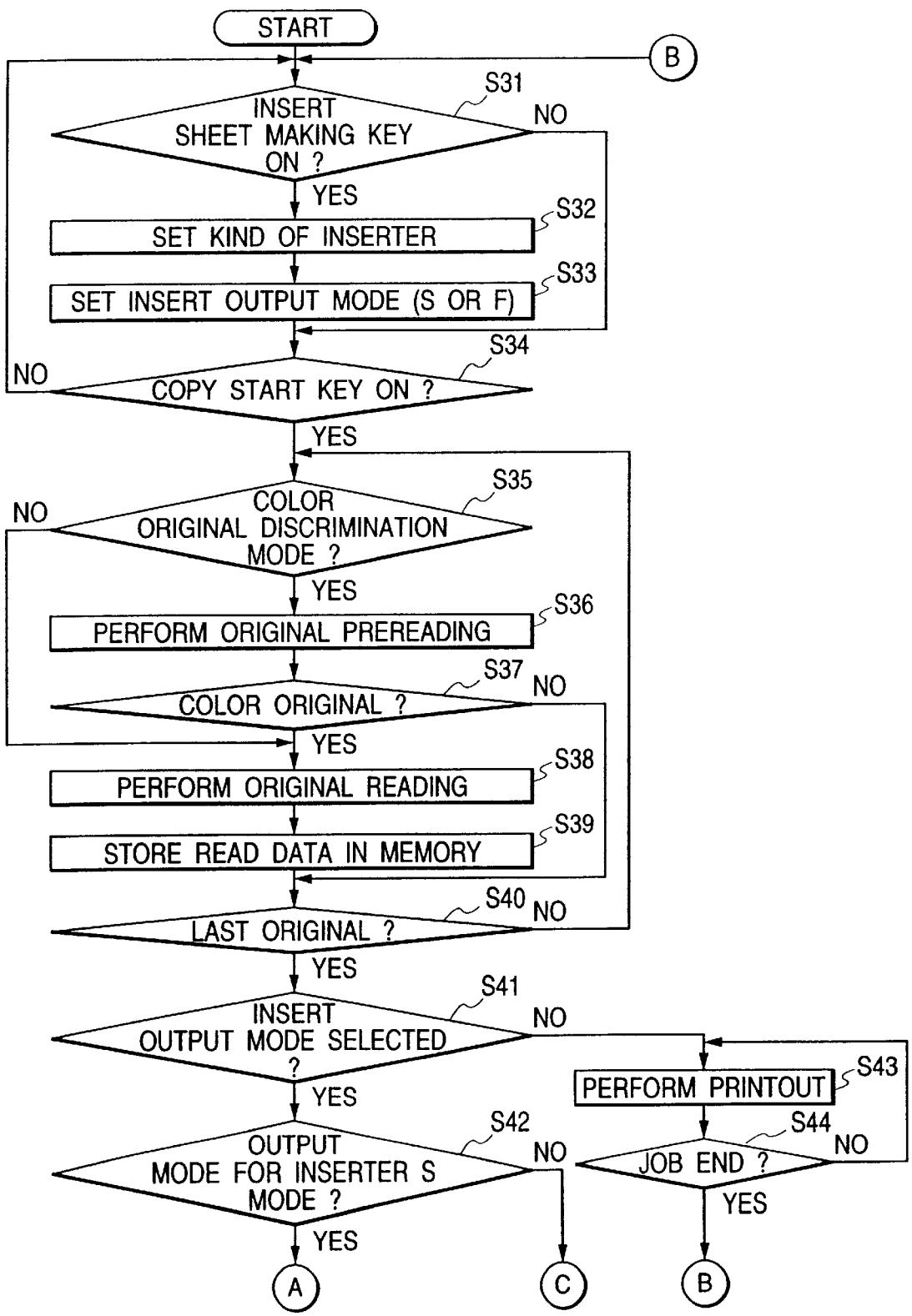
FIG. 9 is a flow chart showing a procedure of the insert output mode in the image forming apparatus according to the second embodiment of the present invention.
Figure 10:
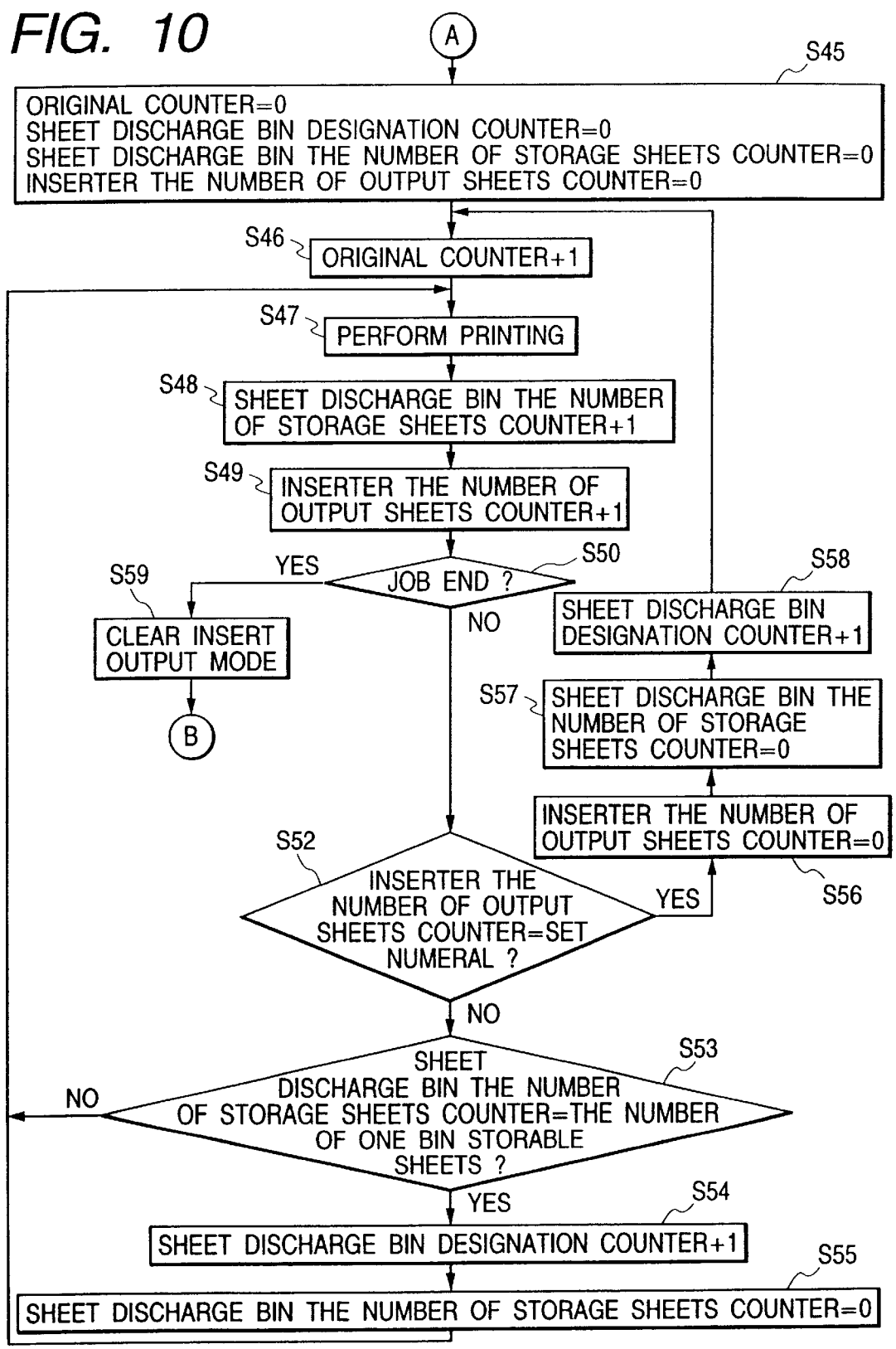
FIG. 10 is a flow chart showing the procedure of the insert output mode in the image forming apparatus according to the second embodiment of the present invention.

In FIG. 9, it is first judged in a step S31 whether or not the insert sheet making mode key 642 is depressed. If judged that the key 642 is depressed, the flow advances to a step S32 to select the kind of inserter according as any one of the one-bin inserter key 643, the three-bin inserter key 644 and the five-bin inserter key 645 is depressed, whereby the number of output copies according to the kind of inserter is set. Then, the flow advances to a step S33 to set the S mode or the F mode in the insert output mode according as either the software key 640 or 641 is depressed, whereby the insert output mode is set.

Next, the flow advances to a step S34 to wait for the depression of the start key 614. Conversely, if judged in the step S31 that the insert sheet making mode key 642 is not depressed, the flow skips over the steps S32 and S33 and advances to the step S34 to wait for the depression of the start key 614.

If the start key 614 is depressed, the flow advances to a step S35 to judge whether or not a color original discrimination mode is set. If judged that the color original discrimination mode is not set, the apparatus is considered to perform an ordinary copying operation, and the flow advances to a step S38. In this step, the original p is carried one by one in due order from the original stacking tray 50 to the original mounting board glass 78, and the carried original is read. In a next step S39, the image of the read original is stored in a memory. Then, it is judged in a step S40 whether or not the image forming of the last original ends. If judged that the image forming of the last original does not end, the flow returns to the step S35 to read the next original. Conversely, if judged in the step S40 that the image forming of the last original ends, the flow advances to a step S41.

Conversely, if judged in the step S35 that the color original discrimination mode is set, the flow advances to a step S36 to start feeding the original from the ADF 51 and perform original prereading. The original prereading is to judge in response to the output from the original discrimination sensor provided on the ADF 51 whether or not the fed original is a color original. If judged in a step S37 that the fed original is the color original, this original is considered to be read, and the flow advances to a step S38 to read the image of this original and store it in a memory in the step S39. Then, the flow advances to the step S40 to judge whether or not the reading of the last original ends. If judged that the reading of the last original does not end, the flow returns to the step S35. If judged in the step S37 that the fed original is not the color original, the flow skips over the steps S38 and S39 and advances to the step S40. Namely, the original which was judged in the step S37 to be not the color original is not subjected to the reading and is directly discharged. After the reading of the last original ended, the flow advances to the step S41.

It is judged in the step S41 whether or not the insert output mode is selected. If judged that the insert output mode is not selected, the flow advances to a step S43 to sequentially read the images stored in the memory, perform the image forming on the sheets, and output these sheets to the bin unit 5. Then, in a step S44, it is judged whether or not the job ends. If judged that the job does not end, the flow returns to the step S43. Conversely, if judged in the step S44 that the job ends, the flow returns to the step S31.

If judged in the step S41 that the insert output mode is set, the flow advances to a step S42 to judge whether or not the S mode is set. If judged that the S mode is set, the flow advances to a step S45 shown in FIG. 10. In the step S45, an original counter, a sheet discharge bin designation counter, a sheet discharge bin the number of storage sheets counter (i.e., the counter for counting the number of sheets stored in the sheet discharge bin) and an inserter the number of output sheets counter (i.e., the counter for counting the number of sheets output to the inserter) are all cleared and set to "0".

Next, the flow advances to a step S46 to perform increment of the original counter by "1", and further advances to a step S47 to perform the image printing for the original of the ordinal number corresponding to the value counted by the original counter. Then, the flow advances to a step S48 to perform increment of the sheet discharge bin the number of storage sheets counter by "1", and further advances to a step S49 to perform increment of the inserter the number of output sheets counter by "1".

Next, the flow advances to a step S50 to judge whether or not the job in the insert output mode ends. If judged that the job does not end, the flow advances to a step S52 to judge whether or not the value counted by the inserter the number of output sheets counter coincides with the set numeral (i.e., the number of output sheets determined according to the kind of inserter set in the step S32). If judged that the counted value does not coincide with the set numeral, the flow advances to a step S53 to judge whether or not the value counted by the sheet discharge bin the number of storage sheets counter coincides with the number of sheets storable in one bin. If judged that the value counted by the sheet discharge bin the number of storage sheets counter does not coincide with the number of sheets storable in one bin, the flow returns to the step S47 to continue the image printing for the original of the ordinal number corresponding to the value counted by the original counter.

On the other hand, if judged in the step S53 that the value counted by the sheet discharge bin the number of storage sheets counter coincides with the number of sheets storable in one bin, it is considered that the sheet on which the image printing for the original of the ordinal number corresponding to the value counted by the original counter was performed can not be stacked in the current stacking bin. Thus, the flow advances to a step S54 to perform increment of the sheet discharge bin designation counter by "1" to designate a next stacking bin. Then, in a step S55, the sheet discharge bin the number of storage sheets counter is cleared and set to "0", and the flow returns to the step S47.

If judged in the step S52 that the value counted by the inserter the number of output sheets counter coincides with the set numeral, the flow advances to a step S56 to clear and set the inserter the number of output sheets counter to "0", the flow advances to a step S57 to clear and set the sheet discharge bin the number of storage sheets counter to "0", the flow advances to a step S58 to perform increment of the sheet discharge bin designation counter by "1", and the flow returns to the step S46 to perform the printing for the image of the original of the next ordinal number.

If judged in the step S50 that the job ends, the flow advances to a step S59 to clear the insert output mode, and the flow returns to the step S31.

Figure 11:
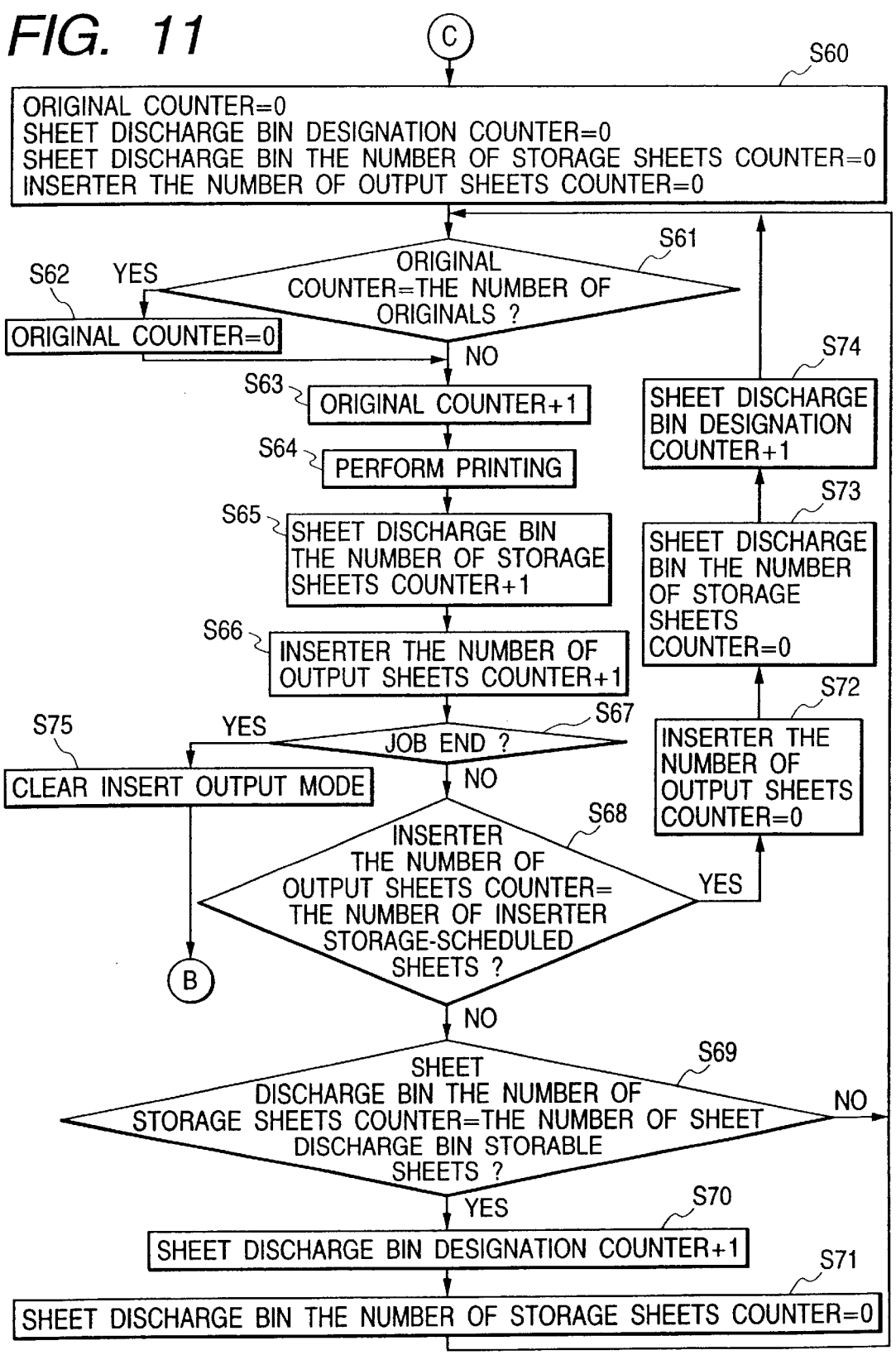
FIG. 11 is a flow chart showing the procedure of the insert output mode in the image forming apparatus according to the second embodiment of the present invention.
Figure 12A:
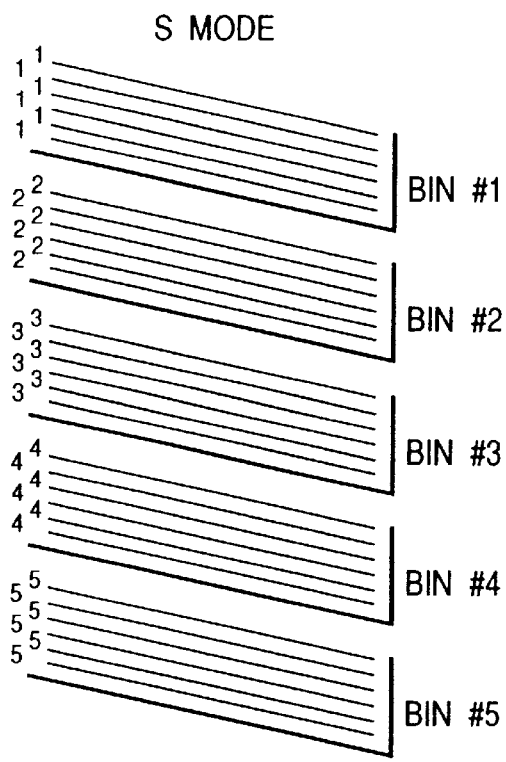
FIGS. 12A, 12B and 12C are diagrams showing an example of sheet discharge based on the insert output mode in the image forming apparatus according to the second embodiment of the present invention.
Figure 12B:
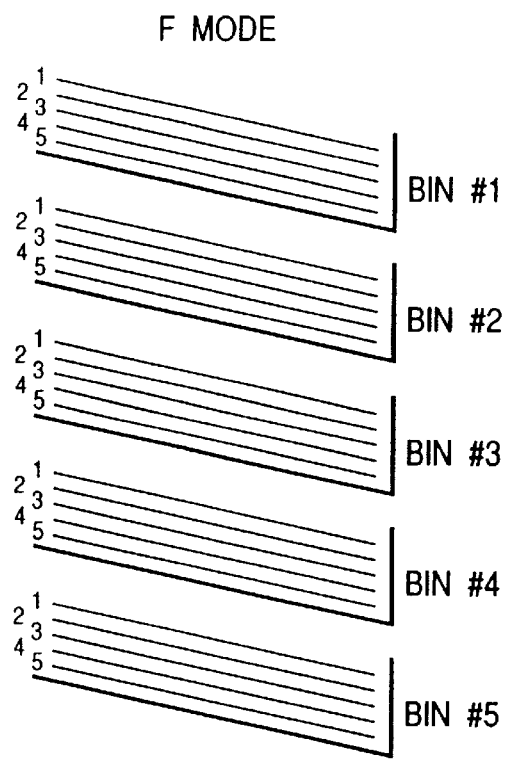
Figure 12C:
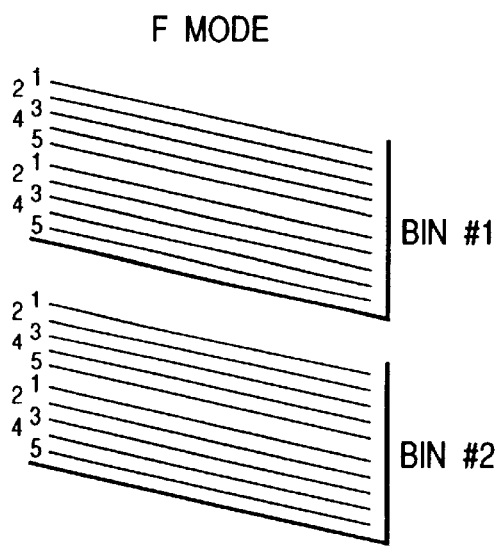

If judged in the step S42 that the F mode is set, the flow advances to a step S60 shown in FIG. 11. In the step S60, the original counter, the sheet discharge bin designation counter, the sheet discharge bin the number of storage sheets counter and the inserter the number of output sheets counter are respectively cleared and set to "0".

Next, the flow advances to a step S61 to judge whether or not the value counted by the original counter coincides with the number of originals. If judged that the counted value coincides with the number of originals, the flow advances to a step S62 to clear and set the original counter to "0", and the flow advances to a step S63. Conversely, if judged that the counted value does not coincide with the number of originals, the flow skips over the step S62 and advances to the step S63.

In the step S63, increment of the original counter is performed by "1", and in a next step S64, the image printing for the original of the ordinal number corresponding to the value counted by the original counter is performed. Then, the flow advances to a step S65 to perform increment of the sheet discharge bin the number of storage sheets counter by "1", and further advances to a step S66 to perform increment of the inserter the number of output sheets counter by "1".

Next, the flow advances to a step S67 to judge whether or not the job in the insert output mode ends. If judged that the job does not end, the flow advances to a step S68 to judge whether or not the value counted by the inserter the number of output sheets counter coincides with the number of inserter storage-scheduled sheets (i.e., the number of output sheets determined according to the kind of inserter set in the step S32). If judged that the counted value does not coincide with the number of inserter storage-scheduled sheets, the flow advances to a step S69 to judge whether or not the value counted by the sheet discharge bin the number of storage sheets counter coincides with the number of sheet discharge bin storable sheets. If judged that the counted value does not coincide with the number of sheet discharge bin storable sheets, the flow returns to the step S61 to continue the image printing for the original of the ordinal number corresponding to the value counted by the original counter.

On the other hand, if judged in the step S69 that the counted value coincides with the number of sheet discharge bin storable sheets, it is considered that the sheet on which the image printing for the original of the ordinal number corresponding to the value counted by the original counter was performed can not be stacked in the current stacking bin. Thus, the flow advances to a step S70 to perform increment of the sheet discharge bin designation counter by "1" to designate a next stacking bin. Then, in a step S71, the sheet discharge bin the number of storage sheets counter is cleared and set to "0", and the flow returns to the step S61.

If judged in the step S68 that the value counted by the inserter the number of output sheets counter coincides with the number of inserter storage-scheduled sheets, it is considered that the sheets of the predetermined number are output to one stacking bin, and the flow advances to a step S72 to clear and set the inserter the number of output sheets counter to "0", the flow advances to a step S73 to clear and set the sheet discharge bin the number of storage sheets counter to "0", the flow advances to a step S74 to perform increment of the sheet discharge bin designation counter by "1", and the flow returns to the step S61.

If judged in the step S67 that the job ends, the flow advances to a step S75 to clear the insert output mode, and the flow returns to the step S31.

As described above, according to the present embodiment, it is possible to obtain the sheet output used as the insert sheet suitable for the inserter without delay.

In the insert output mode of the present embodiment, it is controlled to perform the image forming only for the color pages in the originals mixedly including the color and B/W originals but not to perform the image forming for the B/W pages. This is because the image forming apparatus 1000 of the present embodiment is the image forming apparatus which has the color image forming unit capable of forming a color image on a sheet. Therefore, in a case where the image forming apparatus which has the B/W image forming unit forming a B/W image on a sheet is applied as another form, it may be controlled in a step S85 of FIG. 13 that the flow advances to a step S87 if the original is judged to be the color original, while the flow advances to a step S86 if the original is judged to be the B/W original. Then, in the step S89, it may be controlled that the B/W image forming is performed for the originals corresponding to the B/W pages. Thus, the present invention is applicable to the B/W image forming apparatus.

Third Embodiment

Figure 13:
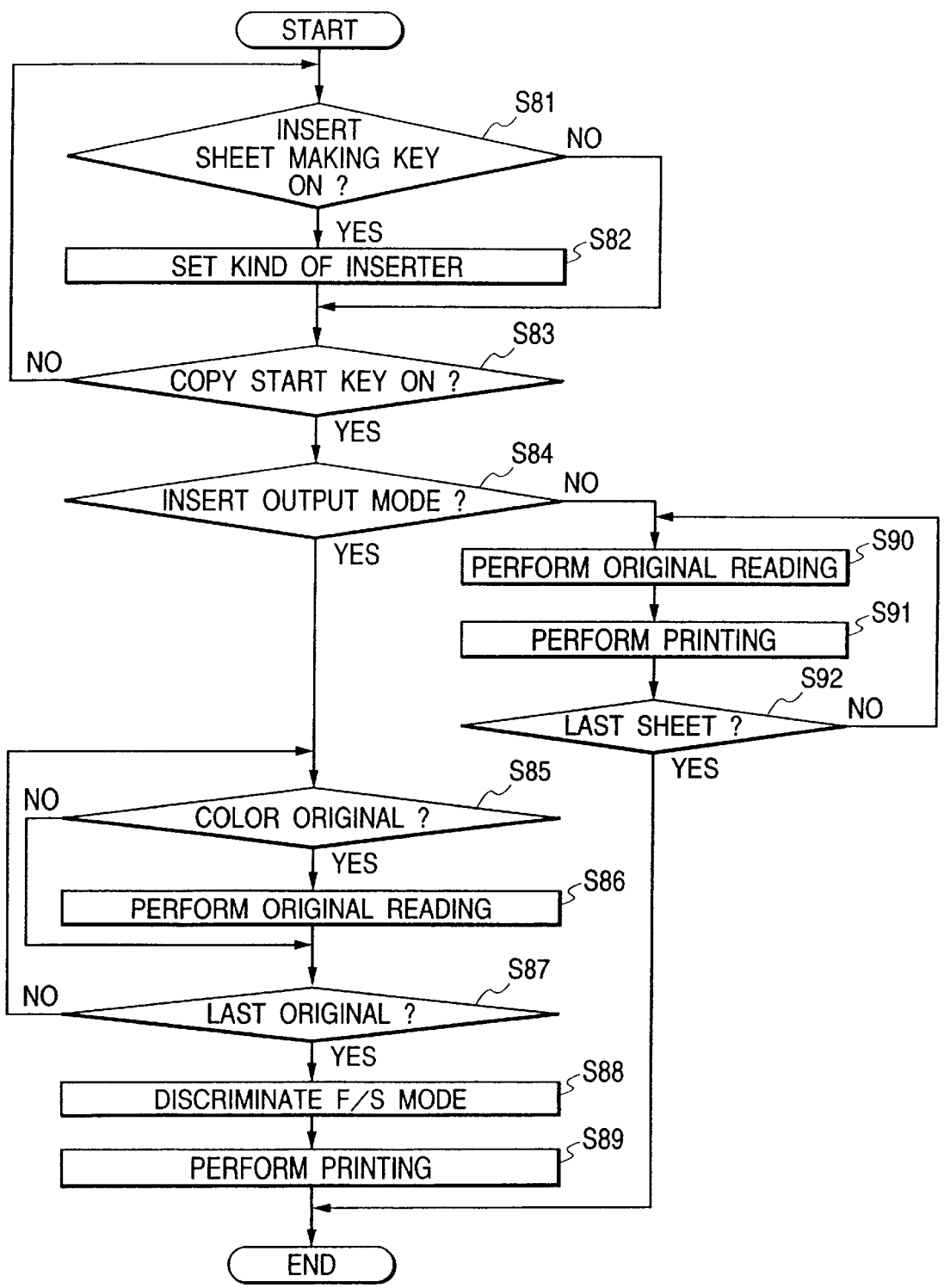
FIG. 13 is a flow chart showing the procedure of the insert output mode in the image forming apparatus according to the third embodiment of the present invention.
Figure 14:
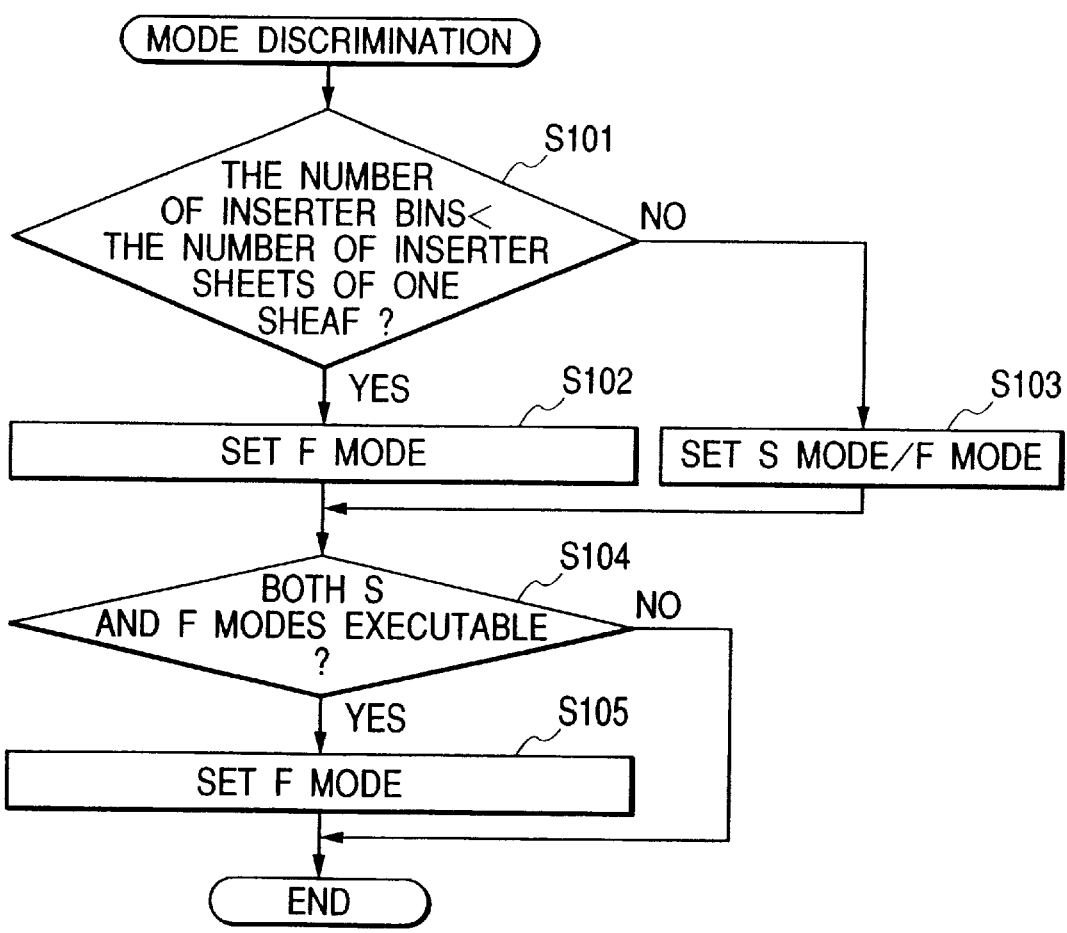
FIG. 14 is a flow chart showing the procedure of the F/S mode discrimination process in the step S88 of FIG. 13.

Next, the third embodiment of the present invention will be explained with reference to FIGS. 13 and 14. FIG. 13 is a flow chart showing the procedure of the insert output mode in the image forming apparatus according to the third embodiment of the present invention, and FIG. 14 is a flow chart showing the procedure of the F/S mode discrimination process in a step S88 of FIG. 13.

In the present embodiment, it is judged whether or not the S mode can be executed, on the basis of the number of read originals and the inserter tray number information obtained from the selected kind of inserter. If judged that the S mode can not be executed, the F mode is set. Conversely, if judged that the S mode can be executed, it is further judged whether or not both the S mode and the F mode can be executed. If judged that both the modes can be executed, the F mode is preferentially set.

It might be the following as the situation not to be able to execute the S mode. For example, in FIGS. 38A to 38C, in a sheaf of originals which mixedly include the originals on which color images were formed respectively and the originals on which B/W images were formed respectively, there are the three originals corresponding to color pages, and the set number of output copies is three. In this case, when the insert output process is performed in the S mode, the process in the S mode is performed as the insert process on the side of the apparatus having the inserter, whereby the inserter which has at least three inserter bins is necessary. Therefore, when the insert process is performed with use of the inserter 104a of the image forming apparatus 1001a, the S mode is unsuitable for the insert output mode on the side of the image forming apparatus 1000, whereby it is considered that the S mode can not be executed. On the other hand, when the insert process is performed with use of the inserter 104b of the image forming apparatus 1001b, since the inserter 104b has the three inserter bins, it is considered that the S mode can be executed as the insert output mode on the side of the image forming apparatus 1000. In the F mode, a series of insert sheets is stacked in one insert bin, and a gathering process can be performed in the state that the plural serieses of insert sheets are being stacked in one insert bin, whereby the F mode can be executed even if the inserter 104a of the image forming apparatus 1001a is used or the inserter 104b of the image forming apparatus 1001b is used. Therefore, it is permitted to execute the F mode as the insert output mode on the side of the image forming apparatus 1000.

The insert output mode will be explained with reference to FIGS. 13 and 14. It should be noted that the insert output mode is controlled by the CPU circuit unit 200. Here, the insert output mode to read only the color original will be explained.

In FIG. 13, it is first judged in a step S81 whether or not the insert sheet making mode key 642 is depressed. If judged that the key 642 is depressed, the flow advances to a step S82 to select the kind of inserter according as any one of the one-bin inserter key 643, the three-bin inserter key 644 and the five-bin inserter key 645 is depressed, whereby the insert output mode is set. Then, the flow advances to a step S83 to wait for the depression of the start key 614. Conversely, if judged in the step S81 that the insert sheet making mode key 642 is not depressed, the flow skips over the step S82 and advances to the step S83 to wait for the depression of the start key 614.

If the start key 614 is depressed, the flow advances to a step S84 to judge whether or not the insert output mode is set. If judged that the insert output mode is not set, the apparatus is considered to perform an ordinary copying operation, and the flow advances to a step S90. In this step, the original p is carried one by one in due order from the original stacking tray 50 to the original mounting board glass 78, and the carried original is read. In a next step S91, the image forming of the read original is performed, and it is judged in a step S92 whether or not the image forming of the last original ends. If judged that the image forming of the last original does not end, the flow returns to the step S90 to read the next original. Conversely, if judged that the image forming of the last original ends, the process ends.

If judged in the step S84 that the insert output mode is set, the flow advances to a step S85 to start feed of the original from the ADF 51 and judge in response to the output from the original discrimination sensor provided on the ADF 51 whether or not the fed original is a color original. If judged that the fed original is the color original, this original is considered to be read, i.e., the page to be subjected to the image forming in the insert output mode, and the flow advances to a step S86 to read the image of this original and store it in a memory. Then, the flow advances to a step S87 to judge whether or not the reading of the last original ends. If judged that the reading of the last original does not end, the flow returns to the step S85 to start feed of the next original and judge whether or not the fed original is a color original. Conversely, if judged that the reading of the last original ends, the flow advances to a step S88 to perform an F/S mode discrimination process. In this process, it is discriminated which of the S mode and the F mode can be executed, and the discriminated mode is set. The detail of the F/S mode discrimination process will be described later.

Then, the flow advances to a step S89 to perform the printing operation in the mode set in the step S88 (i.e., the color image forming is performed in the color output mode of the present embodiment). Here, when the S mode is being set, the sheets S of the same page in the sheets of the number of copies set according to the kind of inserter are output to the identical stacking bin 31. When the F mode is being set, the sheets S of the set number of copies are sorted and output to each stacking bin 31 in the unit of the number of copies. The details of these modes were described in the second embodiment.

Next, the F/S mode discrimination process will be explained with reference to FIG. 14.

In the F/S mode discrimination process, as shown in FIG. 14, it is first judged in a step S101 whether or not the number of inserter bins obtained in the selection of the kind of inserter by the user through the screen of FIG. 5 in the insert output mode is smaller than the number of originals read for the image forming in the insert output mode (i.e., the number of stacking bins of the bin unit 5 used in the S mode (or the number of color originals in the originals mixedly including the color and B/W originals)). If judged that the number of inserter bins is smaller than the number of read originals, it is considered that the S mode can not be executed because the number of stacking bins is smaller than the number (or page number) of sheets on which the read images were formed respectively, and thus the flow advances to a step S102 to set the F mode. Then, it is judged in a step S104 whether or not both the S and F modes can be executed. In this case, since the S mode can not be executed, it is judged that both the S and F modes can not be executed, and the process ends. Thus, when the S mode can not be executed, the F mode is set.

On the other hand, if judged in the step S101 that the number of inserter bins is not smaller than the number of read originals, it is considered that the S mode can be executed because the number of stacking bins is equal to or larger than the number of sheets on which the read images were formed respectively, and thus the flow advances to a step S103 to set either one of the S and F modes on the basis of the information obtained from the set kind of inserter. Then, it is judged in the step S104 whether or not both the S and F modes can be executed. If judged that both the S and F modes can not be executed, the process ends. Thus, the mode set in the step S103 is set. Conversely, if judged that both the S and F modes can be executed, the flow advances to a step S105 to set the F mode, and the process ends. Thus, when both the S and F modes can be executed, the F mode is preferentially set irrespective of the mode set in the step S103.

As described above, according to the present embodiment, when the number of inserter bins in the inserter actually used in the insert process is smaller than the number of originals read for the image forming in the insert output mode (i.e., the number of stacking bins of the bin unit 5 used in the S mode (or the number of color originals in the originals mixedly including the color and B/W originals)), it is possible to prevent beforehand that the sheets of different pages are erroneously stacked in the stacking bin which should essentially stack the sheets of the same page in the S mode. Further, it is unnecessary to select the S or F mode in consideration of the relation between the number of inserter bins obtained in the selection of the kind of inserter and the number of read originals (i.e., the number of stacking bins in the bin unit 5 used in the S mode), whereby erroneous mode selection can be prevented beforehand.

Fourth Embodiment

Figure 15:
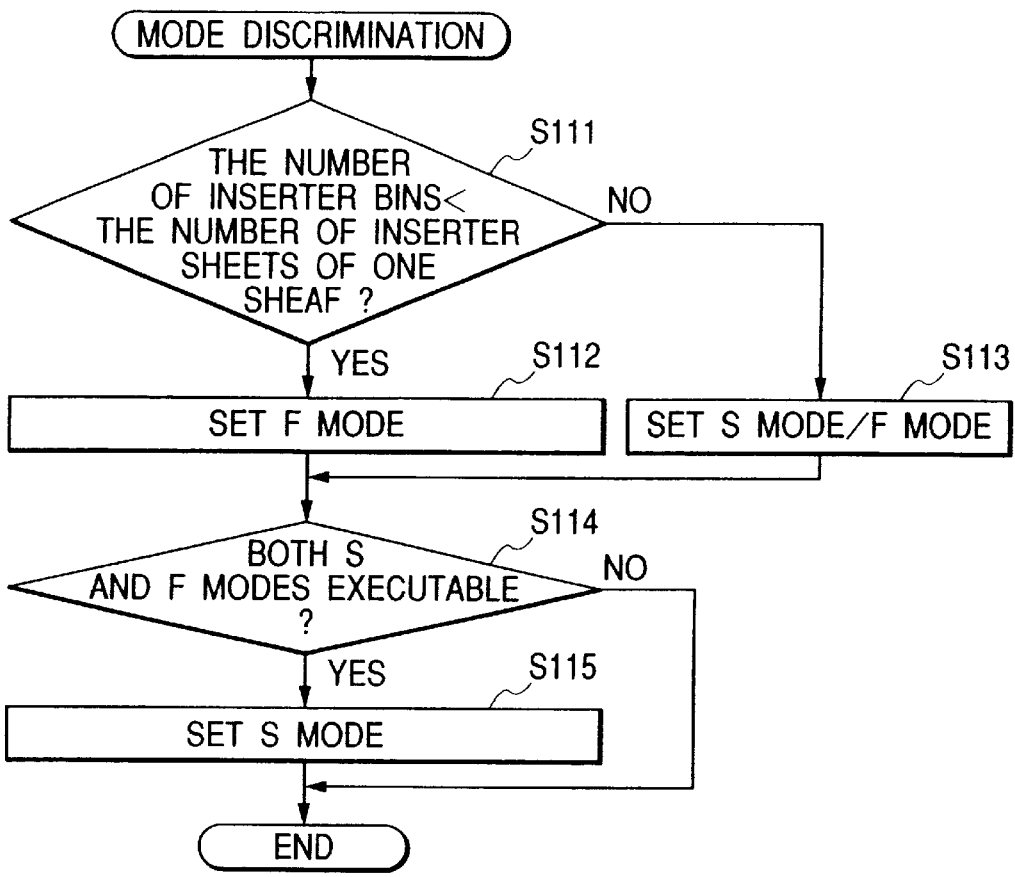
FIG. 15 is a flow chart showing the procedure of the F/S mode discrimination process in the insert output mode in the image forming apparatus according to the fourth embodiment of the present invention.

Next, the fourth embodiment of the present invention will be explained with reference to FIG. 15. FIG. 15 is a flow chart showing the procedure of the F/S mode discrimination process in the insert output mode in the image forming apparatus according to the fourth embodiment of the present invention.

The present embodiment is different from the third embodiment in the point that, it is first judged whether or not both the S and F modes can be executed, and then the S mode is preferentially set if judged that both the S and F modes can be executed.

Since the procedure of the insert output mode in the present embodiment is substantially the same as that shown in FIG. 13, the explanation thereof will be omitted. In the present embodiment, only the F/S mode discrimination process different from that in the third embodiment will be explained hereinafter.

In the F/S mode discrimination process of the present embodiment, as shown in FIG. 15, it is first judged in a step S111 whether or not the number of inserter bins obtained in the selection of the kind of inserter by the user through the screen of FIG. 5 in the insert output mode is smaller than the number of originals read for the image forming in the insert output mode (i.e., the number of stacking bins of the bin unit 5 used in the S mode (or the number of color originals in the originals mixedly including the color and B/W originals)). If judged that the number of inserter bins is smaller than the number of read originals, it is considered that the S mode can not be executed because the number of stacking bins is smaller than the number (or page number) of sheets on which the read images were formed respectively, and thus the flow advances to a step S112 to set the F mode. Then, it is judged in a step S114 whether or not both the S and F modes can be executed. In this case, since the S mode can not be executed, it is judged that both the S and F modes can not be executed, and the process ends. Thus, when the S mode can not be executed, the F mode is set.

On the other hand, if judged in the step S111 that the number of inserter bins is not smaller than the number of read originals, it is considered that the S mode can be executed because the number of stacking bins is equal to or larger than the number of sheets on which the read images were formed respectively, and thus the flow advances to a step S113 to set either one of the S and F modes on the basis of the information obtained from the set kind of inserter. Then, it is judged in the step S114 whether or not both the S and F modes can be executed. If judged that both the S and F modes can not be executed, the process ends. Thus, the mode set in the step S113 is set. Conversely, if judged that both the S and F modes can be executed, the flow advances to a step S115 to set the S mode, and the process ends. Thus, when both the S and F modes can be executed, the S mode is preferentially set irrespective of the mode set in the step S113.

Fifth Embodiment

Figure 16:
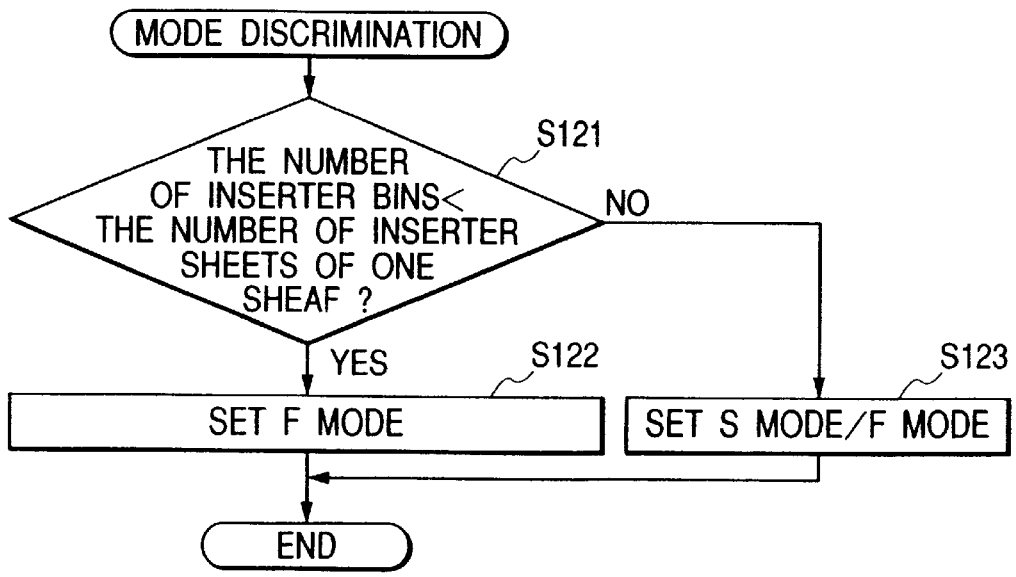
FIG. 16 is a flow chart showing the procedure of the F/S mode discrimination process in the insert output mode in the image forming apparatus according to the fifth embodiment of the present invention.

Next, the fifth embodiment of the present invention will be explained with reference to FIG. 16. FIG. 16 is a flow chart showing the procedure of the F/S mode discrimination process in the insert output mode in the image forming apparatus according to the fifth embodiment of the present invention.

The present embodiment is different from the third embodiment in the point that, when the S mode can be executed, either one of the S and F modes is automatically selected and set.

Since the procedure of the insert output mode in the present embodiment is substantially the same as that shown in FIG. 13, the explanation thereof will be omitted. In the present embodiment, only the F/S mode discrimination process different from that in the third embodiment will be explained hereinafter.

In the F/S mode discrimination process of the present embodiment, as shown in FIG. 16, it is first judged in a step S121 whether or not the number of inserter bins obtained in the selection of the kind of inserter by the user through the screen of FIG. 5 in the insert output mode is smaller than the number of originals read for the image forming in the insert output mode (i.e., the number of stacking bins of the bin unit 5 used in the S mode (or the number of color originals in the originals mixedly including the color and B/W originals)). If judged that the number of inserter bins is smaller than the number of read originals, it is considered that the S mode can not be executed because the number of stacking bins is smaller than the number (or page number) of sheets on which the read images were formed respectively, the flow thus advances to a step S122 to set the F mode, and the process ends. Thus, when the S mode can not be executed, the F mode is set.

On the other hand, if judged in the step S121 that the number of inserter bins is not smaller than the number of read originals, it is considered that the S mode can be executed because the number of stacking bins is equal to or larger than the number of sheets on which the read images were formed respectively, the flow thus advances to a step S123 to set either one of the S and F modes on the basis of the information obtained from the set kind of inserter, and the process ends. Thus, either one of the S and F modes is set.

Sixth Embodiment

Figure 17A:
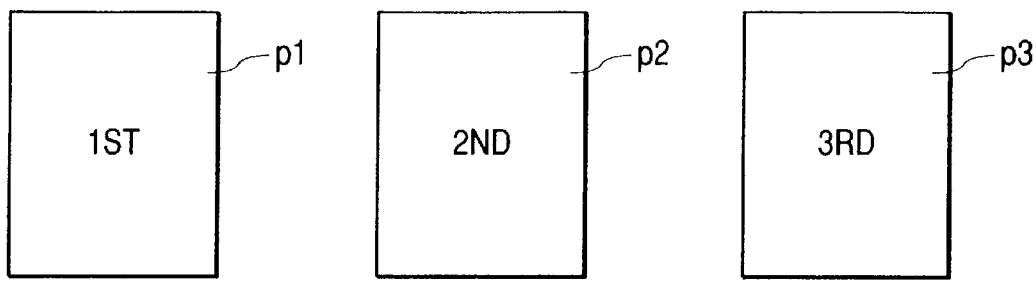
FIGS. 17A, 17B and 17C are diagrams showing an example that a head mark is affixed or appended in the insert output mode in the image forming apparatus according to the sixth embodiment of the present invention.
Figure 17B:
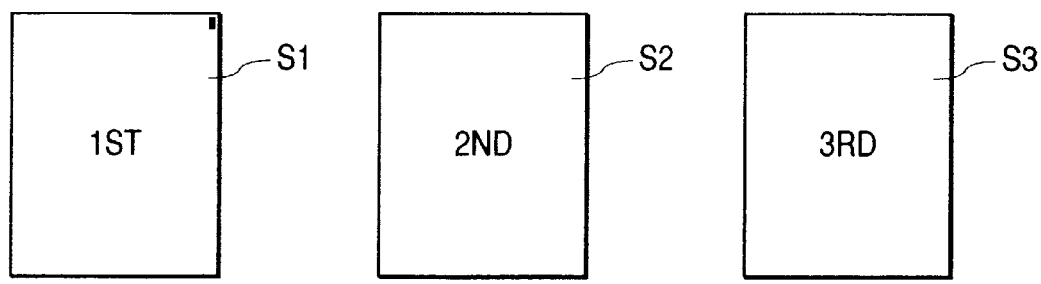
Figure 17C:
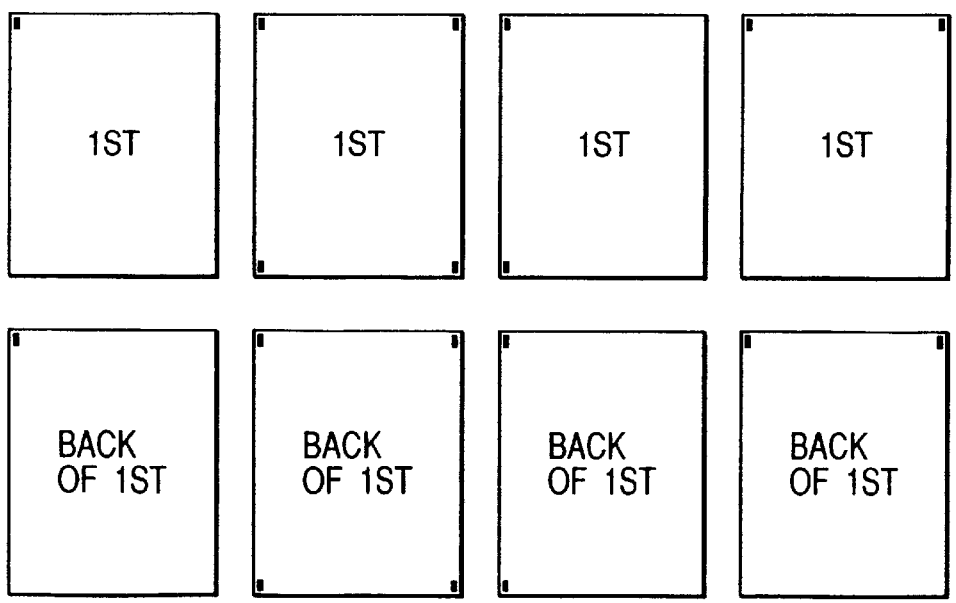

Next, the sixth embodiment of the present invention will be explained with reference to FIGS. 17A, 17B, 17C, 18, 19, 20 and 21. FIGS. 17A to 17C are diagrams showing an example that a head mark is affixed or appended in the insert output mode in the image forming apparatus according to the sixth embodiment, and FIGS. 18 to 21 are flow charts showing the procedure of the insert output mode in the image forming apparatus according to the sixth embodiment.

The present embodiment is different from the second embodiment in the point that the function to affix the head mark to the sheet corresponding to the first page of the sheets output as the insert sheets in the insert output mode is provided.

Concretely, in a case where originals which mixedly include the first, second and third pages of color originals and the remaining pages of B/W originals are processed in the insert output mode, for example, as shown in FIG. 17A, if three originals p1 to p3 (corresponding to the color originals included in the originals mixedly including the color and B/W originals) are read in due order, the images of the originals p1 to p3 are stored in a memory in the reading order. At this time, head mark data (or head image mark data) is affixed to a predetermined position of the image of the read original p1 (i.e., the top of the image in this case), and the image data and the affixed mark data are together stored in the memory. This head mark data is the data prestored in the memory. Then, after the reading of the last original p3 ended, the image corresponding to the last page (i.e., the image of the original p3) is read from the memory, the read image is formed with color on a sheet, and this sheet is output to the stacking bin 31 determined in the set mode (the S or F mode). Next, the image corresponding to the previous page of the last page (i.e., the image of the original p2) is read, the read image is formed with color on a sheet, and the sheet on which this read image was formed is put on the sheet of the last page on the stacking bin 31. Next, the image corresponding to the first page (i.e., the image of the original p1) is read, the read image is formed with color on a sheet, and this sheet is put uppermost on the sheaf of the sheets on the stacking bin 31. Since the head mark data has been affixed to the image data corresponding to the first page (first page), an image (i.e., a mark "■") represented by the head mark data is affixed at the top of a sheet S1 as shown in FIG. 17B. Of course, the image represented by the head mark data is not affixed to sheets S2 and S3 corresponding to other pages.

Thus, the sheet corresponding to the first page includes the image representing that this sheet corresponds to the first page, whereby the first-page sheet can be well discriminated in the sheaf of sheets output in the S or F mode. Thus, when the sheaf of sheets is set to the inserter, this sheaf can be set on the basis of the discriminable first-page sheet, whereby the user can set the sheets without misarrangement in the page order.

Further, the above explanation is directed to the case where the head mark data is affixed to the position corresponding to the top of the sheet in the image data. However, as shown in FIG. 17C, the position of the head mark data and the number thereof can be changed. In this case, it is preferable to change the position and the number of the head mark data on the basis of the information representing the kind of inserter. For example, in a case where an insert sheet is set to the inserter on the basis of the trailing edge of this sheet, the head mark can be affixed to the trailing edge (i.e., the bottom) of the sheet of the first page. Thus, it is possible to affix the head mark to the position suitable for a form that the insert sheet is set to the inserter. Further, it is possible to affix the head mark to the back face of the sheet, instead of the front face (i.e., the image forming face) of the sheet.

Next, the insert output mode in the present embodiment will be explained with reference to FIGS. 18 to 21. It should be noted that the insert output mode is controlled by the CPU circuit unit 200.

Figure 18:
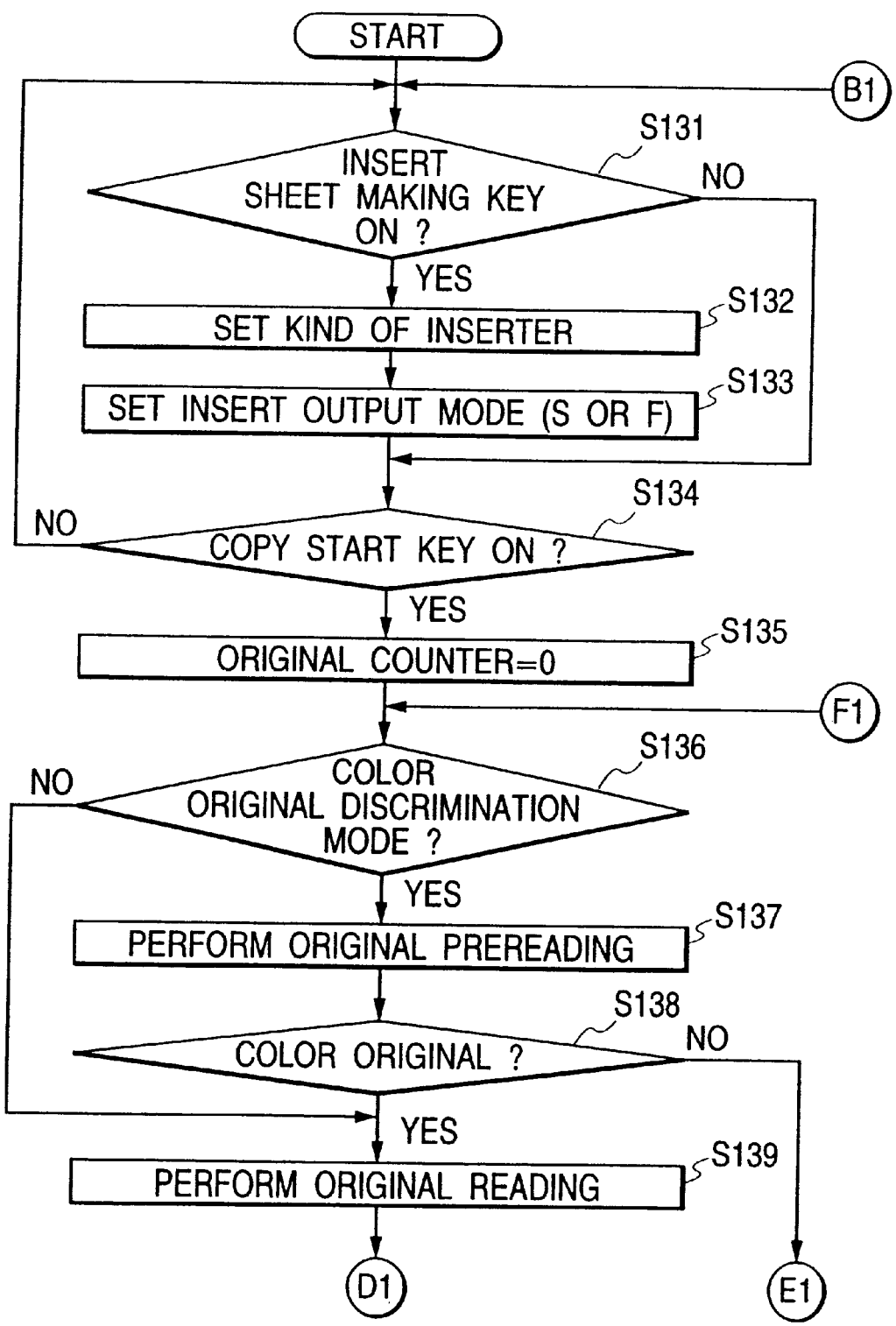
FIG. 18 is a flow chart showing the procedure of the insert output mode in the image forming apparatus according to the sixth embodiment of the present invention.
Figure 19:
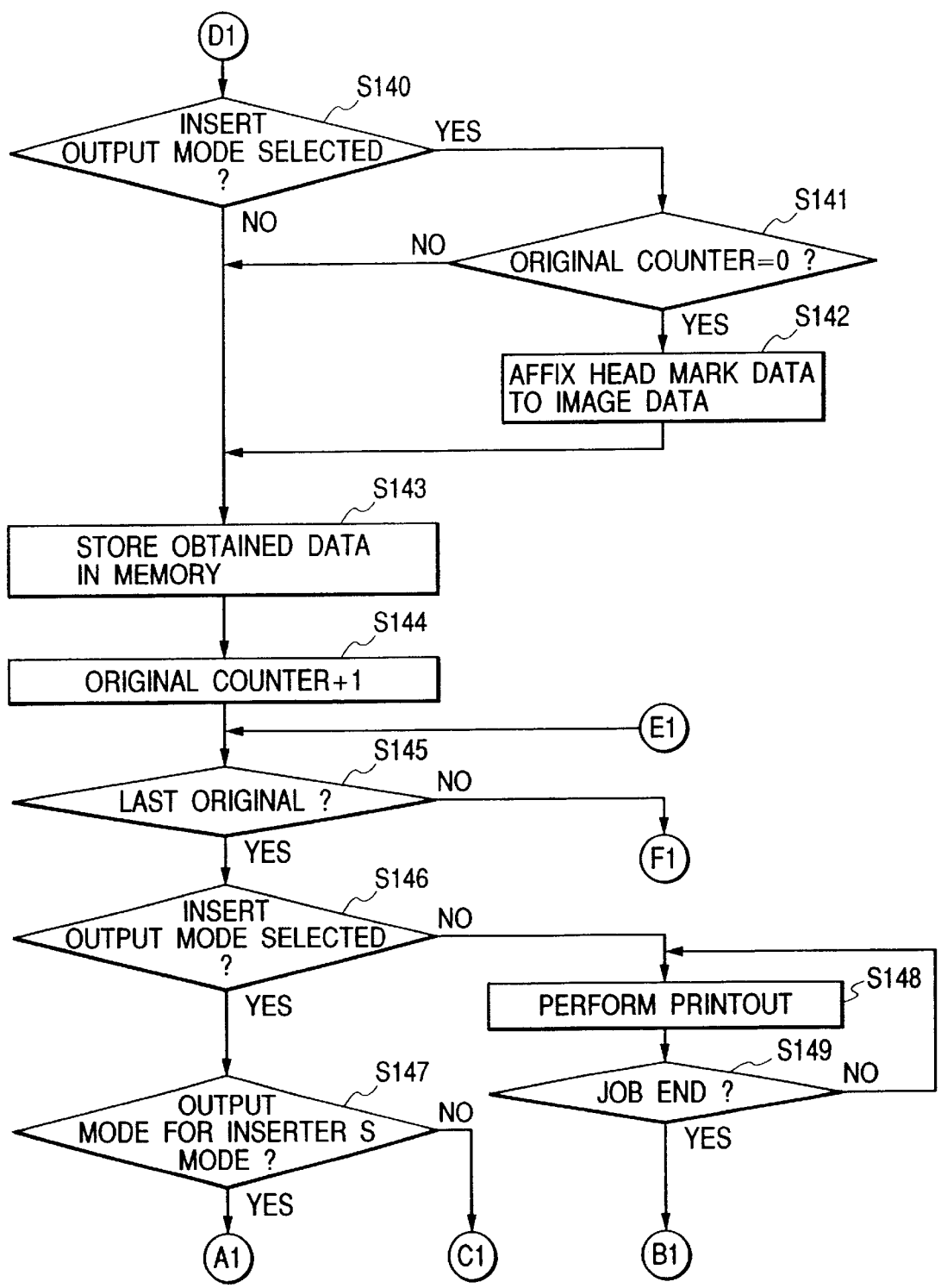
FIG. 19 is a flow chart showing the procedure of the insert output mode in the image forming apparatus according to the sixth embodiment of the present invention.

In FIG. 18, it is first judged in a step S131 whether or not the insert sheet making mode key 642 is depressed. If judged that the key 642 is depressed, the flow advances to a step S132 to select the kind of inserter according as any one of the one-bin inserter key 643, the three-bin inserter key 644 and the five-bin inserter key 645 is depressed, whereby the number of output copies according to the kind of inserter is set. Then, the flow advances to a step S133 to set the S mode or the F mode in the insert output mode according as either the software key 640 or 641 is depressed, whereby the insert output mode is set.

Next, the flow advances to a step S134 to wait for the depression of the start key 614. Conversely, if judged in the step S131 that the insert sheet making mode key 642 is not depressed, the flow skips over the steps S132 and S133 and advances to the step S134 to wait for the depression of the start key 614.

If the start key 614 is depressed, the flow advances to a step S135 to clear and set the original counter to "0", and further advances to a step S136 to judge whether or not the color original discrimination mode is set to read only the color original being the image forming target in the insert output mode. If judged that the color original discrimination mode is not set, the apparatus is considered to perform an ordinary copying operation, and the flow advances to a step S139. In this step, the original p is carried one by one in due order from the original stacking tray 50 to the original mounting board glass 78, and the carried original is read. In a next step S140 shown in FIG. 19, it is judged whether or not the insert output mode is selected. Since the insert output mode is not set in this case, the flow advances to a step S143 to store the image of the read original in a memory, and further advances to a step S144 to perform increment of the original counter by "1". Then, it is judged in a step S145 whether or not the image forming of the last original ends. If judged that the image forming of the last original does not end, the flow returns to the step S136 to read the next original. Conversely, if judged in the step S145 that the image forming of the last original ends, the flow advances to a step S146.

If judged in the step S136 that the color original discrimination mode is set, the flow advances to a step S137 to perform original prereading to judge in response to the output from the original discrimination sensor provided on the ADF 51 whether or not the fed original is a color original. On the basis of the result of the original prereading, if judged in a step S138 that the fed original is the color original, this original is considered to be read, and the flow advances to a step S139 to read the image of this original. Then, the flow advances to the step S140 of FIG. 19 to judge whether or not the insert output mode is selected. If judged that the insert output mode is selected, the flow advances to a step S141 to judge whether or not the count value of the original counter is "0". If judged that the count value of the original counter is "0", this original is considered to be the original corresponding to the first page, and the flow advances to a step S142 to affix the head mark data to the image data. In the next step S143, the image data added with the head mark data is stored in the memory, and the flow advances to the step S144 to perform increment of the original counter by "1". Then, it is judged in the step S145 whether or not the image forming of the last original ends. If judged that the image forming of the last original does not end, the flow returns to the step S136 to judge whether or not the color original discrimination mode is set.

If judged in the step S138 that the original is not the color original, the flow skips over the steps S139 to S144 and advances to the step S145. Namely, the original judged to be not the color original is not subjected to the reading but is discharge as it is. After the reading of the last original ended, the flow advances to the step S146.

It is judged in the step S146 whether or not the insert output mode is selected. If judged that the insert output mode is not selected, the flow advances to a step S148 to sequentially read the images stored in the memory, perform the image forming on the sheets, and output these sheets to the bin unit 5. Then, in a step S149, it is judged whether or not the job ends. If judged that the job does not end, the flow returns to the step S148. Conversely, if judged in the step S149 that the job ends, the flow returns to the step S131 (FIG. 18).

If judged in the step S146 that the insert output mode is set, the flow advances to a step S147 to judge whether or not the S mode is set. If judged that the S mode is set, the flow advances to a step S150 shown in FIG. 20. In the step S150, the original counter, the sheet discharge bin designation counter, the sheet discharge bin the number of storage sheets counter (i.e., the counter for counting the number of sheets stored in the sheet discharge bin) and the inserter the number of output sheets counter (i.e., the counter for counting the number of sheets output to the inserter) are all cleared and set to "0".

Next, the flow advances to a step S152 to perform increment of the original counter by "1", and further advances to a step S153 to perform the image printing for the original of the ordinal number corresponding to the value counted by the original counter. Then, the flow advances to a step S154 to perform increment of the sheet discharge bin the number of storage sheets counter by "1", and further advances to a step S155 to perform increment of the inserter the number of output sheets counter by "1".

Next, the flow advances to a step S156 to judge whether or not the job in the insert output mode ends. If judged that the job does not end, the flow advances to a step S157 to judge whether or not the value counted by the inserter the number of output sheets counter coincides with the set numeral (i.e., the number of output sheets determined according to the kind of inserter set in the step S132). If judged that the counted value does not coincide with the set numeral, the flow advances to a step S158 to judge whether or not the value counted by the sheet discharge bin the number of storage sheets counter coincides with the number of sheets storable in one bin. If judged that the value counted by the sheet discharge bin the number of storage sheets counter does not coincide with the number of sheets storable in one bin, the flow returns to the step S153 to continue the image printing for the original of the ordinal number corresponding to the value counted by the original counter.

On the other hand, if judged in the step S158 that the value counted by the sheet discharge bin the number of storage sheets counter coincides with the number of sheets storable in one bin, it is considered that the sheet on which the image printing for the original of the ordinal number corresponding to the value counted by the original counter was performed can not be stacked in the current stacking bin. Thus, the flow advances to a step S159 to perform increment of the sheet discharge bin designation counter by "1" to designate a next stacking bin. Then, in a step S160, the sheet discharge bin the number of storage sheets counter is cleared and set to "0", and the flow returns to the step S153.

If judged in the step S157 that the value counted by the inserter the number of output sheets counter coincides with the set numeral, the flow advances to a step S161 to clear and set the inserter the number of output sheets counter to "0", the flow advances to a step S162 to clear and set the sheet discharge bin the number of storage sheets counter to "0", the flow advances to a step S163 to perform increment of the sheet discharge bin designation counter by "1", and the flow returns to the step S152 to perform the printing for the image of the original of the next ordinal number.

If judged in the step S156 that the job ends, the flow advances to a step S164' to clear the insert output mode, and the flow returns to the step S131.

If judged in the step S147 that the F mode is set, the flow advances to a step S164 shown in FIG. 11. In the step S164, the original counter, the sheet discharge bin designation counter, the sheet discharge bin the number of storage sheets counter and the inserter the number of output sheets counter are respectively cleared and set to "0".

Next, the flow advances to a step S165 to judge whether or not the value counted by the original counter coincides with the number of originals. If judged that the counted value coincides with the number of originals, the flow advances to a step S166 to clear and set the original counter to "0", and the flow advances to a step S167. Conversely, if judged that the counted value does not coincide with the number of originals, the flow skips over the step S167 and advances to a step S168.

In the step S168, increment of the original counter is performed by "1", and in a next step S169, the image printing for the original of the ordinal number corresponding to the value counted by the original counter is performed. Then, the flow advances to a step S170 to perform increment of the sheet discharge bin the number of storage sheets counter by "1", and further advances to a step S171 to perform increment of the inserter the number of output sheets counter by "1".

Next, the flow advances to a step S171 to judge whether or not the job in the insert output mode ends. If judged that the job does not end, the flow advances to a step S173 to judge whether or not the value counted by the inserter the number of output sheets counter coincides with the number of inserter storage-scheduled sheets (i.e., the number of output sheets determined according to the kind of inserter set in the step S132). If judged that the counted value does not coincide with the number of inserter storage-scheduled sheets, the flow advances to a step S174 to judge whether or not the value counted by the sheet discharge bin the number of storage sheets counter coincides with the number of sheet discharge bin storable sheets. If judged that the counted value does not coincide with the number of sheet discharge bin storable sheets, the flow returns to the step S165 to continue the image printing for the original of the ordinal number corresponding to the value counted by the original counter.

On the other hand, if judged in the step S69 that the counted value coincides with the number of sheet discharge bin storable sheets, it is considered that the sheet on which the image printing for the original of the ordinal number corresponding to the value counted by the original counter was performed can not be stacked in the current stacking bin. Thus, the flow advances to a step S175 to perform increment of the sheet discharge bin designation counter by "1" to designate a next stacking bin. Then, in a step S176, the sheet discharge bin the number of storage sheets counter is cleared and set to "0", and the flow returns to the step S165.

If judged in the step S173 that the value counted by the inserter the number of output sheets counter coincides with the number of inserter storage-scheduled sheets, it is considered that the sheets of the predetermined number are output to one stacking bin, and the flow advances to a step S177 to clear and set the inserter the number of output sheets counter to "0", the flow advances to a step S178 to clear and set the sheet discharge bin the number of storage sheets counter to "0", the flow advances to a step S179 to perform increment of the sheet discharge bin designation counter by "1", and the flow returns to the step S165.

If judged in the step S171 that the job ends, the flow advances to a step S172 to clear the insert output mode, and the flow returns to the step S131.

Seventh Embodiment

Next, the seventh embodiment of the present invention will be explained with reference to FIGS. 22, 23, 24, 25 and 26. FIGS. 22 to 26 are flow charts showing the procedure of the insert output mode in the image forming apparatus according to the seventh embodiment.

The present embodiment is different from the second embodiment in the point that execution of the insert output mode is temporarily stopped every time outputting of one of the output copies set according to the information representing the kind of inserter ends, and then the execution of the insert output mode is restarted according to the depression of the start key.

Figure 22:
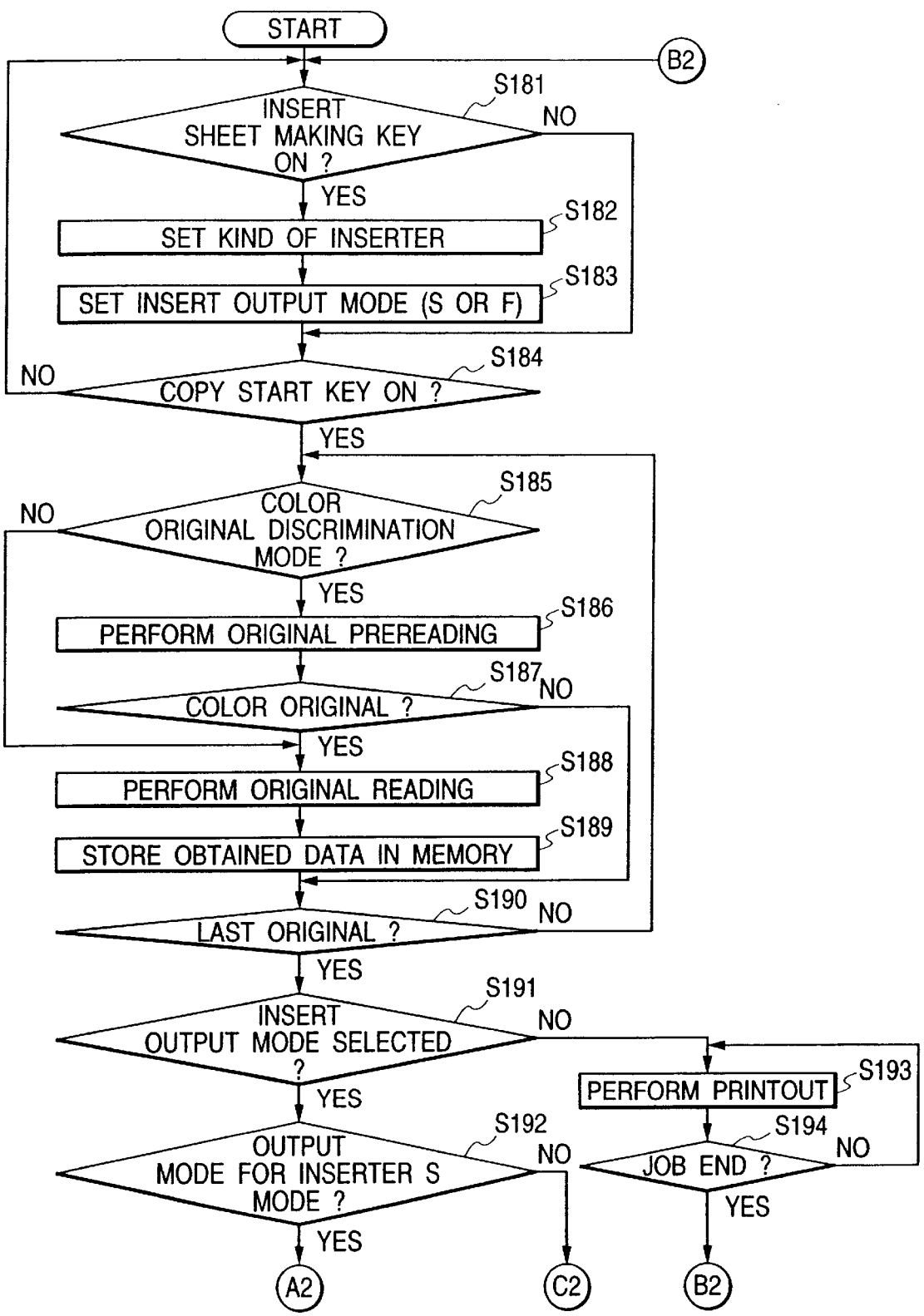
FIG. 22 is a flow chart showing the procedure of the insert output mode in the image forming apparatus according to the seventh embodiment of the present invention.
Figure 23:
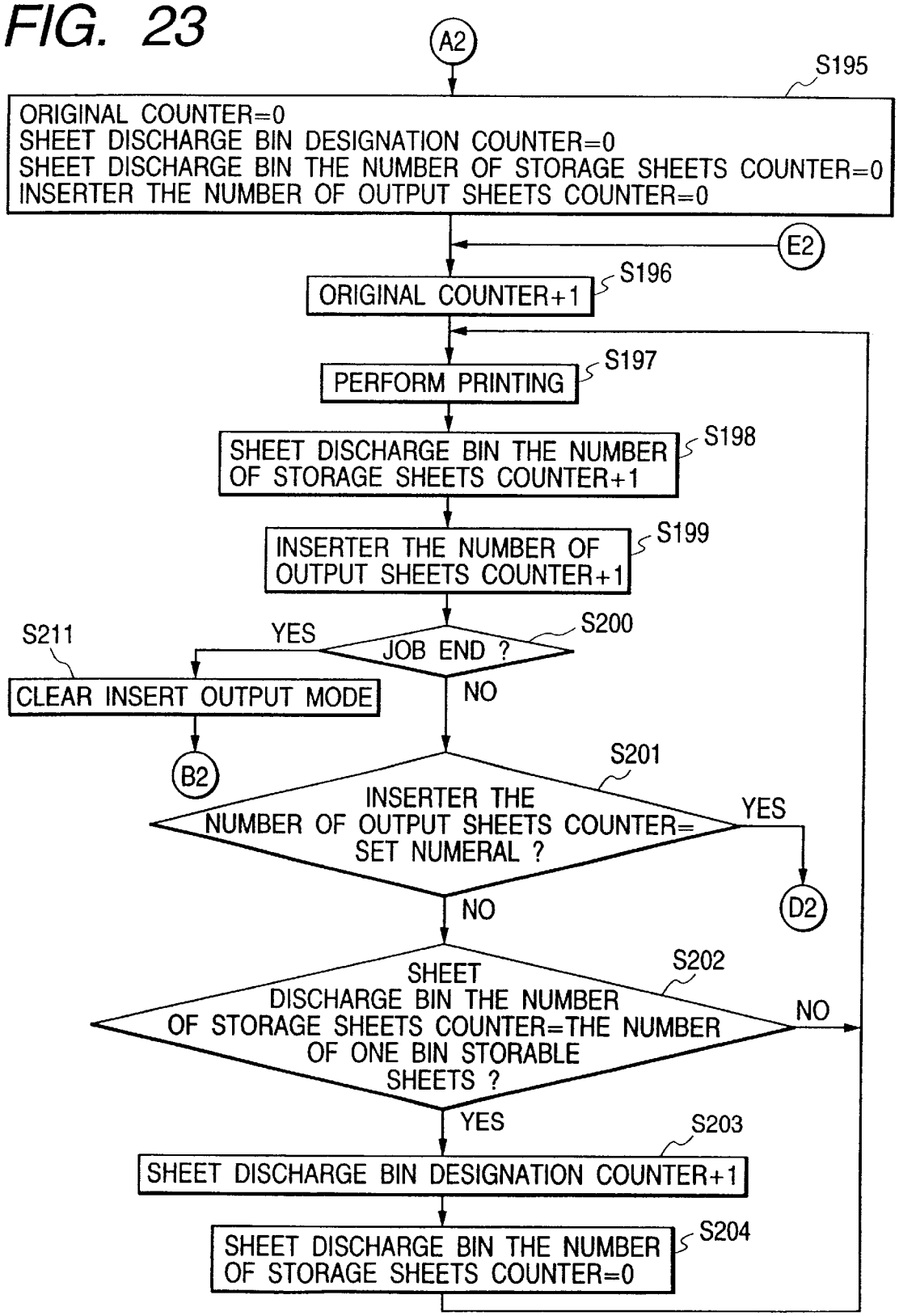
FIG. 23 is a flow chart showing the procedure of the insert output mode in the image forming apparatus according to the seventh embodiment of the present invention.

In the insert output mode according to the present embodiment, as shown in FIG. 22, it is first judged in a step S181 whether or not the insert sheet making mode key 642 is depressed. If judged that the key 642 is depressed, the flow advances to a step S182 to select the kind of inserter according as any one of the one-bin inserter key 643, the three-bin inserter key 644 and the five-bin inserter key 645 is depressed, whereby the number of output copies according to the kind of inserter is set. Then, the flow advances to a step S183 to set the S mode or the F mode in the insert output mode according as either the software key 640 or 641 is depressed, whereby the insert output mode is set.

Next, the flow advances to a step S184 to wait for the depression of the start key 614. Conversely, if judged in the step S181 that the insert sheet making mode key 642 is not depressed, the flow skips over the steps S182 and S183 and advances to the step S184 to wait for the depression of the start key 614.

If the start key 614 is depressed, the flow advances to a step S185 to judge whether or not the color original discrimination mode is set. Here, the color original discrimination mode is to discriminate whether the original is a color original, in response to the output from the original discrimination sensor provided on the ADF 51. If judged that the color original discrimination mode is not set, the apparatus is considered to perform an ordinary copying operation, and the flow advances to a step S188. In this step, the original p is carried one by one in due order from the original stacking tray 50 to the original mounting board glass 78, and the carried original is read. In a next step S189, the image of the read original is stored in a memory. Then, it is judged in a step S190 whether or not the image forming of the last original ends. If judged that the image forming of the last original does not end, the flow returns to the step S185 to read the next original. Conversely, if judged that the image forming of the last original ends, the flow advances to a step S191.

Conversely, if judged in the step S185 that the color original discrimination mode is set, the flow advances to a step S186 to start feeding the original from the ADF 51 and perform original prereading. The original prereading is to judge in response to the output from the original discrimination sensor provided on the ADF 51 whether or not the fed original is the color original. If judged in a step S187 that the fed original is the color original, this original is considered to be read, and the flow advances to the step S188 to read the image of this original and store it in the memory in the step S189. Then, the flow advances to the step S190 to judge whether or not the reading of the last original ends. If judged that the reading of the last original does not end, the flow returns to the step S185 to perform the feed of the next original and the color original discrimination.

If judged in the step S187 that the fed original is not the color original, the flow skips over the steps S186 and S187 and advances to the step S190. Namely, the original which was judged to be not the color original is not subjected to the reading and is directly discharged. After the reading of the last original ended, the flow advances to the step S191.

It is judged in the step S191 whether or not the insert output mode is selected. If judged that the insert output mode is not selected, the flow advances to a step S193 to sequentially read the images stored in the memory, perform the image forming on the sheets, and output these sheets to the bin unit 5. Then, in a step S194, it is judged whether or not the job ends. If judged that the job does not end, the flow returns to the step S193. Conversely, if judged that the job ends, the flow returns to the step S181.

If judged in the step S191 that the insert output mode is set, the flow advances to a step S192 to judge whether or not the S mode is set. If judged that the S mode is set, the flow advances to a step S195 shown in FIG. 23. In the step S195, the original counter, the sheet discharge bin designation counter, the sheet discharge bin the number of storage sheets counter and the inserter the number of output sheets counter are all cleared and set to "0".

Next, the flow advances to a step S196 to perform increment of the original counter by "1", and further advances to a step S197 to perform the image printing for the original of the ordinal number corresponding to the value counted by the original counter. Then, the flow advances to a step S198 to perform increment of the sheet discharge bin the number of storage sheets counter by "1", and further advances to a step S199 to perform increment of the inserter the number of output sheets counter by "1".

Next, the flow advances to a step S200 to judge whether or not the job in the insert output mode ends. If judged that the job does not end, the flow advances to a step S201 to judge whether or not the value counted by the inserter the number of output sheets counter coincides with the set numeral (i.e., the number of output sheets determined according to the kind of inserter set in the step S182). If judged that the counted value does not coincide with the set numeral, the flow advances to a step S202 to judge whether or not the value counted by the sheet discharge bin the number of storage sheets counter coincides with the number of sheets storable in one bin. If judged that the value counted by the sheet discharge bin the number of storage sheets counter does not coincide with the number of sheets storable in one bin, the flow returns to the step S197 to continue the image printing for the original of the ordinal number corresponding to the value counted by the original counter.

On the other hand, if judged in the step S202 that the value counted by the sheet discharge bin the number of storage sheets counter coincides with the number of sheets storable in one bin, it is considered that the sheet on which the image printing for the original of the ordinal number corresponding to the value counted by the original counter was performed can not be stacked in the current stacking bin. Thus, the flow advances to a step S203 to perform increment of the sheet discharge bin designation counter by "1" to designate a next stacking bin. Then, in a step S204, the sheet discharge bin the number of storage sheets counter is cleared and set to "0", and the flow returns to the step S197.

Figure 24:
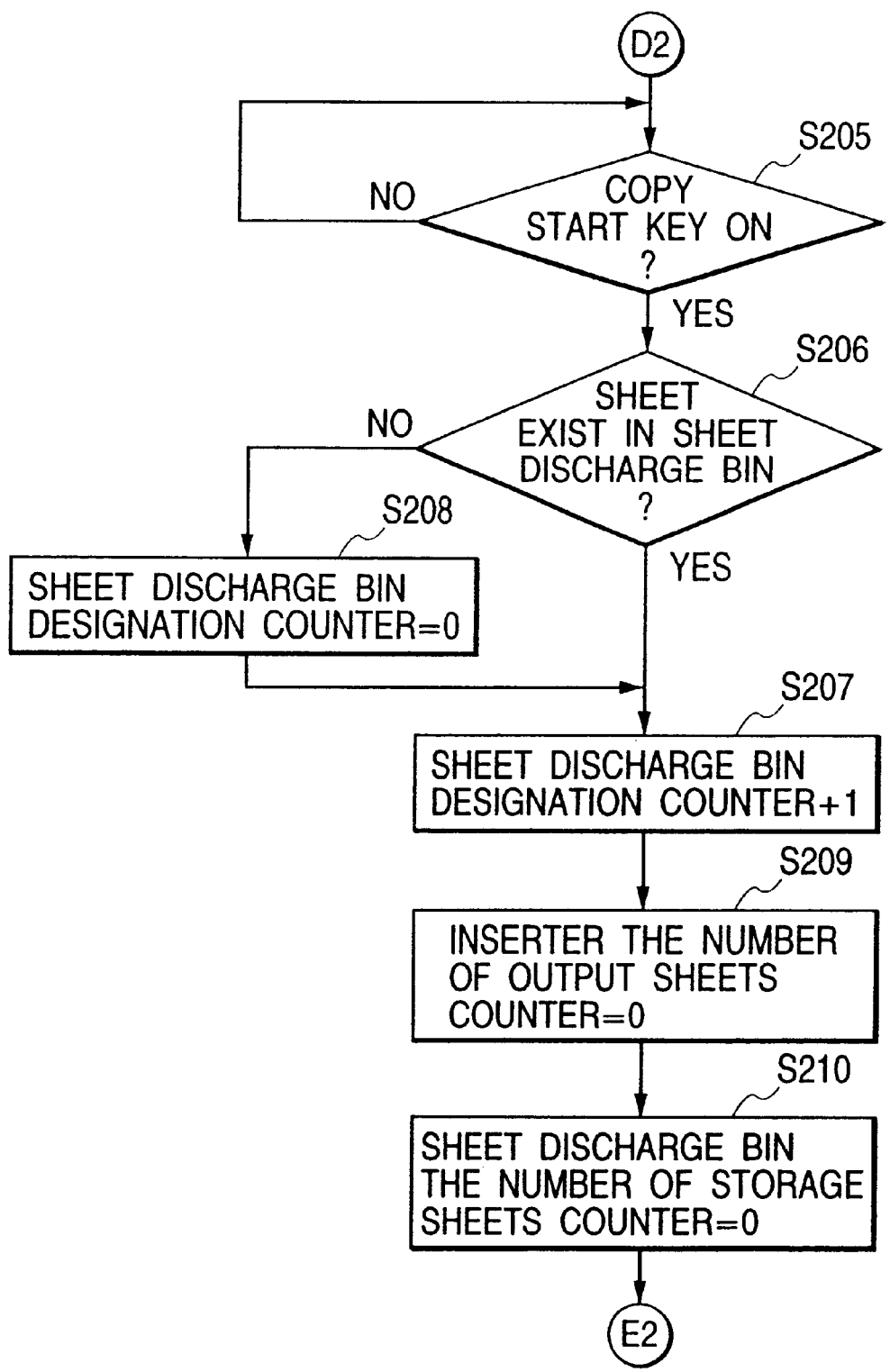
FIG. 24 is a flow chart showing the procedure of the insert output mode in the image forming apparatus according to the seventh embodiment of the present invention.

If judged in the step S201 that the value counted by the inserter the number of output sheets counter coincides with the set numeral, it is considered that output of the sheaf of the sheets of one copy ended, and the flow advances to a step S205 shown in FIG. 24 to stop the printing operation and wait for the depression of the start key 614. If the start key 614 is depressed, the flow advances to a step S206 to judge whether or not the sheet exists in the sheet discharge bin. If judged that the sheet exists in the sheet discharge bin, it is considered that the sheet remains in the current sheet discharge bin, and the flow advances to a step S207 to perform increment of the sheet discharge bin designation counter by "1". Then, the flow advances to a step S209 to clear and set the inserter the number of output sheets counter to "0", the flow advances to a step S210 to clear and set the sheet discharge bin the number of storage sheets counter to "0", and the flow returns to the step S196. Conversely, if judged in the step S206 that the sheet does not exist in the current sheet discharge bin, it is considered that a sheet can be discharged to the current sheet discharge bin, the flow advances to a step S208 to clear and set the sheet discharge bin designation counter to "0", and the flow returns to the step S196 through the steps S209 and S210.

If judged in the step S200 that the job ends, the flow advances to a step S211 to clear the insert output mode, and the flow returns to the step S181.

Figure 25:
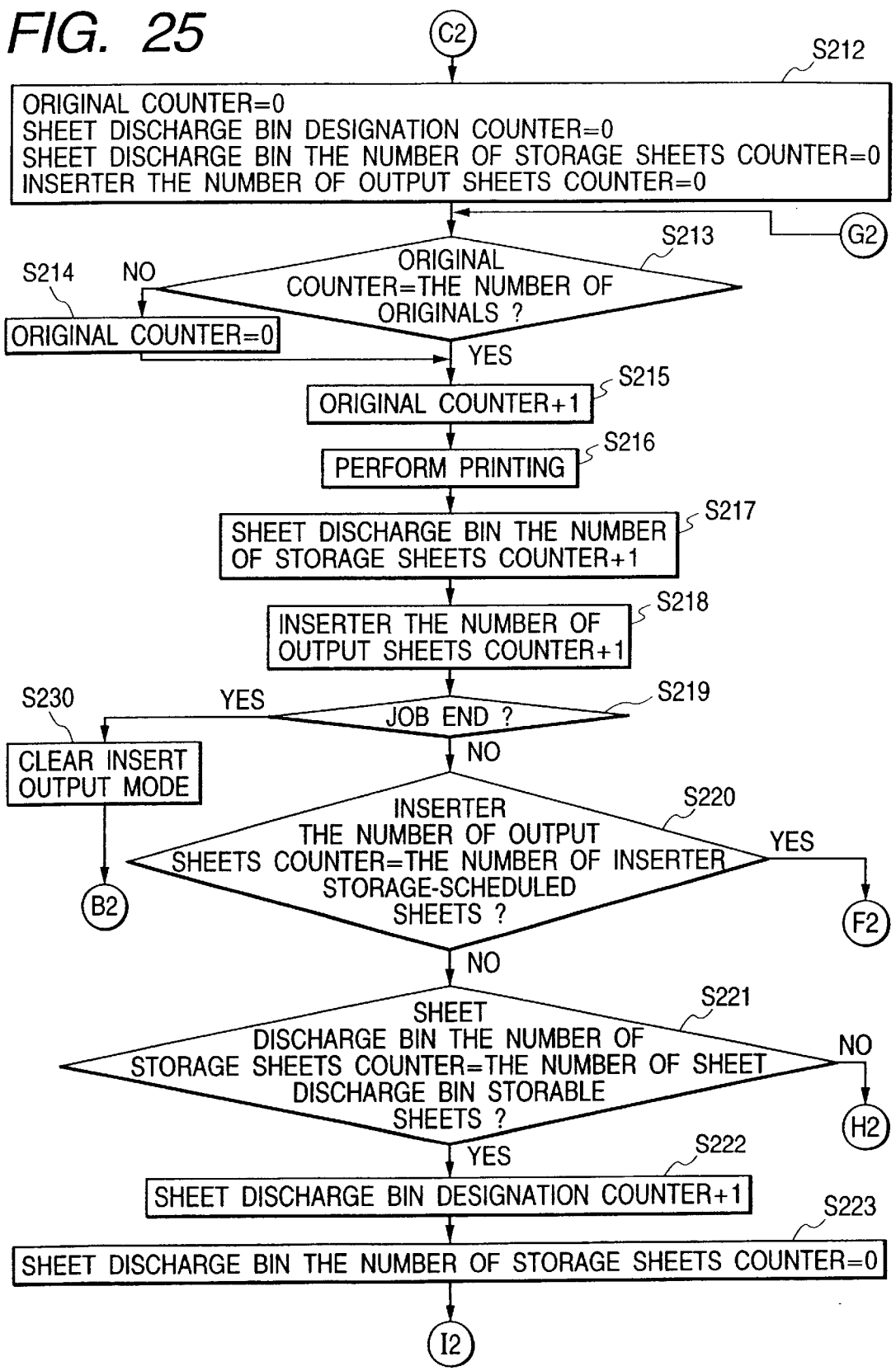
FIG. 25 is a flow chart showing the procedure of the insert output mode in the image forming apparatus according to the seventh embodiment of the present invention.

If judged in the step S192 that the F mode is set, the flow advances to a step S212 shown in FIG. 25. In this step, the original counter, the sheet discharge bin designation counter, the sheet discharge bin the number of storage sheets counter and the inserter the number of output sheets counter are respectively cleared and set to "0".

Next, the flow advances to a step S213 to judge whether or not the value counted by the original counter coincides with the number of originals. If judged that the counted value coincides with the number of originals, the flow advances to a step S214 to clear and set the original counter to "0", and the flow advances to a step S215. Conversely, if judged that the counted value does not coincide with the number of originals, the flow skips over the step S214 and advances to the step S215.

In the step S215, increment of the original counter is performed by "1", and in a next step S216, the image printing for the original of the ordinal number corresponding to the value counted by the original counter is performed. Then, the flow advances to a step S217 to perform increment of the sheet discharge bin the number of storage sheets counter by "1", and further advances to a step S218 to perform increment of the inserter the number of output sheets counter by "1".

Next, the flow advances to a step S219 to judge whether or not the job in the insert output mode ends. If judged that the job does not end, the flow advances to a step S220 to judge whether or not the value counted by the inserter the number of output sheets counter coincides with the number of inserter storage-scheduled sheets (i.e., the number of output sheets determined according to the kind of inserter set in the step S182). If judged that the counted value does not coincide with the number of inserter storage-scheduled sheets, the flow advances to a step S221 to judge whether or not the value counted by the sheet discharge bin the number of storage sheets counter coincides with the number of sheet discharge bin storable sheets. If judged that the counted value does not coincide with the number of sheet discharge bin storable sheets, the flow returns to the step S213 to continue the image printing for the original of the ordinal number corresponding to the value counted by the original counter.

On the other hand, if judged in the step S221 that the counted value coincides with the number of sheet discharge bin storable sheets, it is considered that the sheet on which the image printing for the original of the ordinal number corresponding to the value counted by the original counter was performed can not be stacked in the current stacking bin. Thus, the flow advances to a step S222 to perform increment of the sheet discharge bin designation counter by "1" to designate a next stacking bin. Then, in a step S223, the sheet discharge bin the number of storage sheets counter is cleared and set to "0", and the flow returns to the step S213.

Figure 26:
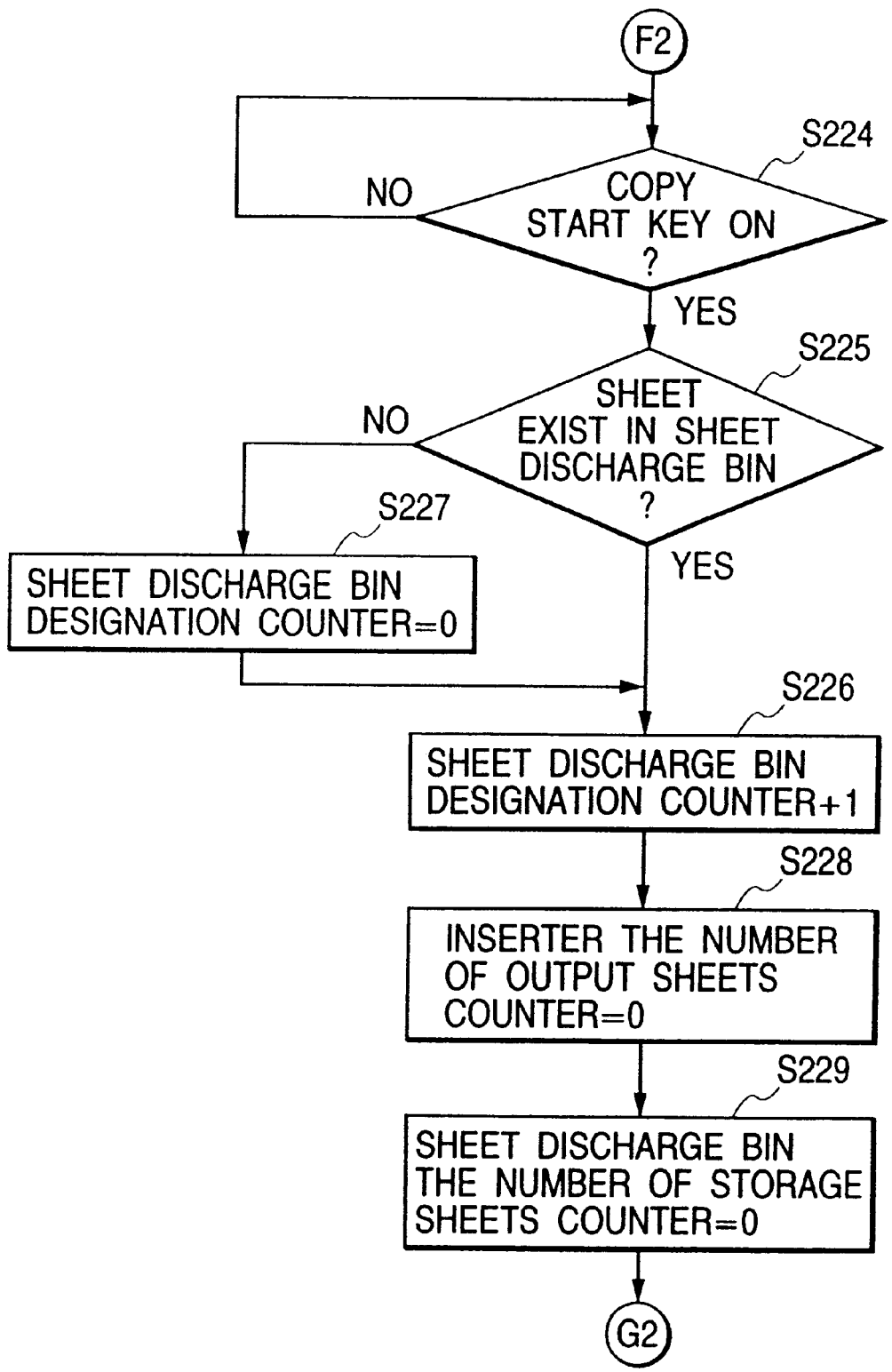
FIG. 26 is a flow chart showing the procedure of the insert output mode in the image forming apparatus according to the seventh embodiment of the present invention.

If judged in the step S220 that the value counted by the inserter the number of output sheets counter coincides with the number of inserter storage-scheduled sheets, it is considered that the sheets of the predetermined number are output to one stacking bin, and the flow advances to a step S224 shown in FIG. 26. Namely, it is considered that output of the sheaf of the sheets of one copy ended, and the flow advances to the step S224 to stop the printing operation and wait for the depression of the start key 614. If the start key 614 is depressed, the flow advances to a step S225 to judge whether or not the sheet exists in the current sheet discharge bin. If judged that the sheet exists in the current sheet discharge bin, it is considered that the sheet remains in the current sheet discharge bin, and the flow advances to a step S226 to perform increment of the sheet discharge bin designation counter by "1". Then, the flow advances to a step S228 to clear and set the inserter the number of output sheets counter to "0", the flow advances to a step S229 to clear and set the sheet discharge bin the number of storage sheets counter to "0", and the flow returns to the step S213. Conversely, if judged in the step S225 that the sheet does not exist in the current sheet discharge bin, it is considered that a sheet can be discharged to the current sheet discharge bin, the flow advances to a step S227 to clear and set the sheet discharge bin designation counter to "0", and the flow returns to the step S213 through the steps S228 and S229.

If judged in the step S219 that the job ends, the flow advances to a step S230 to clear the insert output mode, and the flow returns to the step S181.

As described above, according to the present embodiment, the execution of the insert output mode is temporarily stopped every time the outputting of one of the output copies set according to the information representing the kind of inserter ends, and then the execution of the insert output mode is restarted according to the depression of the start key. Thus, the sheets constituting the sheaf of one copy next to the sheaf of the sheets of one copy do not confuse, whereby the sheaf of the sheets of one copy to be set to the inserter can surely be captured or taken from the stacking bin. As a result, the setting of the sheaf of the sheets of one copy to the inserter can be surely performed without any error. Further, in either the S mode or the F mode, since the execution of the insert output mode is temporarily stopped similarly, the setting of the sheaf of the sheets of one copy output in the S or F mode to the inserter can be surely performed without any error.

Eighth Embodiment

Figure 27A:
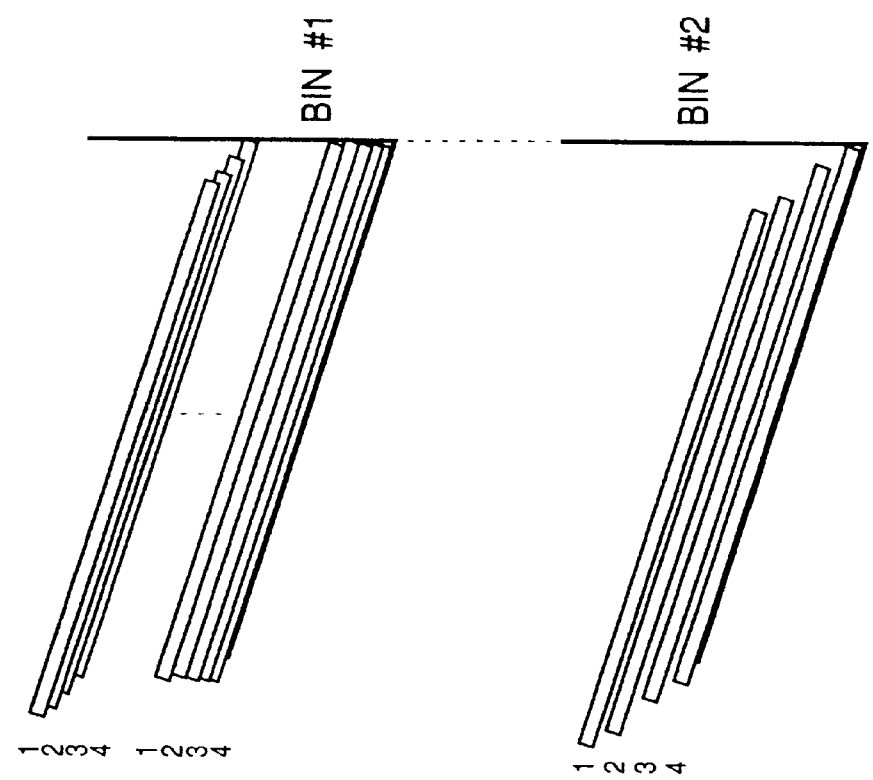
FIGS. 27A and 27B are diagrams showing an example of the problem as to sheet discharge form.
Figure 27B:
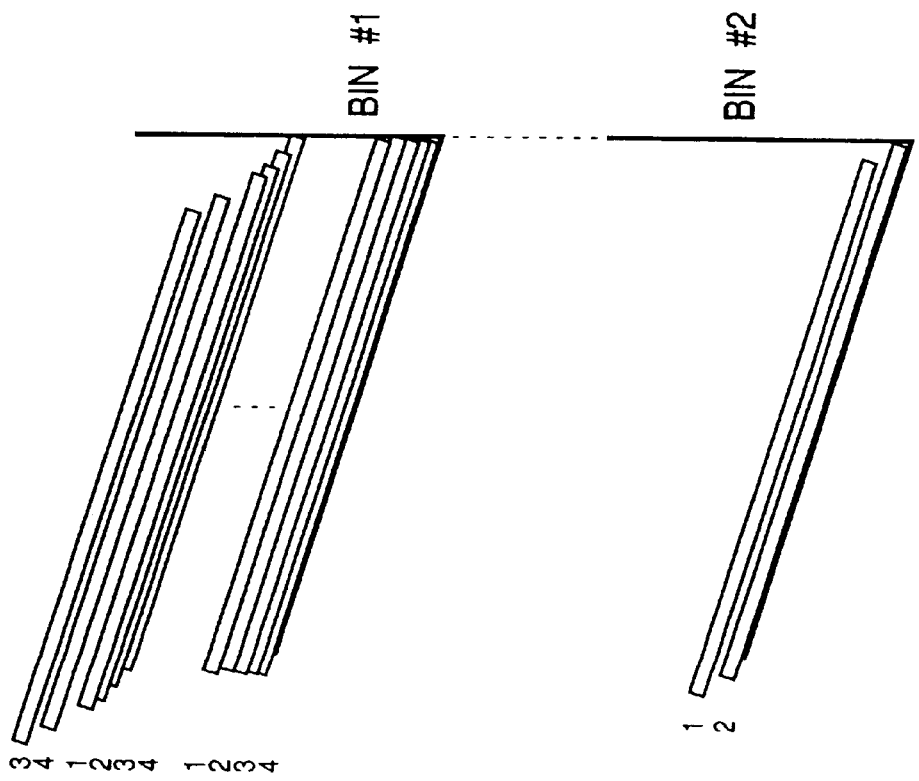
Figure 28:
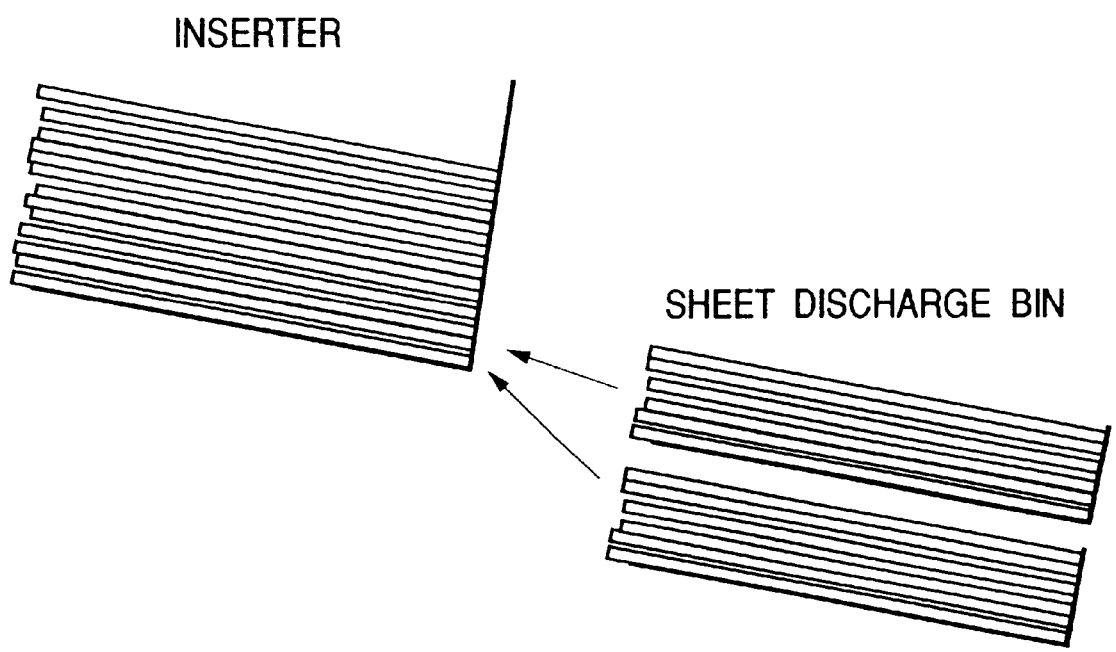
FIG. 28 is a diagram showing an example of sheet discharge form in the image formation apparatus according to the eighth embodiment of the present invention.
Figure 29:
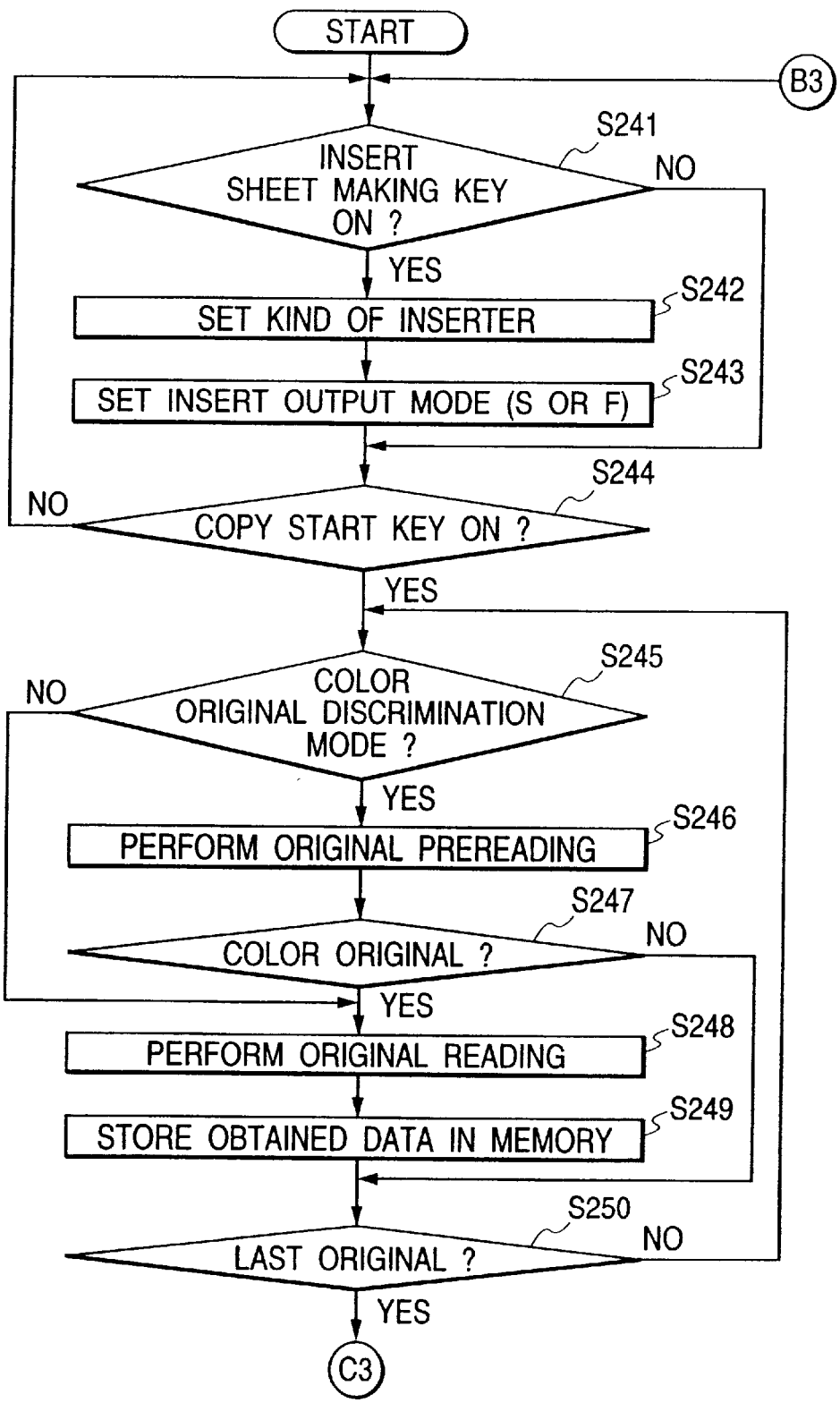
FIG. 29 is a flow chart showing the procedure of the insert output mode in the image forming apparatus according to the eighth embodiment of the present invention.
Figure 30:
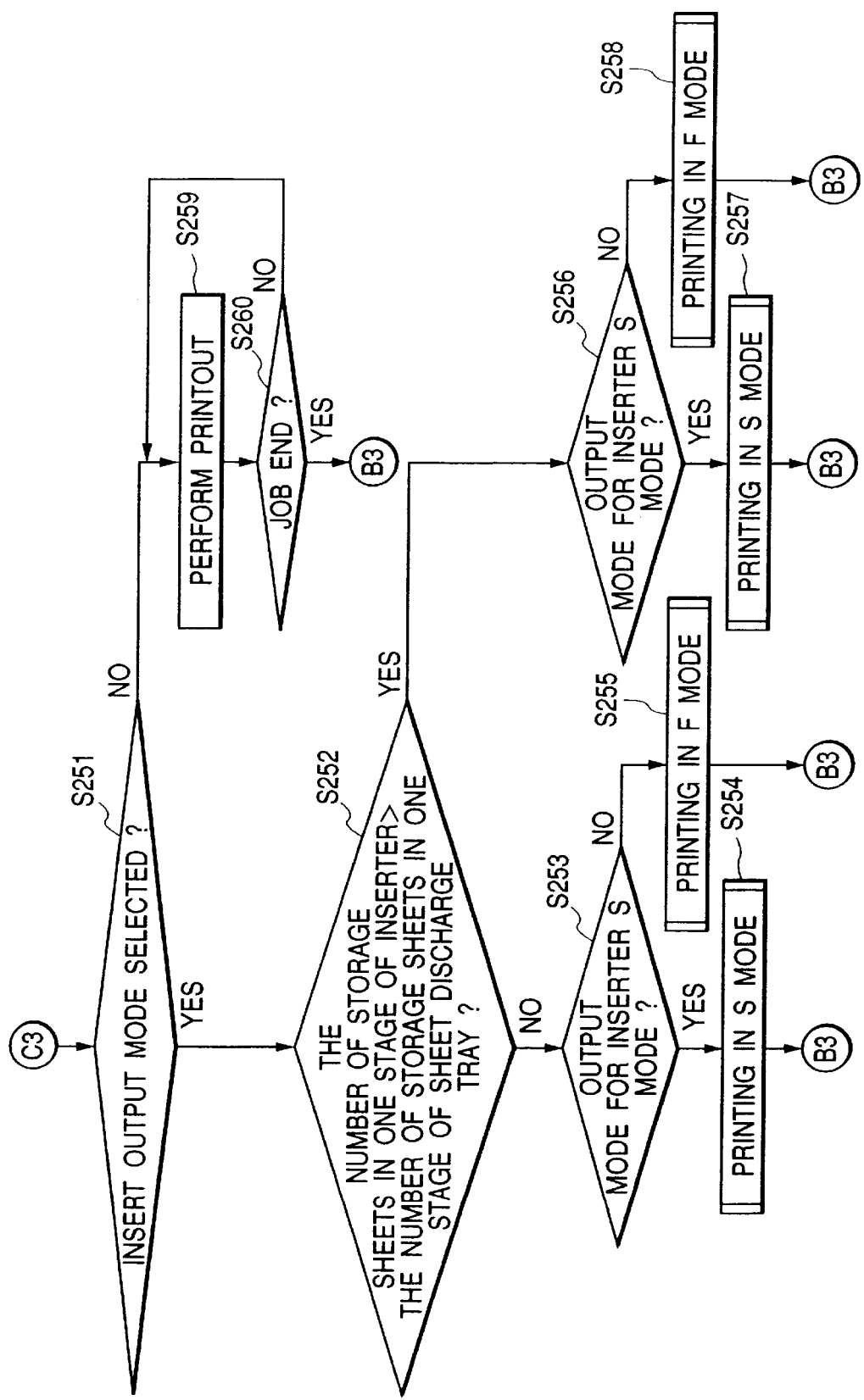
FIG. 30 is a flow chart showing the procedure of the insert output mode in the image forming apparatus according to the eighth embodiment of the present invention.
Figure 31:
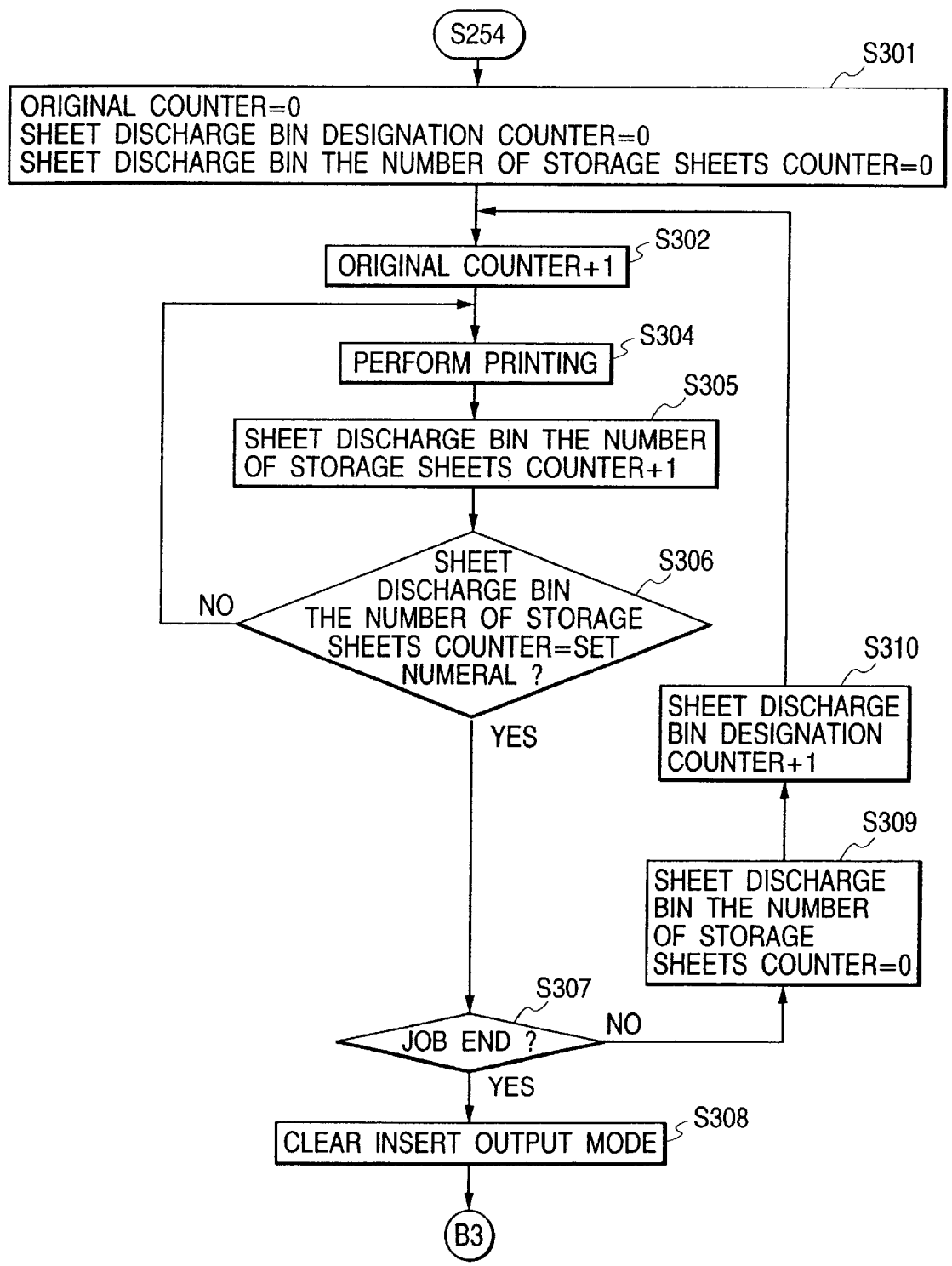
FIG. 31 is a flow chart showing the printing operation in the S mode in the step S254 of FIG. 30.
Figure 32:
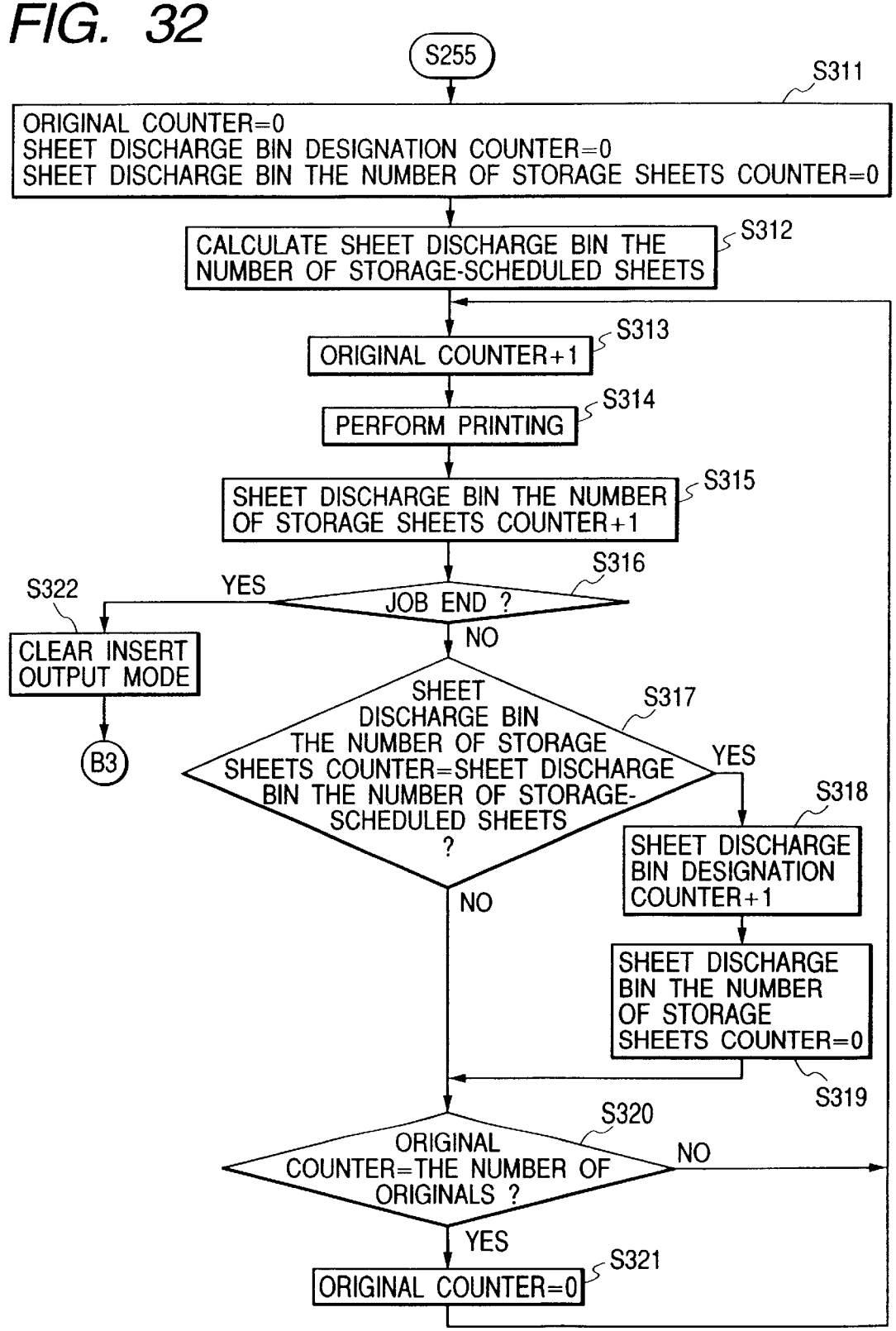
FIG. 32 is a flow chart showing the printing operation in the F mode in the step S255 of FIG. 30.
Figure 33:
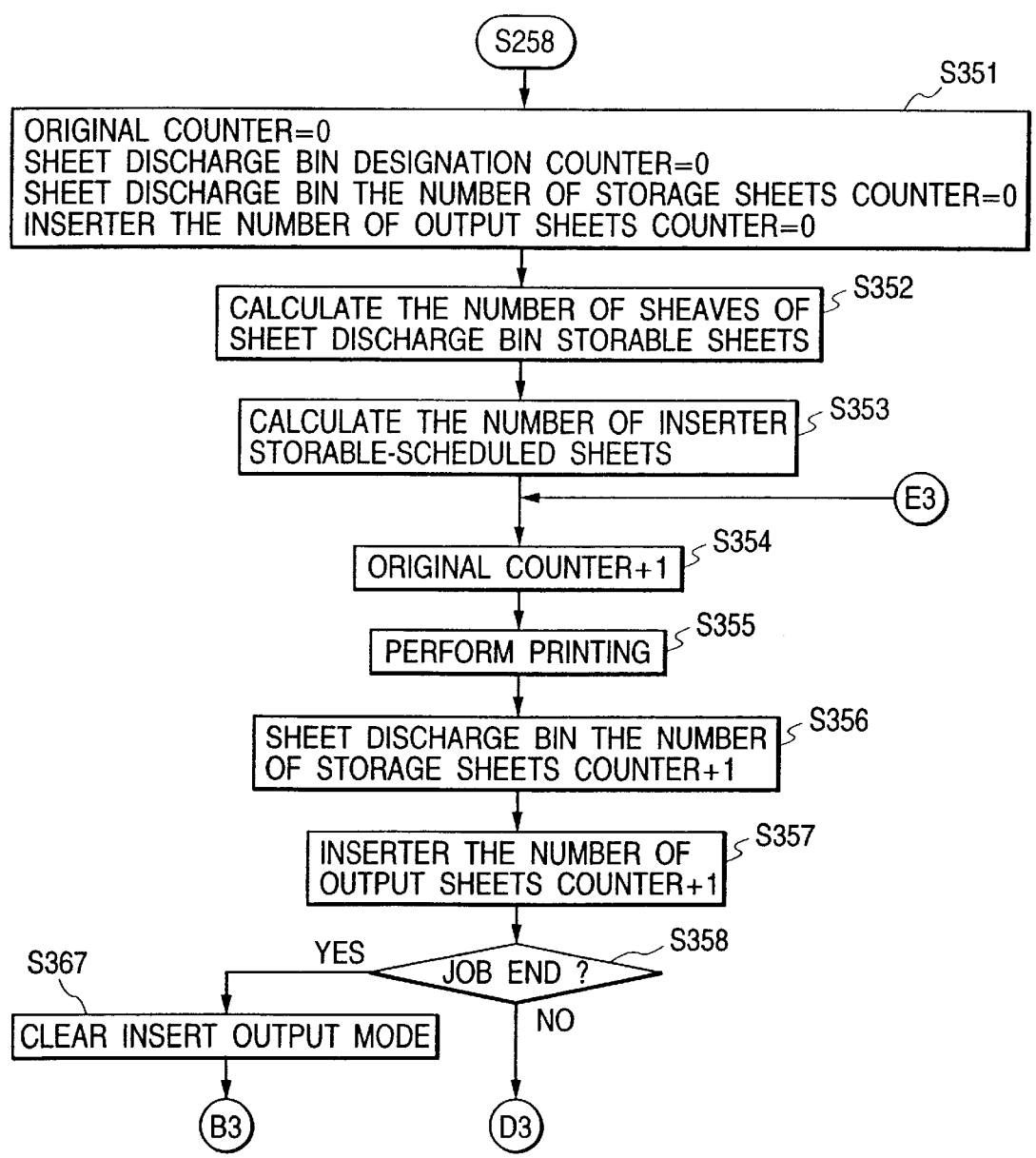
FIG. 33 is a flow chart showing the printing operation in the F mode in the step S258 of FIG. 30.
Figure 34:
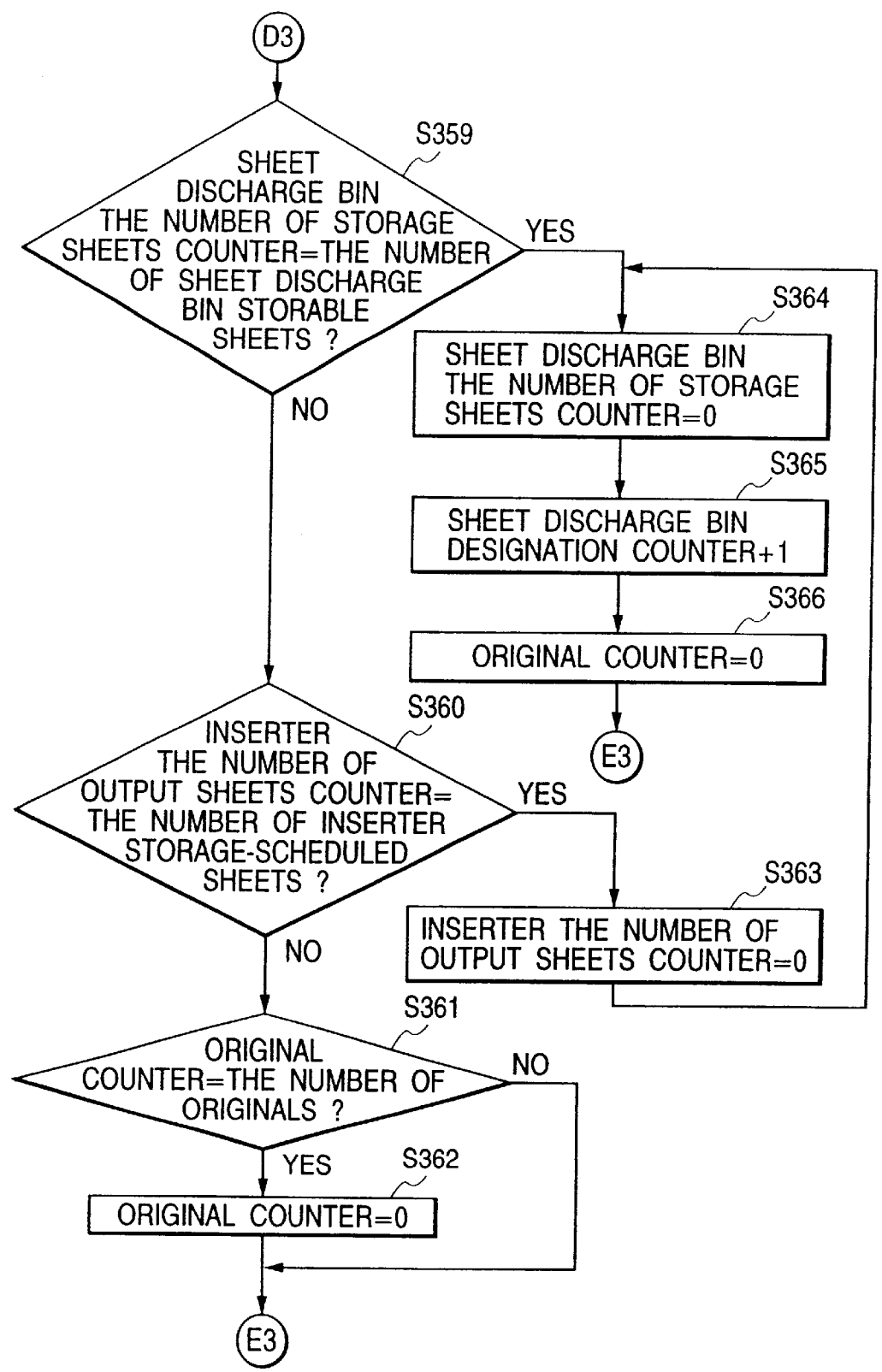
FIG. 34 is a flow chart showing the printing operation in the F mode in the step S258 of FIG. 30.

Next, the eighth embodiment of the present invention will be explained with reference to FIGS. 27A, 27B, 28, 29, 30, 31, 32, 33 and 34. FIGS. 27A and 27B are diagrams showing an example of the problem as to the sheet discharge form, FIG. 28 is a diagram showing an example of the sheet discharge form in the image formation apparatus according to the eighth embodiment, FIGS. 29 and 30 are flow charts showing the procedure of the insert output mode in the image forming apparatus according to the eighth embodiment, FIG. 31 is a flow chart showing the printing operation in the S mode in the step S254 of FIG. 30, FIG. 32 is a flow chart showing the printing operation in the F mode in the step S255 of FIG. 30, and FIGS. 33 and 34 are flow charts showing the printing operation in the F mode in the step S258 of FIG. 30.

The present embodiment is different from the second embodiment in the point that, in the F mode, the sheets output as the insert sheets are sorted and output to each stacking bin 31 of the bin unit 5 for each copy.

In the F mode that the sheets to be output as the insert sheets are sorted and output to each stacking bin 31 of the bin unit 5 in the order of the number of copies, as shown in FIG. 27A, the sheaf of the sheets of the first copy and then the sheaf of the sheets of the next copy are sequentially discharged to the first stacking bin (bin #1). In this case, when the total number of stacked sheets does not reach the number of sheets storable in the bin #1 yet, discharge of the sheaf of the sheets of the next copy is started. Then, if the total number of stacked sheets reaches the number of sheets storable in the bin #1 while the sheaf of these sheets is being discharged, the next bin #2 is designated as the sheet discharge destination, and the partial (i.e., remaining) sheets in this sheaf are discharged to this bin #2. Namely, with respect to one sheaf, the sheets constituting this sheaf are separately discharged to the different sheet discharge bins. In such the case, when the sheaves of the sheets of the plural copies are set to the inserter, it is necessary to gather up the sheets separately discharged in the different bins to make the sheaf, thereby resulting in inconvenience. Further, there is some fear that the sheaf is set to the inserter in the state that the sheets of this sheaf are being erroneously separated.

Thus, according to the present embodiment, in order to prevent that the sheets constituting one sheaf are separately stacked in the different stacking bins, the number (Sb) of copies of the sheaves storable in one stacking bin 31 is calculated based on the number (Sa) of the sheets storable in one stacking bin 31 and the number (Sx) of sheets in the sheaf of one copy, in accordance with the following expression (1).

$$Sb = Sa/Sx \qquad (1)$$

where the value Sb is assumed to be the maximum integer value of the quotient obtained from the above expression (1).

Then, on the basis of the number (Sb) of copies of the sheaves storable in one stacking bin, the number (Ss) of sheets actually storable in the stacking bin is calculated in accordance with the following expression (2), and the obtained value Ss is set as the number of storage-scheduled sheets.

$$Ss = Sx \times Sb \qquad (2)$$

When the number of sheets discharged to the stacking bin reaches the number (Ss) of storage-scheduled sheets, the stacking bin is changed to the next stacking bin. Thus, the sheets constituting one sheaf are not separately stacked in the different stacking bins, whereby the sheets to be output as the insert sheets can be sorted and output to each stacking bin 31 of the bin unit 5 in the unit of the number of copies. Therefore, as shown in FIG. 27B, the sheaf of the sheets of first one copy is discharged to the bin #1, and then the sheaf of the sheets of next one copy is discharged to the bin #2. In this case, if the number of sheets of the sheaves of two copies has been set as the number of storage-scheduled sheets, the next bin #2 is designated as the sheet discharge destination, and the sheets of the sheaf of next copy are discharged to this bin #2. As a result, the sheets are discharged to each stacking bin 31 of the bin unit 5 in the unit of sheaf. Thus, as shown in FIG. 28, when the sheaves of the sheets of the plural copies respectively output to the different stacking bins are set to the inserter, it is unnecessary to gather up these sheets separately discharged in the different bins to make the sheaf, whereby it is possible to set the sheaf of the sheets stacked in each bin to the inserter as it is.

In the insert output mode according to the present embodiment, as shown in FIG. 29, it is first judged in a step S241 whether or not the insert sheet making mode key 642 is depressed. If judged that the key 642 is depressed, the flow advances to a step S242 to select the kind of inserter according as any one of the one-bin inserter key 643, the three-bin inserter key 644 and the five-bin inserter key 645 is depressed, whereby the number of output copies according to the kind of inserter is set. Then, the flow advances to a step S243 to set the S mode or the F mode in the insert output mode according as either the software key 640 or 641 is depressed, whereby the insert output mode is set.

Next, the flow advances to a step S244 to wait for the depression of the start key 614. Conversely, if judged in the step S241 that the insert sheet making mode key 642 is not depressed, the flow skips over the steps S242 and S243 and advances to the step S244 to wait for the depression of the start key 614.

If the start key 614 is depressed, the flow advances to a step S245 to judge whether or not the color original discrimination mode is set. Here, the color original discrimination mode is to discriminate whether the original is a color original. If judged that the color original discrimination mode is not set, the apparatus is considered to perform an ordinary copying operation, and the flow advances to a step S248. In this step, the original p is carried one by one in due order from the original stacking tray 50 to the original mounting board glass 78, and the carried original is read. In a next step S249, the image of the read original is stored in a memory. Then, it is judged in a step S250 whether or not the image forming of the last original ends. If judged that the image forming of the last original does not end, the flow returns to the step S245 to read the next original. Conversely, if judged that the image forming of the last original ends, the flow advances to a step S251 shown in FIG. 30.

Conversely, if judged in the step S245 that the color original discrimination mode is set, the flow advances to a step S246 to start feeding the original from the ADF 51 and perform original prereading. The original prereading is to judge in response to the output from the original discrimination sensor provided on the ADF 51 whether or not the fed original is the color original. If judged in a next step S247 that the fed original is the color original, this original is considered to be read, and the flow advances to the step S248 to read the image of this original and store it in the memory in the next step S249. Then, the flow advances to the step S250 to judge whether or not the reading of the last original ends. If judged that the reading of the last original does not end, the flow returns to the step S245 to perform the feed of the next original and the color original discrimination.

If judged in the step S247 that the fed original is not the color original, the flow skips over the steps S246 and S247 and advances to the step S250. Namely, the original which was judged to be not the color original is not subjected to the reading and is directly discharged as it is. After the reading of the last original ended, the flow advances to the step S251 shown in FIG. 30.

It is judged in the step S251 whether or not the insert output mode is selected. If judged that the insert output mode is not selected, the flow advances to a step S259 to sequentially read the images stored in the memory, perform the image forming on the sheets, and output these sheets to the bin unit 5. Then, in a step S260, it is judged whether or not the job ends. If judged that the job does not end, the flow returns to the step S259. Conversely, if judged that the job ends, the flow returns to the step S241.

If judged in the step S251 that the insert output mode is set, the flow advances to a step S252 to judge whether or not the number of sheets storable in one sheet feed stage of the inserter is larger than the number of sheets storable in one stacking bin (sheet discharge tray). If judged that the number of sheets storable in one sheet feed stage of the inserter is equal to or smaller than the number of sheets storable in one stacking bin, the flow advances to a step S253 to judge whether or not the S mode is set. If judged that the S mode is set, the flow advances to a step S254 to perform the printing operation in the S mode. Conversely, if judged that the S mode is not set, it is considered that the F mode is being set, and the flow advances to a step S253 to perform the printing operation in the F mode.

On the other hand, if judged in the step S252 that the number of sheets storable in one sheet feed stage of the inserter is larger than the number of sheets storable in one stacking bin, the flow advances to a step S256 to judge whether or not the S mode is set. If judged that the S mode is set, the flow advances to a step S257 to perform the printing operation in the S mode. Conversely, if judged that the S mode is not set, it is considered that the F mode is being set, and the flow advances to a step S258 to perform the printing operation in the F mode.

In the printing operation of the S mode in the step S254, as shown in FIG. 31, in a step S301, the original counter, the sheet discharge bin designation counter and the sheet discharge bin the number of storage sheets counter (i.e., the counter for counting the number of sheets stored in the sheet discharge bin) are all cleared and set to "0".

Next, the flow advances to a step S302 to perform increment of the original counter by "1", and further advances to a step S304 to perform the image printing for the original of the ordinal number corresponding to the value counted by the original counter. Then, the flow advances to a step S305 to perform increment of the sheet discharge bin the number of storage sheets counter by "1". Next, the flow advances to a step S306 to judge whether or not the value counted by the sheet discharge bin the number of storage sheets counter coincides with the set numeral (i.e., the number of output copies determined according to the kind of inserter set in the step S242). If judged that the counted value does not coincide with the set numeral, the flow returns to the step S304. Conversely, if judged that the counted value coincides with the set numeral, the flow advances to a step S307 to judge whether or not the job ends. If judged that the job does not end, the flow advances to a step S309 to clear and set the sheet discharge bin the number of storage sheets counter to "0", and further advances to a step S310 to perform increment of the sheet discharge bin designation counter by "1". Then, the flow returns to the step S302 to perform increment of the original counter by "1", and the printing operation of the next original image is continued.

If judged in the step S307 that the job ends, the flow advances to a step S308 to clear the insert output mode, and the flow returns to the step S241.

In the printing operation of the F mode in the step S255, as shown in FIG. 32, in a step S311, the original counter, the sheet discharge bin designation counter and the sheet discharge bin the number of storage sheets counter are all cleared and set to "0". In a next step S312, the number of storage-scheduled sheets in the sheet discharge bin is calculated. It should be noted that the method for calculating the number of storage-scheduled sheets is the same as that described above.

Next, the flow advances to a step S313 to perform increment of the original counter by "1", and further advances to a step S314 to perform the image printing. Then, the flow advances to a step S315 to perform increment of the sheet discharge bin the number of storage sheets counter by "1", and further advances to a step S316 to judge whether or not the job ends. If judged that the job does not end, the flow advances to a step S317 to judge whether or not the value counted by the sheet discharge bin the number of storage sheets counter coincides with the number of storage-scheduled sheets in the sheet discharge bin. If judged that the value counted by the sheet discharge bin the number of storage sheets counter does not coincide with the number of storage-scheduled sheets in the sheet discharge bin, the flow advances to a step S320 to judge whether or not the counted value of the original counter coincides with the number of read originals. If judged that the counted value does not coincide with the number of read originals, the flow returns to the step S313 to perform the printing operation for the next original. Conversely, if judged that the counted value coincides with the number of read originals, the flow advances to a step S321 to clear and set the original counter to "0". Then, the flow returns to the step S313 to perform the printing operation for the next sheaf of the sheets.

On the other hand, if judged in the step S317 that the value counted by the sheet discharge bin the number of storage sheets counter coincides with the number of storage-scheduled sheets in the sheet discharge bin, it is considered that the sheets of the next sheaf can not be stacked on the current stacking bin, and the flow advances to a step S318 to perform increment of the sheet discharge bin designation counter by "1". Then, the flow advances to a step S319 to clear and set the sheet discharge bin the number of storage sheets counter to "0", and further advances to the step S320 to judge whether or not the counted value of the original counter coincides with the number of read originals. In this case, the value counted by the sheet discharge bin the number of storage sheets counter coincides with the number of storage-scheduled sheets in the sheet discharge bin, whereby the counted value of the original counter coincides with the number of read originals. Then, the flow advances to the step S321 to clear and set the original counter to "0". The flow returns to the step S313 to perform the printing operation for the next sheaf of the sheets.

Figure 20:
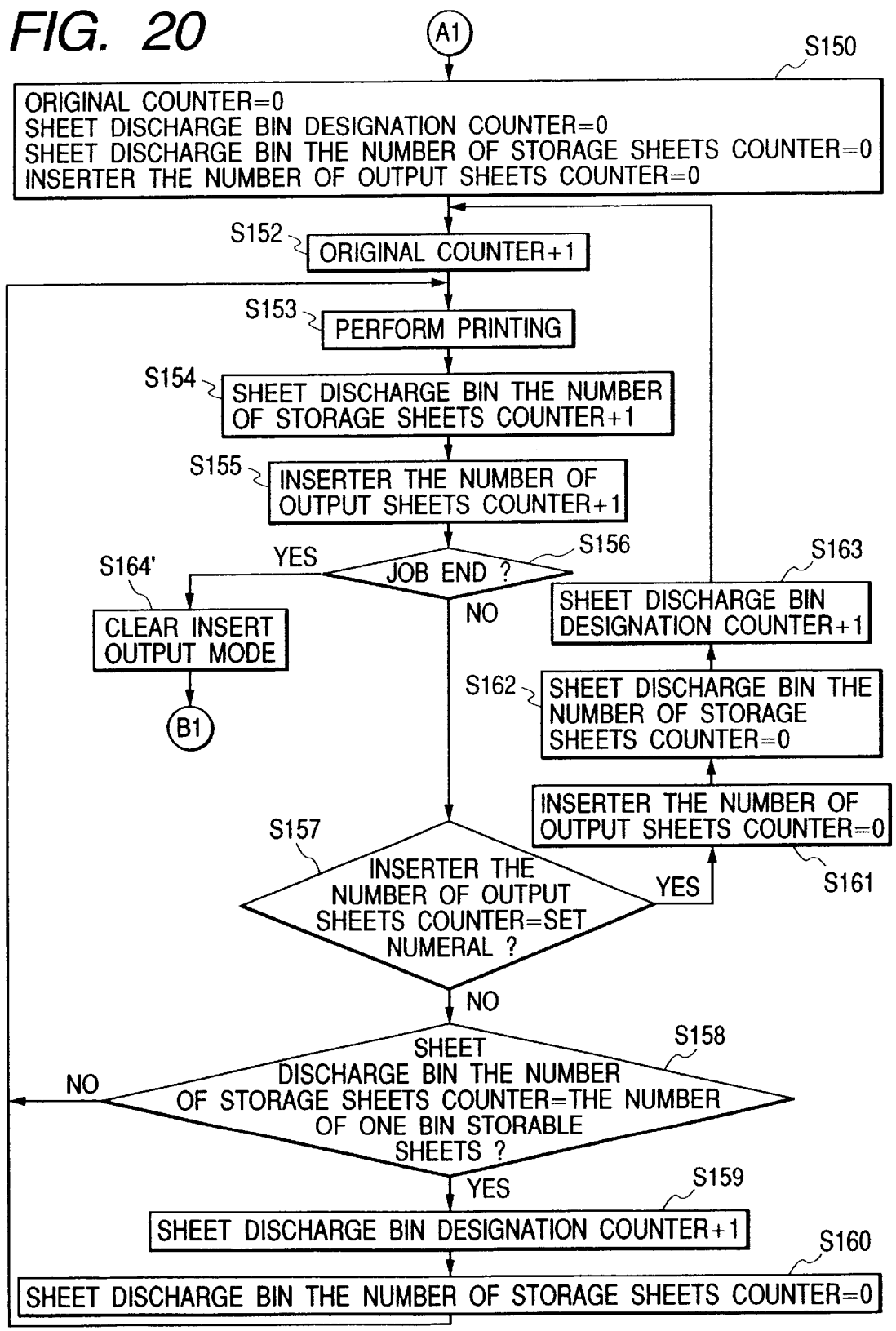
FIG. 20 is a flow chart showing the procedure of the insert output mode in the image forming apparatus according to the sixth embodiment of the present invention.
Figure 21:
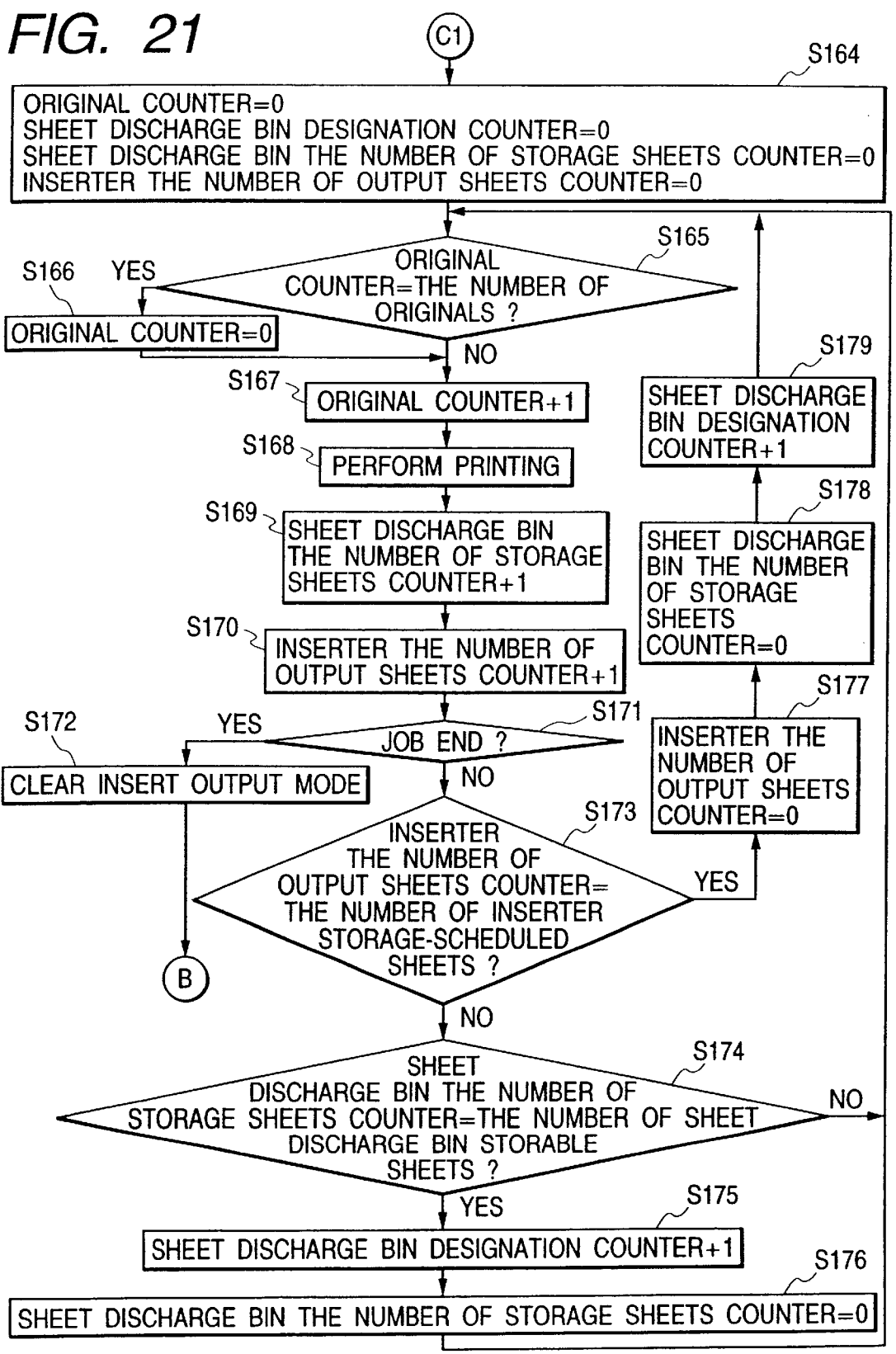
FIG. 21 is a flow chart showing the procedure of the insert output mode in the image forming apparatus according to the sixth embodiment of the present invention.

The procedure of the printing operation of the S mode in the step S257 is the same as that shown in the flow chart of FIG. 20, whereby the explanation thereof will be omitted.

In the printing operation of the F mode in the step S258, as shown in FIG. 33, in a step S351, the original counter, the sheet discharge bin designation counter, the sheet discharge bin the number of storage sheets counter and the inserter the number of output sheets counter (i.e., the counter for counting the number of sheets output to the inserter) are all cleared and set to "0". In a next step S352, the number of sheaves of sheets storable in the sheet discharge bin (the number of sheet discharge bin storage-scheduled sheets) is calculated according the above expressions (1) and (2), and in a next step S353, the number of inserter storage-scheduled sheets is calculated.

In this step, the number (Ib) of sheaves of copies storable in one sheet feed bin of the inserter is calculated based on the number (Ia) of sheets storable in this sheet feed bin and the number (Sx) of sheets in the sheaf of one copy, in accordance with the following expression (3).

$$Ib=Ia/Sx \quad (3)$$

where the value Ib is assumed to be the maximum integer value of the solution obtained from the above expression (3). Then, on the basis of the number (Ib) of sheaves of copies storable in one sheet feed bin, the number (Is) of sheets actually storable in the sheet feed bin is calculated in accordance with the following expression (4), and the obtained value Is is set as the number of inserter storage-scheduled sheets.

$$Is=Sx \times Ib \quad (4)$$

Next, the flow advances to a step S354 to perform increment of the original counter by "1", and further advances to a step S355 to perform the image printing for the original of the ordinal number corresponding to the value counted by the original counter. Then, the flow advances to a step S356 to perform increment of the sheet discharge bin the number of storage sheets counter by "1", and further advances to a step S357 to perform increment of the inserter the number of output sheets counter by "1".

Next, the flow advances to a step S358 to judge whether or not the job ends in the inset output mode. If judged that the job ends, the flow advances to a step S367 to clear the insert output mode, and the flow returns to the step S241. Conversely, if judged that the job does not end, the flow advances to a step S359 shown in FIG. 34 to judge whether or not the value counted by the sheet discharge bin the number of storage sheets counter coincides with the number of sheet discharge bin storage-scheduled (or storable) sheets. If judged that the counted value coincides with the number of sheet discharge bin storage-scheduled sheets, it is considered that the sheaves of the sheets of the plural copies are being stacked in the current stacking bin and thus the sheaf after these stacked sheaves can not be stacked any more, and thus the flow advances to a step S364 to clear and set the sheet discharge bin the number of storage sheets counter to "0", and further advances to a step S365 to perform increment of the sheet discharge bin designation counter by "1". Further, the flow advances to a step S366 to clear and set the original counter to "0", and the flow returns to the step S354 to continue the image printing for the original of the ordinal number corresponding to the value counted by the original counter.

On the other hand, if judged in the step S359 that the value counted by the sheet discharge bin the number of storage sheets counter does not coincide with the number of sheet discharge bin storage-scheduled sheets, the flow advances to a step S360 to judge whether or not the value counted by the inserter the number of output sheets counter coincides with the number of inserter storage-scheduled sheets. If judged that the counted value coincides with the number of inserter storage-scheduled sheets, the flow advances to a step S363 to clear and set the inserter the number of output sheets counter to "0". Then, the flow advances to the step S364 to clear and set the sheet discharge bin the number of storage sheets counter to "0", and further advances to the step S365 to perform increment of the sheet discharge bin designation counter by "1". Further, the flow advances to the step S366 to clear and set the original counter to "0", and the flow returns to the step S354 to continue the image printing for the original of the ordinal number corresponding to the value counted by the original counter.

On the other hand, if judged in the step S360 that the value counted by the inserter the number of output sheets counter does not coincide with the number of inserter storage-scheduled sheets, the flow advances to a step S361 to judge whether or not the value counted by the original counter coincides with the number of originals. If judged that the counted value coincides with the number of originals, the flow advances to a step S362 to clear and set the original counter to "0", and the flow returns to the step S354.

As described above, according to the present embodiment, the sheets to be output as the insert sheets in the F mode are sorted and output to each stacking bin 31 of the bin unit 5 for each copy (or in the unit of the number of copies). Thus, the sheets constituting one sheaf in the F mode are not separately stacked in the different stacking bins, whereby the sheaves of sheets output in the F mode can be surely and correctly set to the inserter.

Ninth Embodiment

Figure 35A:
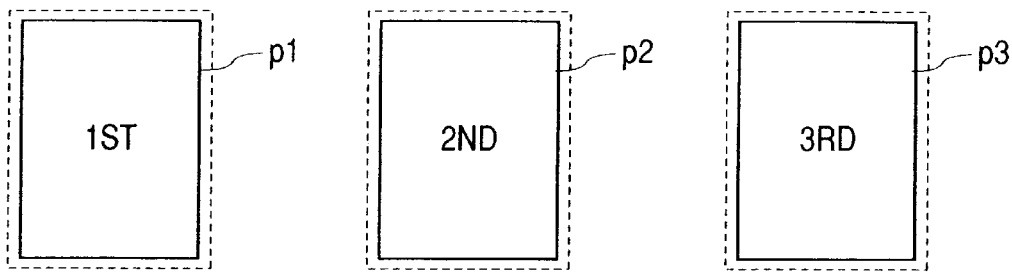
FIGS. 35A, 35B and 35C are diagrams showing an example that a head mark is affixed in the insert output mode in the image forming apparatus according to the ninth embodiment of the present invention.
Figure 35B:
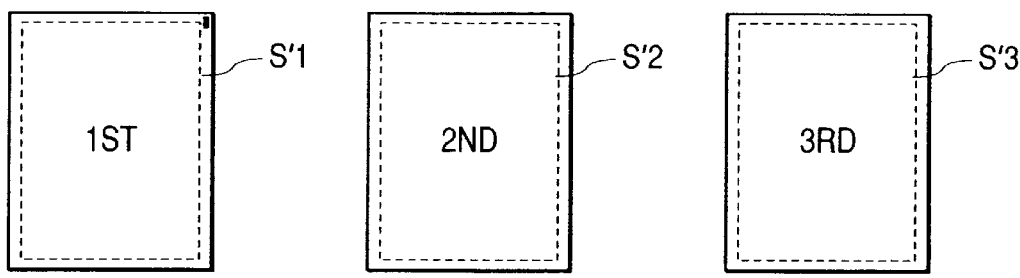
Figure 35C:
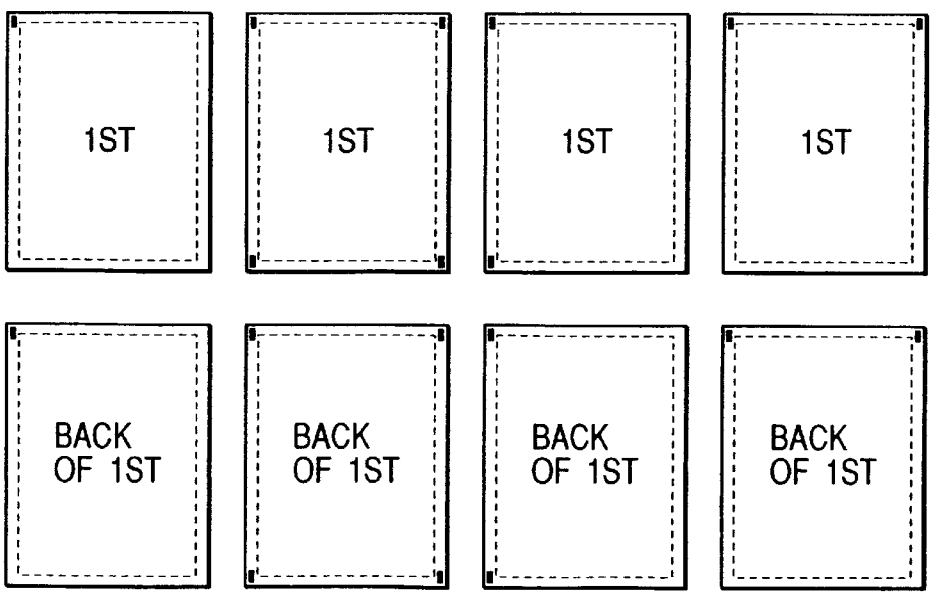
Figure 36:
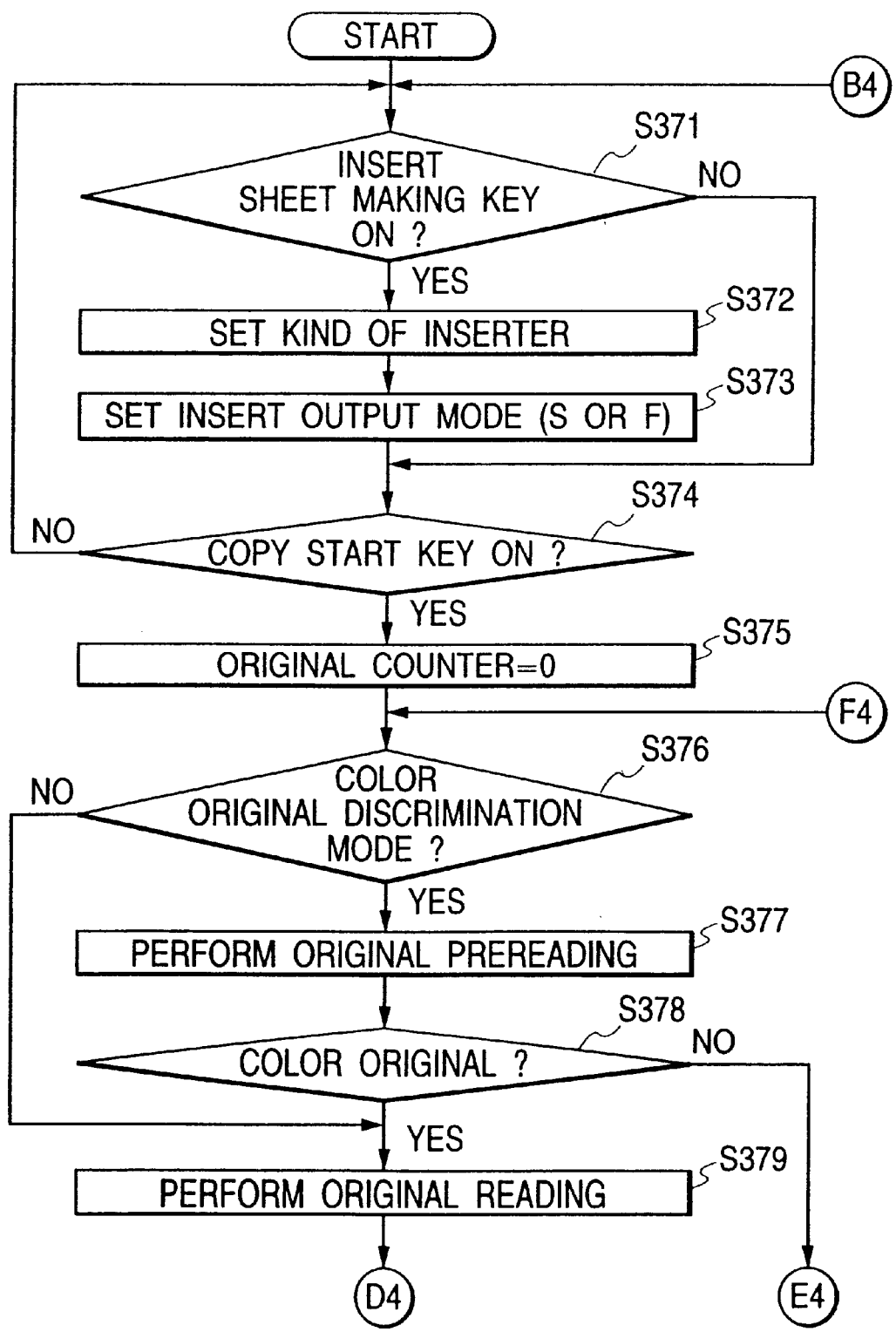
FIG. 36 is a flow chart showing the procedure of the insert output mode in the image forming apparatus according to the ninth embodiment of the present invention.
Figure 37:
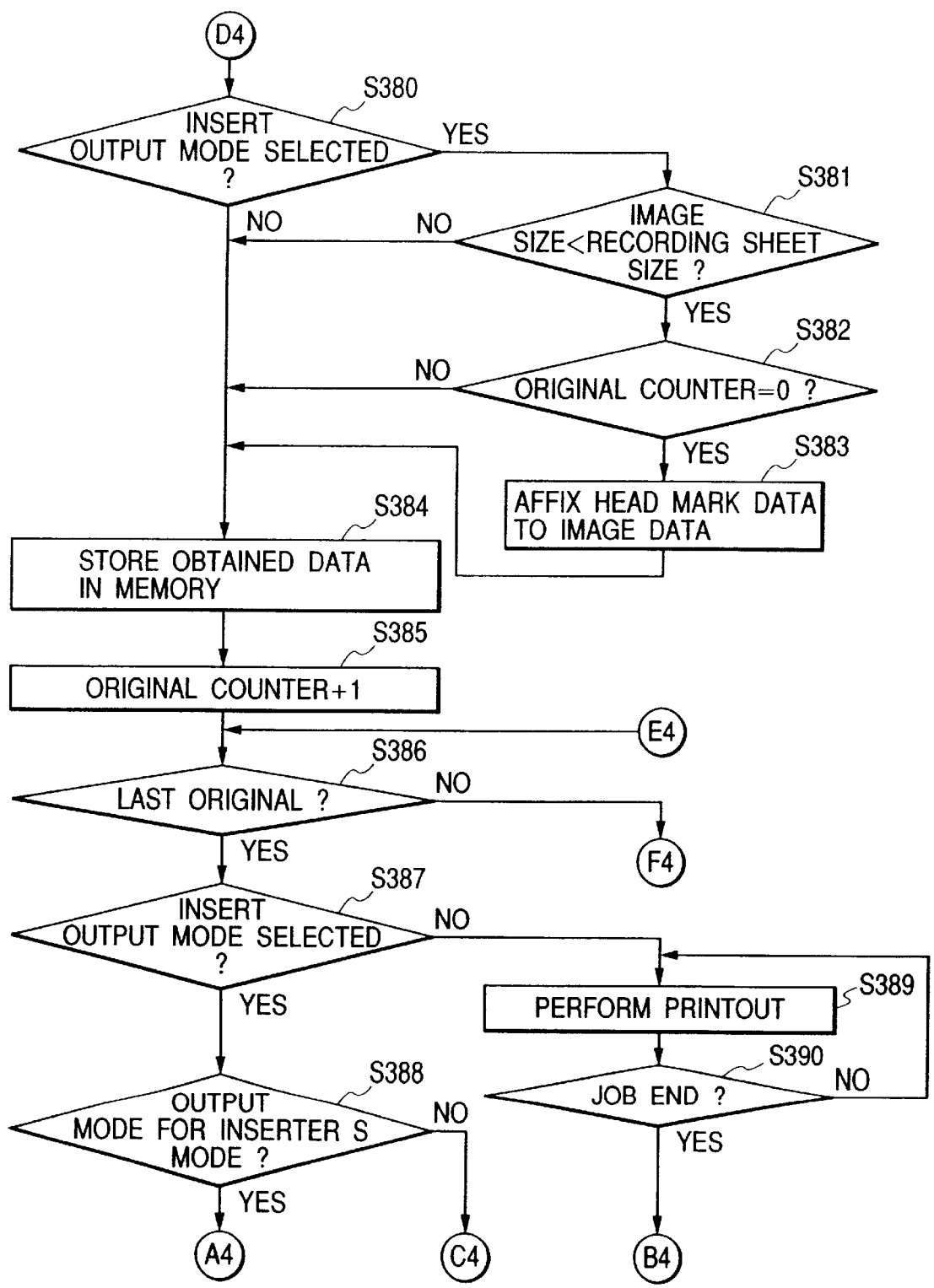
FIG. 37 is a flow chart showing the procedure of the insert output mode in the image forming apparatus according to the ninth embodiment of the present invention.

Next, the ninth embodiment of the present invention will be explained with reference to FIGS. 35A, 35B, 35C, 36 and 37. FIGS. 35A to 35C are diagrams showing an example that a head mark is affixed in the insert output mode in the image forming apparatus according to the ninth embodiment, and FIGS. 36 and 37 are flow charts showing the procedure of the insert output mode in the image forming apparatus according to the ninth embodiment.

The present embodiment is different from the sixth embodiment in the point that a head mark is affixed to an area (i.e., margin area) outside the image forming area of the sheet corresponding to the first page of the sheets to be output as the insert sheets in the insert output mode.

Concretely, as shown in FIG. 35A, if three originals p1 to p3 are sequentially read in the insert output mode, the images of the originals p1 to p3 are stored in a memory in the reading order. At this time, head mark data (or head image mark data) is affixed to a predetermined position in the area outside the original image area for the image of the read original p1 (i.e., the top of the image in this case), and the image data and the affixed mark data are together stored in the memory. This head mark data is the data prestored in the memory. Then, after the reading of the last original p3 ended, the image corresponding to the last page (i.e., the image of the original p3) is read from the memory, the read image is formed on a sheet, and this sheet is output to the stacking bin 31 determined in the set mode (the S or F mode). Next, the image corresponding to the previous page of the last page (i.e., the image of the original p2) is read, the read image is formed on a sheet, and the sheet on which this read image was formed is put on the sheet of the last page on the stacking bin 31. Next, the image corresponding to the first page (i.e., the image of the original p1) is read, the read image is formed on a sheet, and this sheet is put uppermost on the sheaf of the sheets on the stacking bin 31. Since the head mark data has been affixed to the image data corresponding to the first page (first page), an image (i.e., a mark "■") represented by the head mark data is affixed to the area corresponding to the margin of a sheet S'1 (i.e., the area outside the original image forming area of the sheet S'1) as shown in FIG. 35B. Of course, the image represented by the head mark data is not affixed to sheets S'2 and S'3 corresponding to other pages.

Thus, the sheet corresponding to the first page includes the image representing that this sheet corresponds to the first page, whereby the first-page sheet can be well discriminated in the sheaf of sheets output in the S or F mode. Thus, when the sheaf of sheets is set to the inserter, this sheaf can be set on the basis of the discriminable first-page sheet, whereby the user can set the sheets without misarrangement in the page order.

Further, the above explanation is directed to the case where the head mark data is affixed to the position corresponding to the top of the sheet in the image data. However, as shown in FIG. 35C, the position of the head mark data and the number thereof can be changed. In this case, it is preferable to change the position and the number of the head mark data on the basis of the information representing the kind of inserter. For example, in a case where an insert sheet is set to the inserter on the basis of the trailing edge of this sheet, the head mark can be affixed to the trailing edge (i.e., the bottom) of the sheet of the first page. Thus, it is possible to affix the head mark to the position suitable for a form that the insert sheet is set to the inserter. Further, it is possible to affix the head mark to the back face of the sheet, instead of the front face (i.e., the image forming face) of the sheet.

Next, the insert output mode in the present embodiment will be explained with reference to FIGS. 36 and 37.

In FIG. 36, it is first judged in a step S371 whether or not the insert sheet making mode key 642 is depressed. If judged that the key 642 is depressed, the flow advances to a step S372 to select the kind of inserter according as any one of the one-bin inserter key 643, the three-bin inserter key 644 and the five-bin inserter key 645 is depressed, whereby the number of output copies according to the kind of inserter is set. Then, the flow advances to a step S373 to set the S mode or the F mode in the insert output mode according as either the software key 640 or 641 is depressed, whereby the insert output mode is set.

Next, the flow advances to a step S374 to wait for the depression of the start key 614. Conversely, if judged in the step S371 that the insert sheet making mode key 642 is not depressed, the flow skips over the steps S372 and S373 and advances to the step S374 to wait for the depression of the start key 614.

If the start key 614 is depressed, the flow advances to a step S375 to clear and set the original counter to "0", and further advances to a step S376 to judge whether or not the color original discrimination mode is set to read only the color original. If judged that the color original discrimination mode is not set, the apparatus is considered to perform an ordinary copying operation, and the flow advances to a step S379. In this step, the original p is carried one by one in due order from the original stacking tray 50 to the original mounting board glass 78, and the carried original is read. In a next step S380 shown in FIG. 37, it is judged whether or not the insert output mode is selected. Since the insert output mode is not set in this case, the flow advances to a step S384 to store the image of the read original in a memory, and further advances to a step S385 to perform increment of the original counter by "1". Then, it is judged in a step S386 whether or not the image forming of the last original ends. If judged that the image forming of the last original does not end, the flow returns to the step S376 to read the next original. After the reading of the last original ended, the flow advances to the step S387.

On the other hand, if judged in the step S376 that the color original discrimination mode to read only the color original is set, the flow advances to a step S377 to start feeding the original from the ADF 51 and perform original prereading to judge whether or not the fed original is a color original. On the basis of the result of the original prereading, if judged in a step S378 that the fed original is the color original, the flow advances to the step S379 to read the image of this original. Then, the flow advances to the step S380 in FIG. 37 to judge whether or not the insert output mode is selected. If judged that the insert output mode is selected, the flow advances to a step S381 to judge whether or not the image size is smaller than the sheet size. If judged that the image size is smaller than the sheet size, the flow advances to a step S382 to judge whether or not the count value of the original counter is "0". If judged that the count value of the original counter is "0", this original is considered to be the original corresponding to the first page, and the flow advances to a step S383 to affix the head mark data to the image data. In the next step S384, the image data added with the head mark data is stored in the memory, and the flow advances to the step S385 to perform the increment of the original counter by "1". Then, it is judged in the step S386 whether or not the image forming of the last original ends. If judged that the image forming of the last original does not end, the flow returns to the step S376 to judge whether or not the color original discrimination mode is set.

If judged in the step S381 that the image size is not smaller than the sheet size, it is considered that the head data mark can not be affixed to the margin area, and the flow skips over the steps S382 and S383 and advances to the step S384. Further, if judged in the step S382 that the count value of the original counter is not "0", it is considered that the original is not the original corresponding to the first page, and the flow skips over the step S383 and advances to the step S384.

If judged in the step S378 that the original is not the color original, the flow skips over the steps S379 to S385 and advances to the step S386. Namely, the original judged to be not the color original is not subjected to the reading but is discharge as it is. After the reading of the last original ended, the flow advances to a step S387.

It is judged in the step S387 whether or not the insert output mode is selected. If judged that the insert output mode is not selected, the flow advances to a step S389 to sequentially read the images stored in the memory, perform the image forming on the sheets, and output these sheets to the bin unit 5. Then, in a step S390, it is judged whether or not the job ends. If judged that the job does not end, the flow returns to the step S389. Conversely, if judged in the step S390 that the job ends, the flow returns to the step S371.

If judged in the step S387 that the insert output mode is set, the flow advances to a step S388 to judge whether or not the S mode is set. If judged that the S mode is set, the printing operation in the S mode is performed. Here, since the printing operation in the S mode is the same as the printing operation shown in the flow chart of FIG. 20, the explanation of this operation will be omitted. Conversely, if judged in the step S388 that the S mode is not set, i.e., the F mode is set, the printing operation in the F mode is performed. Here, since the printing operation in the F mode is the same as the printing operation shown in the flow chart of FIG. 21, the explanation of this operation will be omitted.

As described above, according to the present embodiment, since the head mark data is affixed to the margin area of the sheet, it is possible to avoid that it becomes difficult to distinguish the head mark on the sheet because the original image and the head mark overlap each other.

It is needless to say that the objects of the present invention can be achieved as well by supplying storage media recording program codes (including program codes to perform the processes in the above-described flow charts) of software for realizing the functions of the above-described first to ninth embodiments to a system or an apparatus, and by the system or a computer (a CPU or an MPU) of the apparatus reading and executing the program codes stored in storage media.

In this case, the program codes themselves read from the storage media realize the functions of the above-described embodiments, and thus the storage media storing the program codes constitute the present invention.

As the storage media for supplying the program codes, e.g., a floppy disk, a hard disk, an optical disk, a magnetooptical disk, a CD-ROM, a CD-R, a DVD-ROM, a magnetic tape, a nonvolatile memory card, a ROM and the like can be used.

Further, it is needless to say that the functions of the above-described embodiments are realized not only by executing a program code read by a computer, but also by a process that is actually performed in part or entirely by an OS (operating system) and the like operating on the computer based on the instruction of the program code.

Further, it is needless to say that the functions of the above-described embodiments are realized by a process that is actually performed in part or entirely by a CPU and the like provided in a function extension board or a function extension unit based on a instruction of the program code after the program code is read from the storage media and written in a memory provided in the function extension board inserted in the computer or the function extension unit connected to the computer.

In the above-described first to ninth embodiments, in the image forming apparatus 1000 which has the color image forming unit capable of forming the color image on the sheet, when the insert output mode is being selected, it is controlled to perform the printing only for the color pages of the originals mixedly including the color and B/W originals but not to perform the printing for the B/W pages. Besides, as another embodiment, the present invention is applicable to a case where, in the image forming apparatus which has the B/W image forming unit capable of forming the B/W image on the sheet, when the insert output mode is being selected, it is controlled to perform the printing only for the B/W pages of the originals mixedly including the color and B/W originals and to inhibit the printing for the color originals. Thus, for example, in order to make the insert sheet which should be set to the insert bin of the color image forming apparatus having the inserter, the information concerning the inserter of this color image forming apparatus, the set number of copies, and the like are input at the operation unit of the B/W image forming apparatus which should execute the insert output mode. Then, it is controlled to cause the B/W image forming apparatus which received the information, the set number and the like to perform the printing only for the B/W pages of the originals mixedly including the color and B/W originals and to inhibit the printing for the color originals. Further, it is controlled to output the plural (but one kind of) insert sheets on the basis of the information transmitted from the operation unit, and to sort the output insert sheets in the S mode or F mode and then store the sorted insert sheets in the sheet discharge unit.

Then, it causes the user to carry the sheaf of the sheet from the original tray of the B/W image forming apparatus to the original tray of the color image forming apparatus, set the insert sheet the insert sheets output by the B/W image forming apparatus to the inserter bin of the color image forming apparatus, set the insert process, and depress the start key to perform the insert process. By doing so, it is possible to obtain the same effect as that obtained in the above-described embodiments.

Further, in the above-described embodiments, it was chiefly explained the example that the sheaf of the originals which mixedly include the originals on which color images were formed respectively and the originals on which B/W images were formed respectively is output in the insert output mode. However, the present invention is not limited to this. Namely, the present invention is applicable to a case where, when a sheaf of originals mixedly including photograph originals and text originals is output in the insert output mode, e.g., it is controlled to perform printing for the pages corresponding to the photograph originals in that sheaf and not to perform printing for the pages corresponding to the text originals. Thus, the above-described embodiments are particularly efficient in the case where the sheaf of originals to be output in the insert output mode is the sheaf mixedly including different-type originals.

As explained above, according to the embodiments of the present invention, it is first judged whether the original is the color original or the B/W original, the printing is performed to only one of the color and B/W originals on the basis of the judged result. In this structure, the insert output mode that either one of the color and B/W originals is designated and the sheet on which the image of the designated original was formed is output to the inserter as the insert sheet is set, and the set insert mode is executed, whereby it is possible to obtain the output of the insert sheet suitable for the inserter without delay.

Further, when the insert mode that the color original has been designated is set, it is controlled to perform the printing only for the color original. Conversely, when the insert mode that the B/W original has been designated is set, it is controlled to perform the printing only for the B/W original.

Further, the information representing the kind of inserter is input, the number of output copies of the sheets is set according to the input information, whereby it is possible to output the insert sheets of the number of copies suitable for the inserter.

Further, the outputs being the insert sheets obtained in the insert output mode are discharged per copy to the sheet discharge unit in accordance with the set mode, whereby it is possible to facilitate handling of the sheaf of insert sheets.

Further, the insert output mode includes a first sheet discharge mode to sort and output the recording sheets obtained as the insert sheets to the respective bins of the sheet discharge unit in the order of page, and a second sheet discharge mode to sort and output the recording sheets obtained as the insert sheets to the respective bins of the sheet discharge unit in the order of the number of copies. Thus, either one of the first and second sheet discharge modes is selectively executed on the basis of the set information and the like transferred from the operation unit, whereby it is possible to obtain the output of the insert sheets suitable for the inserter without delay.

Further, the mode that the inserter kind information is input, the number of output copies of sheets is set according to the input inserter kind information, and the sheets of the set number of output copies are output is set. Thus, it is possible to output the insert sheets of the set number of copies suitable for the inserter.

Further, inserter kind information includes the number of inserter trays information which represents the number of trays of this inserter. Thus, it is judged whether or not the first sheet discharge mode can be executed based on the number of originals on which the images should be formed as the insert sheets in the sheaf of originals and the number of inserter trays information. If judged that the first sheet discharge mode can not be executed, the second sheet discharge mode is set. Thus, it is possible to prevent beforehand that the sheets of different pages are erroneously stacked to the bin to which the sheets of the same page should be essentially stacked in the first sheet discharge mode.

Further, in the case where the first sheet discharge mode can be executed, it is judged whether or not both the first and second sheet discharge modes can be executed. If judged that both the first and second sheet discharge modes can be executed, it is possible to preferentially set the second sheet discharge mode. Further, in the case where the first sheet discharge mode can be executed, it is judged whether or not both the first and second sheet discharge modes can be executed, and if judged that both the first and second sheet discharge modes can be executed, it is possible to preferentially set the first sheet discharge mode. Further, in the case where the first sheet discharge mode can be executed, it is possible to automatically select and set either one of the first and second sheet discharge modes.

Further, the mark image to be affixed to the sheet is stored beforehand in the memory, and then the stored mark image is printed on the sheet corresponding to the first page of the series of insert sheets in the sheaf output in the insert output mode, whereby the first sheet can be easily discriminated.

Thus, it is possible to diminish erroneous sheet setting to the inserter as much as possible.

Further, it is possible to synthesize the mark image stored in the memory and the image on the original corresponding to the first page of the sheaf of insert sheets, and form the synthesized image on the sheet corresponding to the first page. Further, it is possible to affix the mark image at least to one part on the sheet corresponding to the first page, to make the part to which the mark image should be affixed and the number of such the parts changeable according to the inserter kind information, and to affix the mark image to the margin area of the sheet.

Further, there is provided the process to temporarily stop the execution of the insert output mode every time the sheets the number of which corresponds to the number of one of the set number of output copies are output. Thus, for example, when the sheets are set to the sheet discharge bin of the inserter in the unit of sheaf, it is unnecessary to set the plural sheaves into one sheaf. Further, it is prevent to erroneously sort the sheaves of sheets.

The second sheet discharge mode is the mode to sort and output the sheets obtained as the insert sheets to the respective bins of the sheet discharge unit in the unit of the number of copies. Therefore, in this second sheet discharge mode, the sheets constituting the sheaf of sheets of one copy are never stacked separately in the different bins, and thus it is possible to surely perform the setting of the sheaf of output sheets of one copy to the inserter without any error.

According to the image forming method of the present invention, there are provided the step of setting the insert output mode, the step of discriminating the original designated as the original to be read according to the content of the set insert output mode, the step of reading the original designated based on the discriminated result, the step of forming the image of the read original on the sheet, and the step of outputting as the insert sheet the sheet on which the image was formed. Thus, it is possible to obtain the output of the insert sheets suitable for the inserter without delay.

Further, there are provided the step of inputting the inserter kind information, and the step of setting the number of the output copies of the sheets in accordance with the inserter kind information. Thus, it is possible to output the insert sheets of the number of copies suitable for the inserter.

Further, the sheets output as the insert sheets are discharged for each copy to the sheet stacking means, whereby it is possible to facilitate handling of the sheaf of insert sheets output on the sheet stacking means.

Although the present invention has been explained with reference to the above-described preferred embodiments, the present invention is not limited to them. Namely, it is obvious that various modifications and changes are possible in the present invention without departing from the spirit and scope of the appended claims.

What is claimed is:

1. An image forming apparatus comprising:
    an image forming unit for forming an image on a sheet; and
    a controller for executing an insert sheet output mode to output the sheet on which the image was formed, as an insert sheet to be set to an inserter,
    wherein said controller controls said image forming unit to form one of color pages and B/W (black-and-white) pages and not to form the other one of the color pages and B/W pages in the insert sheet output mode, and
    wherein said controller controls said image forming unit to form continuously a same page of the one of the color pages and B/W pages and then controls said image forming unit to form another page of the one of the color pages and B/W pages.

2. An apparatus according to claim 1, further comprising an image discriminator for discriminating whether the image is a color page or a B/W page.

3. An apparatus according to claim 1, wherein said controller controls said image forming unit to form color pages and not to form B/W pages in the insert sheet output mode.

4. An apparatus according to claim 1, wherein said controller controls said image forming unit to form B/W pages and not to form color pages in the insert sheet output mode.

5. An apparatus according to claim 1, further comprising an input terminal for inputting inserter kind information representing a kind of inserter.

6. An image forming apparatus comprising:
an image forming unit for forming an image on a sheet; and
a controller for executing an insert sheet output mode to output the sheet on which the image was formed, as an insert sheet to be set to an inserter,
wherein said controller controls said image forming unit to form one of color pages and B/W (black-and-white) pages and not to form the other one of the color pages and B/W pages in the insert sheet output mode, and
wherein the insert sheet output mode includes a first mode in which said image forming unit forms continuously a same page of the one of the color pages and B/W pages and then forms another page of the one of the color pages and B/W pages, and a second mode in which said image forming unit forms sequentially each page of the one of the color pages and B/W pages and then forms another copy set of the one of the color pages and B/W pages.

7. An apparatus according to claim 6, further comprising an image discriminator for discriminating whether the image is a color page or a B/W page.

8. An apparatus according to claim 6, wherein said controller controls said image forming unit to form color pages and not to form B/W pages in the insert sheet output mode.

9. An apparatus according to claim 6, wherein said controller controls said image forming unit to form B/W pages and not to form color pages in the insert sheet output mode.

10. An apparatus according to claim 6, further comprising an input terminal for inputting inserter kind information representing a kind of inserter.

11. An apparatus according to claim 10, wherein
said controller judges whether or not the first mode can be executed, on the basis of the number of images and the inserter kind information, and
when said controller judges the first mode can not be executed, said controller sets the second mode.

12. An apparatus according to claim 10, wherein
said controller judges whether or not the first mode can be executed, on the basis of the number of images and the inserter kind information, and
when said controller judges both the first and second modes can be executed, said controller preferentially sets the first mode.

13. An apparatus according to claim 10, wherein
said controller judges whether or not the first mode can be executed, on the basis of the number of images and the inserter kind information, and
when said controller judges the first mode can be executed, said controller automatically selects and sets either one of the first and second modes.

14. An apparatus according to claim 6, further comprising a memory for storing a mark image to be formed to the sheet, wherein said image forming unit forms the mark image to the sheet corresponding to the first page in sheets output in the insert sheet output mode.

15. An apparatus according to claim 14, wherein said image forming unit synthesizes the mark image stored in said memory and the image on an original corresponding to the first page, and forms the synthesized image on the sheet corresponding to the first page.

16. An apparatus according to claim 15, wherein said image forming unit forms the mark image to at least one part on the sheet corresponding to the first page.

17. An apparatus according to claim 16, wherein said image forming unit makes the part to which the mark image should be formed and the number of the parts changeable in accordance with inserter kind information.

18. An apparatus according to claim 14, wherein said image forming unit forms the mark image to a margin area on the sheet.

19. An apparatus according to claim 6, wherein the inserter output mode includes a process to temporarily stop execution of the insert sheet output mode every time sheets of the number corresponding to one of a set number of output copies are output.

20. An image forming method comprising:
an image forming step of forming an image on a sheet by an image forming unit; and
a controlling step of executing an insert sheet output mode to output the sheet on which the image was formed, as an insert sheet to be set to an inserter,
wherein said controlling step controls the image forming unit to form one of color pages and B/W (black-and-white) pages and not to form the other one of the color pages and B/W pages in the insert sheet output mode, and
wherein said controller controls said image forming unit to form continuously a same page of the one of the color pages and B/W pages and then controls said image forming unit to form another page of the one of the color pages and B/W pages.

21. An image forming method comprising:
an image forming step of forming an image on a sheet by an image forming unit; and
a controlling step of executing an insert sheet output mode to output the sheet on which the image was formed, as an insert sheet to be set to an inserter,
wherein said controlling step controls the image forming unit to form one of color pages and B/W (black-and-white) pages and not to form the other one of the color pages and B/W pages in the insert sheet output mode, and
wherein the insert sheet output mode includes a first mode in which said image forming unit forms continuously a same page of the one of the color pages and B/W pages and then forms another page of the one of the color pages and B/W pages, and a second mode in which said image forming unit forms sequentially each page of the one of the color pages and B/W pages and then forms another copy set of the color pages and B/W pages.

\* \* \* \* \*

UNITED STATES PATENT AND TRADEMARK OFFICE
CERTIFICATE OF CORRECTION

PATENT NO. : 6,636,720 B2
DATED : October 21, 2003
INVENTOR(S) : Takayuki Fujii et al.

It is certified that error appears in the above-identified patent and that said Letters Patent is hereby corrected as shown below:

<u>Title page,</u>
Item [75], Inventors, "Kanagawa-ken" should read -- Kawasaki --;
"Chiba-ken" (both occurrences) should read -- Kashiwa --;
"Ibaraki-ken" (both occurrences) should read -- Toride --.

Signed and Sealed this

Sixteenth Day of March, 2004

JON W. DUDAS
*Acting Director of the United States Patent and Trademark Office*